(12) United States Patent
Chiosa

(10) Patent No.: US 11,980,511 B2
(45) Date of Patent: May 14, 2024

(54) GUIDING SURFACE GENERATION

(71) Applicant: EXOCAD GMBH, Darmstadt (DE)

(72) Inventor: Iurie Chiosa, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 357 days.

(21) Appl. No.: 17/668,491

(22) Filed: Feb. 10, 2022

(65) Prior Publication Data

US 2023/0248489 A1    Aug. 10, 2023

(51) Int. Cl.
*A61C 13/00* (2006.01)
*A61C 5/77* (2017.01)
*A61C 7/00* (2006.01)
*A61C 7/02* (2006.01)

(52) U.S. Cl.
CPC ............ *A61C 13/0004* (2013.01); *A61C 5/77* (2017.02); *A61C 7/00* (2013.01); *A61C 7/02* (2013.01)

(58) Field of Classification Search
CPC .... A61C 7/99; A61C 7/02; A61C 5/77; A61C 13/0004
USPC .......................................................... 700/98
See application file for complete search history.

(56) References Cited

U.S. PATENT DOCUMENTS

| | | | | |
|---|---|---|---|---|
| 8,582,870 B2* | 11/2013 | Glor | .................... | A61C 13/0004 382/154 |
| 2012/0179281 A1* | 7/2012 | Steingart | ................ | A61C 13/10 703/11 |
| 2021/0000574 A1 | 1/2021 | Leeson et al. | | |
| 2021/0321872 A1 | 10/2021 | Saphier et al. | | |
| 2022/0287807 A1* | 9/2022 | Leeson | ..................... | A61C 5/77 |
| 2023/0293261 A1* | 9/2023 | Fisker | .................. | A61C 9/0053 700/98 |
| 2024/0028782 A1* | 1/2024 | Selberis | ................. | G16H 30/00 |

FOREIGN PATENT DOCUMENTS

| | | | | |
|---|---|---|---|---|
| AU | 2020234902 A1 | | 9/2021 | |
| CN | 111195161 A | * | 5/2020 | ............ A61C 19/04 |
| CN | 111315315 A | * | 6/2020 | ............ A61C 7/002 |
| EP | 3216419 A1 | | 9/2017 | |
| WO | WO-2013079437 A2 | * | 6/2013 | ............ A61C 1/082 |
| WO | WO-2013079437 A3 | | 6/2013 | |
| WO | WO-2015031367 A2 | * | 3/2015 | ......... A61C 13/0004 |
| WO | WO-2022125577 A1 | * | 6/2022 | ........... A61B 5/1111 |

* cited by examiner

*Primary Examiner* — Ronald D Hartman, Jr.
(74) *Attorney, Agent, or Firm* — PERRY + CURRIER, INC.

(57) ABSTRACT

The invention relates to a computer-implemented method for assessing a clearance between a tooth element to be provided with a dental restoration element and an antagonist of the tooth element. A 3D digital teeth model with 3D digital representations of the tooth element and of a surface area of the antagonist is received. The surface area is offset from the antagonist by adding an offset. The resulting offset surface area defines a limit for the tooth element. For the clearance it is checked, whether the tooth element violates one or more penetration criteria regarding the offset surface area. If the tooth element violates the one or more penetration criteria, the clearance is assessed to be insufficient for the tooth element to be provided with the dental restoration element. Else the clearance is assessed to be sufficient. The result of the assessment is output.

46 Claims, 19 Drawing Sheets

GUIDING SURFACE GENERATION

The invention relates to the field of dental technology. More particularly, the invention relates to a computer-implemented method for assessing a clearance between a tooth element intended to be provided with a dental restoration element and an antagonist of the tooth element. The invention furthermore relates to a computer device and a computer program product for assessing a clearance between a tooth element intended to be provided with a dental restoration element and an antagonist of the tooth element as well as to a manufacturing system comprising the computer device.

Dental restoration element, e.g., a crown or onlay, are intended to be arranged on tooth element, e.g., a natural tooth or tooth stump. To be able to arrange such a dental restoration element on a tooth element, in general a preparation of the respective tooth element is required. When preparing the tooth element, tissue is removed from the tooth element, in order to provide sufficient space for the dental restoration element to be arranged on the on the tooth element. For a proper fitting of the dental restoration element on the tooth element ensuring a proper mechanical functionality of the restoration, neither too much, nor too little tissue should be removed. Therefore, it is a challenging task to assess, whether a tooth element is suitably prepared for a dental restoration to be arranging thereon.

It is an objective to provide for a computer-implemented method, a computer device and computer program product for assessing a clearance between a tooth element intended to be provided with a dental restoration element and an antagonist of the tooth element. Furthermore, it is an objective to provide for a manufacturing system for manufacturing a dental restoration element based on the assessment of the clearance.

In one aspect, the invention relates to a computer-implemented method for assessing a clearance between a tooth element intended to be provided with a dental restoration element and an antagonist of the tooth element.

The method comprises receiving a 3D digital teeth model. The 3D digital teeth model comprises 3D digital representations of the tooth element and of a surface area defined by a tooth surface of the antagonist. The surface area is offset from the tooth surface of the antagonist by adding an offset. The resulting offset surface area defines a limit for the tooth element. It is checked for the clearance, whether the tooth element violates one or more penetration criteria regarding the offset surface area. If the tooth element violates the one or more penetration criteria, the clearance is assessed to be insufficient for the tooth element to be provided with the dental restoration element. Else the clearance is assessed to be sufficient for the tooth element to receive the dental restoration element. The result of the assessment is provided as an output indicating the result of the assessment.

Examples may have the beneficial effect, that a reliable digital assessment of a clearance between a tooth element intended to be provided with a dental restoration element and an antagonist of the tooth element is provided. The clearance between a tooth element and the antagonist may define an available occlusal thickness for the dental restoration element. By assessing the clearance, it may be assessed whether the available occlusal thickness is sufficient, or whether it is insufficient, i.e., whether the dental restoration element requires a lager occlusal thickness than the available occlusal thickness. The assessing the clearance using an offset surface area offset from an antagonist of the tooth element rather than from the tooth element itself may save time and effort. Examples may have the beneficial effect, that for assessing the clearance no further design steps regarding the 3D digital teeth model, like, e.g., selecting a preparation margin, placing a tooth, designing a dental restoration element, placing a dental restoration element, etc., may be required besides the offsetting of the surface area. It may be sufficient to just generate the occlusal limit for the tooth element by offsetting the surface area from a registered antagonist.

Adding an offset to the antagonist rather than to the tooth element may have the beneficial effect, that the reference surface from which the surface area is offset, i.e., the surface of the antagonist, is independent from any preparation of the tooth element or adjustment of the dental restoration element. Thus, the offset surface area may remain unchanged, in case the tooth element is prepared or the dental restoration element is adjusted. If the offset is added to the tooth element, rather than the antagonist, each time the preparation of the tooth element is amended/adjusted, the reference points for the offset defined based by the tooth element may change and therefore require the offset to be recalculated. Thus, each time the preparation of the tooth element is amended/adjusted, all the previous steps resulting in the offset may have to be rerun, which may be rather involved and prone to errors. This is not necessary in case of the offset is added to the antagonist.

A positive assessment, i.e., assessing the clearance to be sufficient, may provide a confirmation, that the tooth element as defined by the 3D digital representation of the tooth element is suitable for arranging a dental restoration element thereon. Furthermore, the positive assessment may provide a confirmation that the dental restoration element, in particular a restoration material selected to be used for manufacturing the dental restoration element, is suitable to be arranged on the tooth element as defined by the 3D digital representation of the tooth element. For example, a negative assessment, i.e., assessing the clearance to be insufficient, may e.g., provide a confirmation that a preparation or further preparation of the tooth element is required. Based on such a negative assessment, e.g., a physical preparation of the tooth element may be performed. For example, a digital preparation of the 3D digital representation of the tooth element, may be performed and provided as a template for a physical preparation of the tooth element. A negative assessment may, e.g., provide a confirmation that a different restoration material for manufacturing the restoration has to be selected. Based on such a negative assessment, e.g., a different restoration material may be selected. The selected restoration material may be used for manufacturing the dental restoration to be arranged on the tooth element as defined by the 3D digital representation of the tooth element.

The 3D digital teeth model received may resemble a current state of teeth and/or tooth elements of a patient. It may teeth and/or tooth elements resembled may comprise the tooth element intended to be provided with the dental restoration element as well as the antagonist of the respective tooth element. The tooth element intended to be provided with a dental restoration element may be a natural tooth or tooth stump of the patient. This natural tooth or tooth stump may, e.g., to be prepared for receiving the dental restoration element. The natural tooth or tooth stump may, e.g., be a tooth or tooth stum prepared for receiving the dental restoration element. The 3D digital teeth model may comprise further teeth and/or tooth elements of the patient's mandibular and/or maxillary dental arch. For example, the 3D digital teeth model may comprise the mandibular dental arch and maxillary dental arch of the patient.

The 3D digital teeth model may be generated using scan data of the patient's oral cavity. For example, the patient's teeth in the oral cavity may be scanned using an intraoral scanner, e.g., an optical intraoral scanner. For example, the upper and lower jaw, i.e., the mandibular dental arch and maxillary dental arch, are scanned in occlusion. The achieved scan data may be used to provide the 3D digital teeth model of the scanned teeth of the oral cavity. Alternatively, an impression of the patient's teeth in the oral cavity, i.e., a negative imprint of the teeth may be taken. Either this impression may be scanned, e.g., using an optical scanner, or the negative imprint provided by the impression may be used to generate a positive reproduction of the patient's teeth, i.e., a 3D physical teeth model or cast, which is scanned, e.g., by the optical scanner to provide the scan data used to generate the 3D digital teeth model.

In case the patient's tooth elements are not scanned intraorally, additional data regarding the relative position of the patient's mandibular dental arch to the maxillary dental arch, i.e., to the patient's occlusion, may be received. The occlusion describes the relationship between the maxillary and mandibular teeth, when these teeth approach each other, as occurs, e.g., during chewing or at rest. Static occlusion refers to contact between teeth when the lower jaw is closed and stationary relative to the upper jaw, while dynamic occlusion refers to occlusal contacts made when the lower jaw is moving relative to the upper jaw.

This additional data may be data acquired using a jaw movement registration system. The jaw movement registration system may be configured to record jaw motions and relative positions of a patient's jaws. The jaw movement registration system may comprise a face bow, e.g., a digital face bow. A face-bow refers to a dental instrument used in the field of prosthodontics, which is used recording and transferring relative positions of the patient's jaws. In case of a digital face bow the data may be recorded in digital form and transferred to program used for displaying and/or simulating the positions of the patient's jaws. The face bow may, e.g., be used to transfer a relationship of a patient's maxillary arch and temporomandibular joint. The acquired data regarding this relation, e.g., jaw motions and relative positions of a patient's jaws may be used to simulate a static and/or dynamic occlusion of the patient. For example, the data may be transferred to a virtual articulator. The virtual articulator may be used for simulating the static and/or dynamic occlusion of the patient. This simulation may, e.g., be executed using the data provided by the jaw movement registration system.

The 3D digital teeth model may further comprise soft tissue, like a gingiva, in addition to the hard tissue in form of the teeth, i.e., 3D digital teeth model may be provided in form of a 3D digital tissue model of at least a section of the patient's oral cavity. The 3D digital tissue model may be generated using scan data of the patient's oral cavity. For example, the patient's tissue in the oral cavity may be scanned using an intraoral scanner, e.g., an optical scanner. The achieved scan data may be used to provide the 3D digital tissue model of the scanned tissue of the oral cavity. For example, the upper and lower jaw, i.e., the mandibular dental arch and maxillary dental arch, are scanned in occlusion. Alternatively, an impression of the patient's tissue in the oral cavity, i.e., a negative imprint of hard and soft tissue may be taken. Either this impression may be scanned, e.g., using an optical scanner or the negative imprint provided by the impression may be used to generate a positive reproduction of the patient's tissue, i.e., a 3D physical tissue model or cast, which is scanned, e.g., by the optical scanner to provide the scan data used to generate the 3D digital tissue model.

In case the patient's tooth elements are not scanned intraorally, additional data regarding the relative position of the patient's mandibular dental arch to the maxillary dental arch, i.e., to the patient's occlusion, may be received. This additional data may be data acquired using a jaw movement registration system.

The surface area is offset from the tooth surface of the antagonist by adding an offset. The offset may, e.g., be added using an inflating of the antagonist. For example, the surface of the antagonist with the surface area to be offset, may be inflated as a whole. The inflated surface is offset relative to the un-inflated offset due to increase in size of the inflated antagonist. Thus, the inflating may result in offsetting the surface providing the offset surface area.

For example, a section of the tooth surface of the antagonist is segmented in order to provide the surface area to be offset and offset from the tooth surface. Then, the segmented surface area may be offset from the tooth surface of the antagonist by adding an offset.

The offset of the surface area of the antagonist, i.e., the antagonist-offset, may comprise a minimum thickness required for a pre-selected restoration material to be used for the dental restoration element. The minimum thickness may define a minimum value, which is required for the thickness of the restoration material in order to ensure a suitable structural stability and/or durability of the dental restoration element. The minimum thickness may, e.g., be required to achieve an intended color and/or degree of transparency of the dental restoration element. The minimum thickness may be a material specific thickness. The offset of the surface area may in addition comprise a depth of a pre-defined surface morphology of the dental restoration element. In order to implement a surface morphology on the surface of the dental restoration element fitting the patient's anatomical and/or aesthetical characteristics without coming into conflict with the minimum thickness, structural elements of the surface morphology, like, e.g., cusps, ridges, pits, grooves, and/or fissures, may be added on top of the minimum thickness. Thus, the depth of the pre-defined surface morphology may be taken into account by the offset in addition to the minimum thickness. The offset of the surface area may in addition comprise a thickness of a bonding material, e.g., dental cement, to be applied between the tooth element and the dental restoration element, in order to establish a bonding between the tooth element and the dental restoration element.

The resulting offset surface area is used as a definition of a limit, e.g., an occlusal limit, for the tooth element. It is checked for the clearance, whether the tooth element violates one or more penetration criteria regarding the offset surface area. If the tooth element violates the one or more penetration criteria, the clearance is assessed to be insufficient for the tooth element to be provided with the dental restoration element. The one or more penetration criteria may, e.g., require that no penetration occur. In this case any penetration may violate the penetration criteria. The one or more penetration criteria may, e.g., allow for penetrations to occur, but may define thresholds, e.g., regarding depth of the penetration, areal extension of the penetrations, and/or number of the penetrations. In case one of the thresholds is exceeded, the receptive penetration criterion may be violated.

Else, i.e., if no penetration occurs or only penetrations satisfying the one or more penetration criteria, the clearance is assessed to be sufficient for the tooth element to receive the dental restoration element.

The result of the assessment is provided as an output indicating the result of the assessment. The result may be output, e.g., on a graphical user interface displayed on a display. The output may comprise a visual representation of the 3D digital teeth model with the offset surface area. In case penetrations of the offset surface occur, e.g., the penetrations of the offset surface area by the 3D digital representation of the tooth element may be displayed by the visual representation. For example, such penetrations may be highlighted.

The result may be output, e.g., using an augmented reality device. For outputting the result, the augmented reality device may, e.g., comprise a head-mounted display, eyeglasses, a head-up display, a contact lens, a virtual retinal display, an eye tap, etc. The output may comprise a visual representation of the offset surface area. The augmented reality device project the offset surface area into a user's visual perception of the patient's teeth. The visual reception may comprise a visual reception of the physical tooth element as well as of the antagonist of the physical tooth element. The visual reception may, e.g., be overlaid with a projection of the offset surface area. In case penetrations of the offset surface occur, e.g., the penetrations of the offset surface area by the 3D digital representation of the tooth element may indicated by the output of the augmented reality device. For example, sections of physical tooth element corresponding to sections of the 3D digital representation of the tooth element penetrating the offset surface may be highlighted. For example, the respective, sections of physical tooth element may be highlighted by overlaying the same with a colored surface. For determining the position of the offset surface area relative to the physical antagonist, the physical antagonist may be visually captured, e.g., using a camera, and registered with a 3D digital antagonist model comprised by the 3D digital teeth model. For determining the position of the offset surface area relative to the physical tooth element, the physical tooth element may be visually captured, e.g., using a camera, and registered with a 3D digital model of the tooth element comprised by the 3D digital teeth model. Based on the position of the offset surface area relative the 3D digital antagonist model and/or the 3D digital model of the tooth element, the position of the offset surface to be projected by the augmented reality device relative to the physical antagonist and/or relative to the physical tooth element may be determined. For determining the relative position and/or for generating the visual representation of the offset surface area being projected, a computer device may be used. The computer device may be comprised by the augmented realty device or the augmented realty device may be in communication connection with the respective computer device.

The offset surface area defines a limit for the tooth element providing guidance regarding requirements of a preparation of the tooth element in order to prepare the tooth element to receive the dental restoration element. Thus, the projection of the offset surface area into a user's visual perception of the patient's teeth using the augmented reality device may provide the user with a guidance for the preparation of the tooth element, e.g., while preparing the tooth element for receiving the dental restoration element.

An augmented reality device is a device configured for annotating objects that reside in the real world in real time with information and/or projections of digital objects, while the real-world objects are perceived by a user of the augmented reality device. Thus, a user's perception of real-world objects is enhanced with information and/or projections of digital objects. Thus, an augmented reality device may be configured for implementing and or using: a combination of real-world objects with information and/or digital objects; a real-time interaction in form of a real-time adjusting of information and/or digital objects to changes of the real-word objects and/or to changes of the perception of real-word objects; and a 3D registration of virtual objects with real-world objects. The information and/or digital objects overlaid over the real-world objects may be constructive, e.g., being added to the real-world objects, or destructive, e.g., masking at least part of the rea-world objects. The information and/or digital objects may be seamlessly interwoven with the reception of the real-world objects, i.e., the physical objects of the physical world, such that they are perceived by the user as an immersive aspect of the real world. In this way, an augmented reality device may alter a user's ongoing perception of a real-world environment. This alternation does nor comprise a complete replacing of the user's real-world environment with a simulated digital environment, as it is the case with a virtual reality. The real-world environment, i.e., the user's perception of the real-world environment may be enhanced with the digital information and/or digital objects.

An augmented reality device may enable blending components of the digital world into a user's perception of the real world. This may comprise an integration of immersive sensations, which are perceived by the user as natural parts of the environment being perceived. Augmented reality may be used to enhance a user's perception of the physical environment with information and/or digital objects offering perceptually enriched experiences for the user. Using AR technologies, information about the surrounding real world of the user may become interactive and digitally manipulated. Information about the environment and its objects is may be overlaid on the real world. This information may be virtual. Augmented Reality may refer to any user experience which is artificial or real, by not perceivable by the user under normal circumstances, and adds to the user's perception of the existing reality. Augmentation techniques may be performed in real time and in semantic contexts with physical objects of the environment.

An augmented reality device may, e.g., comprise a head-mounted display, eyeglasses, a head-up display, a contact lens, a virtual retinal display, an eye tap, etc. A head-mounted display (HMD) refers to a display device worn on the forehead, such as, e.g., a harness or helmet-mounted. An HMD is configured for placing images of both the physical world and virtual objects over the user's field of view. The HMD may, e.g., employ sensors for six degrees of freedom monitoring that allow the system to align virtual information to the physical world and adjust accordingly with the user's head movements.

An augmented reality device may, e.g., comprise eyeglasses and with AR displays being rendered on the eyeglasses. The augmented reality device may comprise eyewear that employs cameras to intercept a user's real-world view and re-display an augmented view through an eyepiece. The augmented reality device may, e.g., project AR imagery through an eyewear lens piece or reflected off a surface of an eyewear lens piece.

An augmented reality device may, e.g., comprise a head-up display (HUD). A HUD is a transparent display that presents data without requiring users to look away from their usual viewpoints.

An augmented reality device may, e.g., comprise a contact lens that displays AR imaging. Such a bionic contact lens may comprise an element for display embedded into the lens including integrated circuitry, LEDs and an antenna for wireless communication.

An augmented reality device may, e.g., comprise a virtual retinal display (VRD). The augmented reality device may be configured to scan a display directly onto the retina of a user's eye.

An augmented reality device may, e.g., comprise a monocle-like head-mounted display that is worn in front of the eye and combines the functions of a camera and a display. Rays of light that would otherwise pass through the center of the lens of the user's eye may be captured and substituted with synthetic computer-controlled light for each ray of real light. The offset surface area defines a limit for the tooth element providing guidance regarding requirements of a preparation of the tooth element in order to prepare the tooth element to receive the dental restoration element. The offset surface area may thus provide an occlusal guiding surface based on an occlusal guiding offset added to the antagonist. The occlusal guiding surface may indicate a technically expected occlusal surface for a preparation of the tooth element. Thus, the occlusal guiding surface may be used to check, whether an existing preparation of the tooth element is sufficient for the dental restoration element intended to be arranged on the tooth element. The occlusal guiding surface may be used to indicate which preparation is required to be applied to the dental tooth element, in order to prepared the tooth element to receive the dental restoration element.

Examples may have the beneficial effect, that for assessing the clearance no further design steps regarding the 3D digital teeth model, like, e.g., selecting a preparation margin, placing a tooth, designing a dental restoration element, placing a dental restoration element, etc., may be required besides the offsetting of the surface area. It may be sufficient to just generate the occlusal limit for the tooth element by offsetting the surface area from a registered antagonist.

In case the clearance is insufficient, there may not be enough space for a dental restoration element with a thickness equal to or larger than a minimum thickness required for a selected restoration material. If there is not enough space between the tooth element and the antagonist, the offset surface may intersect the tooth element. In order to resolve this problem, e.g., the thickness of the dental restoration element and thus the offset may be reduced. Such a reduction may, e.g., be possible based on a selection of a different restoration material with a smaller minimum thickness. Using such a different restoration material may allow for a reduction of the thickness of the dental restoration element. In order to resolve this problem, e.g., the tooth element may be prepared or further prepared. For example, additional tissue may be removed from the tooth element reducing a height of the tooth element and thereby increasing the clearance between the tooth element and its antagonist. The preparation may be done on-the-fly. For example, the preparation may be done digitally and the result being checked. If the clearance due to the digital preparation of the 3D digital representation of the tooth element is sufficient, the digital preparation may be used as a template for a physical preparation of the tooth element. For example, the tooth element in the patient's oral cavity may be physically prepared and the result of the preparation re-scanned. The resulting scan data may be used to generate a 3D digital representation of the prepared tooth element. The 3D digital representation of the prepared tooth element may be used to check, whether the clearance between a prepared tooth element and an antagonist is sufficient for the dental restoration element to be arranged on the prepared tooth element.

Examples may have the beneficial effect, that the clearance may be checked before the tooth element is prepared and/or the dental restoration element is manufactured. Thus, e.g., a removal of tissue of the tooth element as part of preparing the tooth element for receiving the dental restoration element may be restricted to a necessary minimum. Thus, e.g., a manufacturing of a dental restoration for which there is not sufficient space between the tooth element and the antagonist may be avoided.

Examples may have the beneficial effect, that the assessing of the clearance may be used to select a restoration material for manufacturing the dental restoration element. For example, the clearance may be assed using an offset based on a first minimum thickness of a pre-selected or default restoration material. In case the clearance is assessed to be insufficient, a different restoration material may, e.g., be selected automatically such that the one or more penetration criteria for the clearance are satisfied. For example, an ordered list of restoration materials may be provided, in which the restoration materials are ordered according to their minimum thicknesses following an ascending or descending order. In order to automatically select a restoration material, following the list in descending order, e.g., the first restoration material may be chosen with a minimum thickness resulting in an offset that does not violate the one or more penetration criteria for the clearance.

Examples may have the beneficial effect, that the assessment of the clearance may be used for determining parameters for manufacturing the dental restoration element to be arranged on the tooth element and/or parameters for preparing the tooth element. A clearance may be suitable for arranging a dental restoration element on a tooth element, if there is enough space provided such that the dental restoration element fits between the tooth element and the antagonist. The fitting may be influenced by the thickness of the dental restoration material influencing the amount of space required as well as by the preparation of the tooth element influencing the amount of space provided of the clearance. Parameters for manufacturing the dental restoration element determined using the assessment of the clearance may, e.g., comprise a thickness of the dental restoration material and/or a restoration material assigned with a material specific minimum thickness. Parameters for preparing the tooth element determined using the assessment of the clearance may, e.g., comprise an occlusal limit of the tooth element and thus a maximum height of the tooth element.

A dental restoration element, like, e.g., a crown or onlay, may require a pre-defined restoration material depending minimum thickness to ensure a sufficient stability and durability of the dental restoration element. An assessment of the clearance between a tooth element, like, e.g., a tooth or tooth stump, and its antagonist may be used to ensure that the provided clearance is sufficient for arranging a dental restoration element on the tooth element, when designing such a dental restoration element and preparing the tooth element for receiving the dental restoration element. It may be ensured that the provided clearance is sufficient for the required minimum thickness of the dental restoration element. At the same time, it may be possible to minimize the degree of removal of tooth tissue, when preparing the tooth element. For example, it may be attempted to conserve a maximum degree of the natural tooth material of the patient.

Starting with a 3D model teeth model of a patient's dentition, e.g., based on an intraoral scan, an offset may be added to the antagonist, i.e., an antagonist-offset, of the tooth element, The tooth element may, e.g., be a prepared tooth element and/or a tooth element to be prepared. The offset added to the antagonist may comprise a pre-defined material depending minimum thickness required for the dental restoration element to be applied to the tooth element. The offset added to the antagonist may define a maximum occlusal limit of a preparation of the tooth element. It may, e.g., indicate a pre-defined material depending minimum thickness required for the dental restoration element being arranged between the tooth element and the dental restoration element. Thus, the assessment may provide a check, whether a given clearance between the tooth element and the antagonist is sufficient for the dental restoration element. In case the tooth element penetrates the offset of the antagonist, the clearance between the element and the antagonist may be insufficient for the dental restoration element with the pre-defined material depending minimum thickness.

A tooth element penetrating the antagonist-offset may, e.g., be resolved by selecting a different material with a smaller pre-defined minimum thickness or by reduce the tooth element, i.e., removing tissue from the tooth element by preparing the tooth element. For example, an alternative restoration material with a smaller minimum thickness may be automatically determined. For example, a preparation or an additional preparation of the tooth element with an additional removal of tissue may be suggested automatically.

Examples may have the beneficial effect, that by digitally assessing the clearance between a tooth element intended to be provided with a dental restoration element and an antagonist of the tooth element an unnecessary removal of sound tissue of the tooth element may be avoided. In case the clearance is assessed to be sufficient for the tooth element to receive the dental restoration element, no or no further preparation of the tooth element is required. Thus, a reliable assessment of the clearance and an indication that no further preparation is required may be provided.

In case the clearance is assessed to be insufficient for the tooth element to be provided with the dental restoration element, adjustments are required. For example, the tooth element may be prepared or further prepared. Thus, it may be ensured that any removal of sound tissue may only be executed based on a reliable assessment that it is necessary due to an insufficiency of the clearance.

Furthermore, in case the result of the assessment is output in form of a visual representation, e.g., using a graphical user interface provided on a display, the output may be used as a template for a further preparation of the tooth element. The visual representation may, e.g., comprise at least the 3D digital representation of the tooth element and the offset surface area. The offset surface area may illustrate an acceptable limit for the tooth element. In case this limit is violated, a preparation or further preparation of the tooth element may be required. For example, the visual representation may show, which sections of the tooth element penetrate the offset surface area. These sections, may, e.g., be removed by preparing or further preparing the tooth element. Depending on the one or more penetration criteria used for assessing the clearance, not all of the penetrations may violate the respective one or more penetration criteria. The visual representation may, e.g., indicate, e.g., highlight, such penetrations or sections of penetration, which violate the one or more penetration criteria. These highlighted penetrations or sections of penetration may, e.g., be removed by preparing or further preparing the tooth element.

The result may be output, e.g., using an augmented reality device. For outputting the result, the augmented reality device may, e.g., comprise a head-mounted display, eyeglasses, a head-up display, a contact lens, a virtual retinal display, an eye tap, etc. The output may comprise a visual representation of the offset surface area. The augmented reality device project the offset surface area into a user's visual perception of the patient's teeth. The visual reception may comprise a visual reception of the physical tooth element as well as of the antagonist of the physical tooth element. The visual reception may, e.g., be overlaid with a projection of the offset surface area. In case penetrations of the offset surface occur, e.g., the penetrations of the offset surface area by the 3D digital representation of the tooth element may indicated by the output of the augmented reality device. For example, sections of physical tooth element corresponding to sections of the 3D digital representation of the tooth element penetrating the offset surface may be highlighted. For example, the respective, sections of physical tooth element may be highlighted by overlaying the same with a colored surface. For determining the position of the offset surface area relative to the physical antagonist, the physical antagonist may be visually captured, e.g., using a camera, and registered with a 3D digital antagonist model comprised by the 3D digital teeth model. For determining the position of the offset surface area relative to the physical tooth element, the physical tooth element may be visually captured, e.g., using a camera, and registered with a 3D digital model of the tooth element comprised by the 3D digital teeth model. Based on the position of the offset surface area relative the 3D digital antagonist model and/or the 3D digital model of the tooth element, the position of the offset surface to be projected by the augmented reality device relative to the physical antagonist and/or relative to the physical tooth element may be determined. For determining the relative position and/or for generating the visual representation of the offset surface area being projected, a computer device may be used. The computer device may be comprised by the augmented realty device or the augmented realty device may be in communication connection with the respective computer device.

The offset surface area defines a limit for the tooth element providing guidance regarding requirements of a preparation of the tooth element in order to prepare the tooth element to receive the dental restoration element. Thus, the projection of the offset surface area into a user's visual perception of the patient's teeth using the augmented reality device may provide the user with a guidance for the preparation of the tooth element, e.g., while preparing the tooth element for receiving the dental restoration element.

The preparation may, e.g., be a digital preparation of the 3D digital representation of the tooth element. The preparation may, e.g., be physical preparation of the tooth element represented by the 3D digital representation provided by the 3D digital teeth model. After the preparation using the output assessment as a template, the result of the preparation may be checked. For example, the resulting clearance of the prepared tooth element may be re-assessed. In case of a digital preparation, the digitally prepared 3D digital representation of the tooth element may be re-assessed directly. In case of a physical preparation, the resulting prepared tooth element may be scanned and the scan data used for providing a 3D digital representation of the prepared tooth element for re-assessment.

Offsetting a surface area of an antagonist rather than a surface area of the tooth element in order to assess a clearance and/or provide a template for a preparation of the tooth element may have the beneficial effect, that the offset is independent of the preparation of the tooth element. For example, in case of an offsetting of a surface area of the tooth element, the offset has to be adjusted to the new position or even a new surface area resulting from the preparation. Since the antagonist is not affected by the preparation of the tooth element, the offset surface area is unaffected.

In order to resolve insufficiencies of the clearance, i.e., violations of the one or more penetration criteria, additionally or alternatively the offset used for offsetting the surface area of the antagonist may be adjusted, e.g., reduced. For example, the offset may resemble a material specific minimum thickness required for the restoration material of the dental restoration element in order to ensure a structural durability of the dental restoration element. By selecting an alternative restoration material with a smaller minimum thickness. Thus, the required minimum thickness of the dental restoration element and the offset may be reduced. By reducing the offset, any penetrations of the offset surface area by the tooth element may be reduced and thereby violations of the one or more penetration criteria.

For example, the offset may resemble a preferred thickness of the dental restoration element larger than a required material specific minimum thickness. The adjustment of the offset may comprise a reduction of the offset. The material specific minimum thickness may be used as an abortion criterion for the reduction of the offset. The offset may be reduced as far as required to resolve the violations of the one or more penetration criteria or the abortion criterion is reached.

Preparing a tooth element for receiving a dental restoration element may be relatively destructive, due to the removal of tissue in order to provide a sufficient clearance for the dental restoration element. However, it may be beneficial to save as much sound tooth tissue as possible. The more sound tissue is saved, the better the pulp of the tooth element has to be protected, e.g., against mechanical, thermal and chemical trauma. Thus, the preparation should, e.g., be as conservative as possible. At the same time, structural durability of the dental restoration element should be ensured, such that the dental restoration element last as long as possible. The dental restoration element provides protection of the tooth element. Furthermore, a replacement of a damaged dental restoration element may result in a further loss of tooth tissue, e.g., due to an additional preparation of the tooth. In order to last long, a dental restoration element may have to be made of enough restoration material to withstand normal masticatory function. For this purpose, a thickness of the restoration material may be required equal or larger than a restoration material depending minimum thickness. At the same time, the dental restoration element should be contained within the space created by the preparation of the tooth element, in order to avoid problems, e.g., arising with aesthetics and/or occlusal stability.

Thus, the preparation of the tooth element may be required to provide a clearance, which provides at least sufficient space for a restoration element with a restoration material depending minimum thickness. In particular, the occlusal preparation of the tooth element may be important. The occlusal preparation may be required to provide an occlusal clearance, i.e., a clearance between the prepared tooth element and an antagonist of the respective tooth element, such that a dental restoration with a sufficient thickness to ensure structural durability can be arranged on the prepared tooth element without causing conflicts with the antagonist. In particular, a correct interdigitation of dental restoration element arranged on the prepared tooth element and the antagonist may be ensured. Furthermore, an anatomically functional biting plane may be ensured.

Examples may have the beneficial effect, that by digitally assessing the clearance between a tooth element intended to be provided with a dental restoration element and an antagonist of the tooth element a remanufacturing of the dental restoration element may be avoided. Based on the assessment of the clearance it may be checked, whether the clearance provide enough space for the dental restoration element to be arranged between the tooth element and the antagonist. In case there is not enough space, an alternative restoration material may be chosen for manufacturing the dental restoration element, which requires a smaller minimum thickness. Thus, e.g., the dental restoration element may be adjusted to the clearance rather than further preparing the tooth element by removing more sound tooth tissue.

For example, the output comprises a visual representation of the 3D digital representation of the tooth element and the offset surface area. For example, the output comprises a visual representation of the 3D digital teeth model with the offset surface area.

Examples may have the beneficial effect, that the visual representation visually indicates, whether the clearance is sufficient. For example, sections of the tooth element violating one of the one or more penetration criteria may be highlighted. For example, sections of the tooth element penetrating the offset surface area may violate the one or more penetration criteria. The visual representation of the 3D digital representation of the tooth element and the offset surface area may, e.g., be output using a graphical user interface provided on a display. The visual representation may comprise the 3D digital teeth model with the offset surface. The 3D digital teeth model with the offset surface may, e.g., be output using a graphical user interface provided on a display.

The visual representation may, e.g., be used as a template for preparing or further preparing the tooth element. Preparing of the tooth element may, e.g., comprise removing those sections of the tooth element penetrating the offset surface area.

For example, the one or more penetration criteria comprise one or more of the following criteria: no penetration of the offset surface area by the tooth element; no penetration of the offset surface area by the tooth element within one or more predefined sections of the offset surface area; no penetration of the offset surface area by one or more predefined sections of the tooth element; no penetration of the offset surface area by the tooth element with a penetration depth exceeding a predefined first threshold; no penetration of the offset surface area by the tooth element with a size of a penetrated section of the offset surface area exceeding a predefined second threshold; no plurality of penetrations of the offset surface area by the tooth element with the number of penetrations of the plurality of penetrations exceeding a third threshold.

Examples may have the beneficial effect, that an efficient, objective and automated assessment of the clearance between the tooth element and the antagonist of the tooth element is provided. For example, a penetration criterion for assessing the clearance may be that no penetration of the offset surface area by the tooth element occur at all. In this case, the clearance may be assessed to be sufficient, if no penetrations are determined. In case a penetration is determined, the clearance is assessed to be insufficient. In order to resolve an insufficiency of the clearance, e.g., the sections penetrating the offset surface area may be removed and/or the offset may be reduced such that no penetrations are occurring anymore. A reduction of the offset may e.g., be based on a selection of an alternative restoration material with a smaller minimum thickness.

For example, local penetrations of the antagonist-offset may be allowed, in case they only occur within one or more predefined sections of the offset surface area. In this case, the clearance may be assessed to be sufficient, if no penetrations are determined outside the predefined sections of the offset surface area. In case a penetration of the offset surface area is determined outside the predefined sections, the clearance is assessed to be insufficient. In order to resolve an insufficiency of the clearance, e.g., the sections penetrating the offset surface area outside the predefined sections may be removed and/or the offset may be reduced such that no penetrations outside the predefined sections are occurring anymore. A reduction of the offset may, e.g., be based on a selection of an alternative restoration material with a smaller minimum thickness.

For example, local penetrations of the antagonist-offset may be allowed, in case they are not comprised by one or more predefined sections of the tooth element. In this case, the clearance may be assessed to be sufficient, if no penetrations by the predefined sections of the tooth element are determined. In case a penetration by one of the predefined sections of the tooth element is determined, the clearance is assessed to be insufficient. In order to resolve an insufficiency of the clearance, e.g., the predefined sections of the tooth element penetrating the offset surface area may be removed and/or the offset may be reduced such that no penetrations by the predefined sections of the tooth element are occurring anymore. A reduction of the offset may, e.g., be based on a selection of an alternative restoration material with a smaller minimum thickness.

For example, local penetrations of the antagonist-offset may be allowed, in case their depth, size and/or number do not exceed a pre-defined threshold. For example, local penetrations of the antagonist-offset may be allowed, in case they have a penetration depth exceeding a predefined first threshold. In this case, the clearance may be assessed to be sufficient, if no penetrations by the predefined sections of the tooth element are determined. In case a penetration with a penetration depth exceeding the first threshold is determined, the clearance is assessed to be insufficient. In order to resolve an insufficiency of the clearance, e.g., those parts of the penetrations exceeding the first threshold may be removed and/or the offset may be reduced such that all the penetration depths area are reduced to the first threshold or below. A reduction of the offset may, e.g., be based on a selection of an alternative restoration material with a smaller minimum thickness.

For example, local penetrations of the antagonist-offset may be allowed, in case the individual sizes of a penetrated sections of the offset surface area each do not exceeding a predefined second threshold. In this case, the clearance may be assessed to be sufficient, if no penetrations are determined with a size of the penetrated section of the offset surface area exceeding the second threshold. In case a penetration with a size of the penetrated section exceeding the second threshold is determined, the clearance is assessed to be insufficient. In order to resolve an insufficiency of the clearance, e.g., those penetrations exceeding the second threshold may be reduced by removing tissue removed that all the penetrated sections of the offset surface area violating the penetration criterion are reduced to the second threshold or below and/or the offset may be reduced such that all the penetrated sections of the offset surface area reduced to sizes equal the second threshold or below. A reduction of the offset may, e.g., be based on a selection of an alternative restoration material with a smaller minimum thickness.

For example, local penetrations of the antagonist-offset may be allowed, in case they the number of penetrations does not exceed a third threshold. In this case, the clearance may be assessed to be sufficient, if no penetrations are determined the number of penetrations exceeding the third threshold. In case the number of penetrations determined exceeds the third threshold, the clearance is assessed to be insufficient. In order to resolve an insufficiency of the clearance, e.g., one or more of the penetrations may be removed such that the number of penetrations is reduced to the third threshold or below and/or the offset may be reduced such that the number of penetrations reduced to the third threshold or below. A reduction of the offset may, e.g., be based on a selection of an alternative restoration material with a smaller minimum thickness.

For example, the 3D digital representation of the tooth element is at least partly digitally prepared for receiving the dental restoration element. Examples may have the beneficial effect, that a digital preparation of the tooth element may be checked, whether it is suitable for receiving the dental restoration element. The occlusal clearance provided by the preparation of the 3D digital representation of the tooth element may, e.g., follow the natural outline of the tooth element being digitally prepared, in order to avoid sections, where the occlusal clearance is too small to provide sufficient space for a dental restoration element with a minimum thickness. In case the clearance provided by the digitally prepared 3D digital representation of the tooth element is sufficient, it may be used as a template for a preparation of the physical tooth element of the patient. Otherwise, further adjustments of the 3D digital representation of the tooth element and/or the offset may be performed, until the resulting clearance is sufficient and may be used as a template for a preparation of the physical tooth element of the patient.

For example, the 3D digital representation of the tooth element resembles a current state of the tooth element. Examples may have the beneficial effect, that the current state of a tooth element may be checked, whether it is suitable for receiving the dental restoration element. In case the clearance provided by the current state of the tooth element is insufficient, the tooth element may, e.g., be prepared to satisfy the one or more penetration criteria. For example, the offset surface area may be used as a guiding surface for the preparation of the tooth element. After the preparation, the tooth element may be rescanned and reassessed in order to check, whether the clearance provided by the prepared tooth element actually satisfies the one or more penetration criteria.

For example, the current state of the tooth element is one of the following: at least partially prepared for receiving the dental restoration element; unprepared for receiving the dental restoration element.

Examples may have the beneficial effect, that for example an unprepared tooth element may be checked initially, whether the clearance is sufficient. In case, the clearance is insufficient, the tooth element may e.g., be prepared in order to satisfy the one or more penetration criteria. For example, the offset surface area may be used as a guiding surface for the preparation of the tooth element.

Examples may have the beneficial effect, that for example a tooth element at least partially prepared for receiving the dental restoration element may be checked initially, whether the clearance is sufficient. In case, the clearance is insufficient, the tooth element may, e.g., be further prepared in order to satisfy the one or more penetration criteria. For example, the offset surface area may be used as a guiding surface for the preparation of the tooth element.

For example, if the tooth element violates the one or more penetration criteria, the method further comprises adjusting the clearance by digitally preparing the tooth element. The preparing comprises removing one or more sections of the tooth element violating the one or more penetration criteria.

Examples may have the beneficial effect, that a preparation of the tooth element may be tested digitally, before the physical tooth element is prepared accordingly. Thus, e.g., an unnecessary removal of sound tooth tissue may be avoided. In case the digital preparation is sufficient to satisfy the one or more penetration criteria, the digital preparation may be used as a template for preparing the tooth element. In case the digital preparation is insufficient, it may be further adjusted and reassessed until, the digital preparation is sufficient and may be used as a template.

For example, the method comprises iteratively, e.g., on-the-fly, re-checking the clearance of the digitally prepared tooth element and further adjusting the clearance by digitally further preparing the digitally prepared tooth element, until the clearance of the digitally prepared tooth element is assessed to be sufficient for the tooth element to receive the dental restoration element.

Examples may have the beneficial effect, that a preparation of the tooth element resulting in a sufficient clearance may be iteratively, e.g., on-the-fly, approached. The resulting digitally prepared 3D digital representation of the tooth element, i.e., a 3D digital model of the preparation may be used as a template for preparing the tooth element in the oral cavity of the patient.

For example, if the tooth element violates the one or more penetration criteria, the method further comprises adjusting the offset of the offset surface by reducing the offset.

Examples may have the beneficial effect, that in order to satisfy the one or more penetration criteria, alternatively or additionally to a preparation of the tooth element to be provided with the dental restoration element, the offset may be adjusted. Since the offset resembles the space needed to provide the dental restoration element on the tooth element, an adjustment of the offset corresponds to and adjustment of the dental restoration element. For example, a thickness of the planned dental restoration element and thus the offset may be reduced. For example, a thickness of the dental restoration element may be chosen such that it at least corresponds to a restoration material specific minimum thickness required by a preselected restoration material in order to ensure a sufficient structural durability stability of the dental restoration element. In order to reduce the offset, e.g., an alternative restoration material with a smaller minimum thickness may be selected. Thus, the method may, e.g., be used for selecting a suitable restoration material for a given state of the tooth element.

A different restoration material with a suitable minimum thickness may, e.g., be selected such automatically. For example, an ordered list of restoration materials may be provided, in which the restoration materials are ordered according to their minimum thicknesses following an ascending or descending order. In order to automatically select a restoration material, following the list in descending order, e.g., the first restoration material may be chosen with a minimum thickness resulting in an offset that does not violate the one or more penetration criteria for the clearance.

For example, the amount of reduction of the offset is chosen such that the one or more previously violated penetration criteria is satisfied with the reduced offset. Examples may have the beneficial effect, that the violation of the one or more penetration criteria may be resolved by reducing the offset. The reduction of the offset may, e.g., be possible by selecting a different restoration material. The reduction of the offset may, e.g., be possible, when the offset is larger than a restoration material specific minimum thickness, thus enabling a reduction as long as the minimum thickness is preserved.

For example, the adjusting of the offset is executed iteratively, e.g., on-the-fly, by predefined amounts of reduction, until either the clearance for the reduced offset is assessed to be sufficient for the tooth element to receive the dental restoration element or a predefined maximum amount of reduction is reached.

Examples may have the beneficial effect, that the offset may be iteratively, e.g., on-the-fly, adjusted until either the one or more penetration criteria are satisfied and the clearance is assessed to be sufficient or until as threshold for the reduction of the offset is reached. The predefined amounts of reduction may, e.g., correspond to differences in the minimum thickness of different restoration materials. The maximum amount of reduction may, e.g., be based on the smallest restoration material specific minimum thickness of the restoration materials provided for selection. The threshold for the reduction of the offset may be provided by a threshold calculated using the smallest restoration material specific minimum thickness of the restoration materials provided for selection. For example, each of the reductions of the offset may be assigned to a different restoration material. In case the clearance for the reduced offset is assessed to be sufficient, a restoration material assigned to the reduced offset may be selected for manufacturing the dental restoration element. In case the clearance still violates the one or more penetration criteria after the maximum amount of reduction is reached, e.g., the tooth element may be additionally prepared in order to satisfy the one or more penetration criteria.

For example, the offset is reduced by the predefined maximum amount of reduction. The method further comprises re-checking the clearance using the offset surface area with the reduced offset. If the tooth element still violates the one or more penetration criteria for the reduced offset, the method further comprises adjusting the clearance by digitally preparing the tooth element. The preparing comprises removing one or more sections of the tooth element violating the one or more penetration criteria for the reduced offset.

Examples may have the beneficial effect, that in case a reduction of the offset is insufficient for satisfying the one or more penetration criteria additionally the tooth element may be prepared. Digitally preparing the tooth element may have the beneficial effect, that the preparation of the tooth element may be tested digitally, before the physical tooth element is prepared accordingly. Thus, e.g., an unnecessary removal of sound tooth tissue may be avoided. In case the digital preparation is sufficient to satisfy the one or more penetration criteria, the digital preparation may be used as a template for preparing the tooth element. In case the digital preparation is insufficient, it may be further adjusted and reassessed until, the digital preparation is sufficient and may be used as a template.

For example, the method further comprises iteratively, e.g., on-the-fly, re-checking the clearance of the digitally prepared tooth element and further adjusting the clearance by digitally further preparing the digitally prepared tooth element, until the clearance of the digitally prepared tooth element is assessed to be sufficient for the digitally prepared tooth element for receiving the dental restoration element.

Examples may have the beneficial effect, that a preparation of the tooth element resulting in a sufficient clearance may be iteratively, e.g., on-the-fly, approached. The resulting digitally prepared 3D digital representation of the tooth element, i.e., a 3D digital model of the preparation may be used as a template for preparing the tooth element in the oral cavity of the patient.

For example, if the tooth element violates the one or more penetration criteria, the method further comprises receiving an updated 3D digital teeth model. The updated 3D digital teeth model comprises an updated 3D digital representation of the tooth element. It is re-checked, whether the updated tooth element violates the one or more penetration criteria. If the updated tooth element violates the one or more penetration criteria, the clearance of the updated tooth element is assessed to be insufficient for the updated tooth element to be provided with the dental restoration element. Else the clearance of the updated tooth element is assessed to be sufficient for the tooth element to receive the dental restoration element. An output indicating the result of the assessment for the updated tooth element is provided.

Examples may have the beneficial effect, that the physical tooth element may be physically prepared in order to provide a sufficient clearance between the prepared tooth element intended and the antagonist of the tooth element. The physically prepared tooth element may be resembled by the updated 3D digital representation, which is used to digitally assess the clearance.

The 3D digital teeth model may be generated using scan data of the patient's oral cavity, after the tooth element has been prepared. For example, the patient's teeth in the oral cavity may be scanned using an intraoral scanner, e.g., an optical intraoral scanner. For example, the upper and lower jaw, i.e., the mandibular dental arch and maxillary dental arch, are scanned in occlusion. The achieved scan data may be used to provide the 3D digital teeth model of the scanned teeth of the oral cavity. Alternatively, an impression of the patient's teeth in the oral cavity, i.e., a negative imprint of the teeth may be taken. Either this impression may be scanned, e.g., using an optical scanner, or the negative imprint provided by the impression may be used to generate a positive reproduction of the patient's teeth, i.e., an updated 3D physical teeth model or cast, which is scanned, e.g., by the optical scanner to provide the scan data used to generate the updated 3D digital teeth model.

For example, the method further comprises iteratively, e.g., on-the-fly, receiving updated 3D digital teeth models with updated 3D digital representation of the tooth element and re-checking the clearance of the updated tooth element, until the clearance of the updated tooth element is assessed to be sufficient for the updated tooth element for receiving the dental restoration element.

Examples may have the beneficial effect, that the physical tooth element may prepared iteratively, e.g., on-the-fly, in order to provide a sufficient clearance between the prepared tooth element intended and the antagonist of the tooth element. For each step of iteration, the resulting physically prepared tooth element may be resembled by an updated 3D digital representation, which is used to digitally assess the clearance. Thus, for each step of iteration, it may be assessed, whether the clearance is sufficient, until a step is reach for which the clearance is assessed to be sufficient.

For example, the 3D digital teeth model comprises a 3D digital representation of the antagonist. For example, the 3D digital teeth model further comprises a first set of teeth of a first dental arch. The first dental arch comprises the tooth element. For example, the first dental arch is one of the following: a maxillary dental arch, a mandibular dental arch. For example, the 3D digital teeth model further comprises a 3D digital representation of a second set of teeth of a second dental arch. The second dental arch comprises the antagonist of the tooth element. For example, the first dental arch is one of the following: a mandibular dental arch, a maxillary dental arch.

For example, the 3D digital teeth model is a 3D digital teeth model resembling a current state of a dentition of a patient. Examples may have the beneficial effect, that the clearance as provided by the current state of the dentition of a patient is assessed. The tooth element intended to be provided with a dental restoration element as comprised by the current state of the dentition may be prepared or unprepared for receiving the dental restoration element.

For example, the offset comprises a pre-defined restoration material depending minimum thickness required for a restoration material selected for the dental restoration element. Examples may have the beneficial effect, that by taking into account a restoration material depending thickness, it may be ensured that the clearance being assessed to be sufficient provides sufficient space for arranging a dental retorsion element on the tooth element with a thickness corresponding to the pre-defined restoration material depending minimum thickness required for a restoration material selected for the dental restoration element. Using a dental restoration element with a thickness complying with a restoration material depending minimum thickness required for a restoration material selected for manufacturing the dental restoration element may ensure that the dental restoration element has a sufficient structural durability and stability.

For example, the method further comprises providing a set of selectable restoration materials for manufacturing the dental restoration element. Each of the selectable restoration materials is assigned with a pre-defined restoration material depending minimum thickness required for the respective restoration material. A restoration material is selected for the dental restoration element from the set of selectable restoration materials for the dental restoration element.

Examples may have the beneficial effect, that the set of selectable restoration materials may be used to select a restoration material and generate the offset using the pre-defined restoration material depending minimum thickness assigned to the selected restoration material. The set of selectable restoration materials may, e.g., be provided in form of an ordered list of restoration materials, in which the restoration materials are ordered according to their minimum thicknesses following an ascending or descending order. The set of selectable restoration materials may further be used to generate adjustments of the offset, i.e., reduced offsets. Furthermore, the set of selectable restoration materials may be used to automatically select a restoration material. In case the clearance is assessed to be insufficient, e.g., following the list in descending order, e.g., the first restoration material may be chosen with a minimum thickness resulting in an offset that does not violate the one or more penetration criteria for the clearance.

For example, the offset comprises a depth of a pre-defined surface morphology assigned to the dental restoration element.

Examples may have the beneficial effect, that in addition a surface morphology of the dental restoration element may be taken into account, when assessing the clearance. The pre-defined surface morphology may, e.g., define structural features of an occlusal surface of the restoration element, like pre-defined depths of fissures in the occlusal surface. In order to implement a surface morphology on the surface of the dental restoration element fitting the patient's anatomical and/or aesthetical characteristics without coming into conflict with the minimum thickness, structural elements of the surface morphology, like, e.g., cusps, ridges, pits, grooves, and/or fissures, may be added on top of the minimum thickness. Thus, the depth of the pre-defined surface morphology may be taken into account by the offset in addition to the minimum thickness.

The offset of the surface area may in addition, e.g., comprise a thickness of a bonding material, e.g., dental cement, to be applied between the tooth element and the dental restoration element, in order to establish a bonding between the tooth element and the dental restoration element.

For example, the surface area being offset is an occlusal surface area defined by an occlusal tooth surface of the antagonist. The offset occlusal surface area defines an occlusal limit for the tooth element. For example, the offset occlusal surface area is offset from the tooth surface of the antagonist by adding the offset in a direction towards the tooth element.

For example, the direction, in which the offset is added, is a direction perpendicular to an occlusal plane of the dentition of the patient.

For example, the clearance is assessed with the maxilla and mandible of the patient being in occlusion. Thus, the relative position of the tooth element and the antagonist, for which the clearance is assessed, may be the tooth element and the antagonist in occlusion.

For example, the occlusal surface area is the occlusal tooth surface of the antagonist with a position of the antagonist relative to the tooth element being defined by an occlusion of the maxilla and mandible of the patient. Examples may have the beneficial effect, that the clearance assessed with the maxilla and mandible of the patient and thus the tooth element and the antagonist being in occlusion.

For example, the occlusion is one of the following: a static occlusion, a centric occlusion.

Occlusion refers to the contact between teeth. It describes the relationship between the maxillary and mandibular teeth when they contacting each other, as occurs during chewing or at rest. Static occlusion refers to contact between teeth when the jaw is closed and stationary, while dynamic occlusion refers to occlusal contacts made when the jaw is moving.

Centric occlusion refers to a static occlusion with complete intercuspation, i.e., meshing together of the cusps, of the opposing teeth, also known as maximum intercuspation (MIP).

The teeth are in maximum intercuspation in centric relation. Centric relation describes a reproducible jaw relationship between the mandible and maxilla and is independent of tooth contact. Centric relation is the position in which the mandibular condyles are located in the fossae in an anterosuperior position against the posterior slope of the articular eminence.

The antagonist-offset may, e.g., be a static offset of the antagonist. A static offset is an offset added to the antagonist in a predefined static position of the antagonist relative to the tooth element.

For example, the occlusal surface area is a surface area defined by a dynamic occlusion. The occlusal surface area comprises those points in space relative to the tooth element which are reached by the occlusal tooth surface of the antagonist during dynamic occlusion and which in occlusal direction towards the tooth element have a smallest distance to the tooth element.

Examples may have the beneficial effect, that the clearance is not only assessed for a static relation between the patient's mandible and maxilla, but rather all dynamic relation which may occur, e.g., during chewing. In this case, first the occlusal surface area may be defined by the dynamic occlusion. Then the offset surface area in form of the offset occlusal surface area may be defined by offsetting the dynamical occlusal surface area. This means first simulating dynamic occlusion, then offsetting.

For example, the dynamic occlusion of the occlusal tooth surface of the antagonist is simulated using one or more of the following: a jaw movement registration system, a virtual articulator. A jaw movement registration system is configured to acquire jaw movement registration data describing jaw movements and/or positions of the jaws of a patient. The jaw movement registration data may, e.g., be acquired using a digital face bow. The jaw movement registration data may be used to simulate jaw movements of the patient. Alternatively or additionally, a virtual articulator may be used to simulate jaw movements of the patient. For example, the jaw movement registration data may be used to define movements of a virtual articulator, in order to simulate jaw movements of the patient and, in particular, the dynamic occlusion.

For example, the virtual articulator may be used in addition to the jaw movement registration system. The jaw movement registration data acquired by the jaw movement registration system may thus be used to define movements of the virtual articulator, in order to simulate jaw movements of the patient and, in particular, the dynamic occlusion.

For example, the occlusal surface area is the occlusal tooth surface of the antagonist. The offset occlusal surface area is a surface area defined by a dynamic occlusion using the offset occlusal tooth surface of the antagonist. The offset occlusal surface area comprises those points in space relative to the tooth element which are reached by the offset occlusal tooth surface of the antagonist during dynamic occlusion and which in occlusal direction towards the tooth element have a smallest distance to the tooth element.

Examples may have the beneficial effect, that the clearance is not only assessed for a static relation between the patient's mandible and maxilla, but rather all dynamic relation which may occur, e.g., during chewing. In this case, first the offset may be implemented by offsetting the occlusal tooth surface of the antagonist. Then, the offset occlusal surface area is defined by taking into account the dynamic occlusion for the offset occlusal tooth surface of the antagonist. This means first offsetting, then simulating dynamic occlusion.

For example, the dynamic occlusion of the offset occlusal tooth surface of the antagonist is simulated using one or more of the following: the jaw movement registration system, the virtual articulator. A jaw movement registration system is configured to acquire jaw movement registration data describing jaw movements and/or positions of the jaws of a patient. The jaw movement registration data may, e.g., be acquired using a digital face bow. The jaw movement registration data may be used to simulate jaw movements of the patient. Alternatively or additionally, a virtual articulator may be used to simulate jaw movements of the patient. For example, the jaw movement registration data may be used to define movements of a virtual articulator, in order to simulate jaw movements of the patient and, in particular, the dynamic occlusion.

For example, the virtual articulator may be used in addition to the jaw movement registration system. The jaw movement registration data acquired by the jaw movement registration system may thus be used to define movements of the virtual articulator, in order to simulate jaw movements of the patient and, in particular, the dynamic occlusion.

The antagonist-offset may, e.g., be a dynamic offset defined by a shell surface, i.e., a virtual imprint, covering the space, within which the antagonist is moved, e.g., during chewing. For example, the shell surface may be determined for the antagonist without offset and the offset may be added to the shell surface, i.e., the occlusal surface area. Alternatively, the offset may be added to the antagonist and the shell surface defined by movements of the antagonist with the offset. The movement of the antagonist may be a movement executed using a virtual articulator or defined by scan data of movement of the jaws of the patient and/or the jaw motion system.

Thus, there may be two alternative ways for determining the dynamic offset: offset the antagonist and generate the virtual imprint in form of the shell surface, or generate the virtual imprint and then offset it.

For example, the offsetting of the surface area from the tooth surface of the antagonist comprises inflating the antagonist with the tooth surface area of the inflated antagonist defining the offset surface area. Examples may have the beneficial effect, that the inflated tooth surface of the antagonist is used to define the offset surface area.

For example, one or more neighboring teeth, e.g., distal or mesial, of the tooth element may be taken into account as well. For example, an offset may be added to each of the one or more neighboring teeth. The offsets added to the neighboring teeth may define distal and/or mesial limits of a preparation of the tooth element. In addition, a clearance between the tooth element intended to be provided with the dental restoration element and each of the one or more neighboring teeth may be assessed as the clearance between the tooth element and the antagonist is assessed. The clearances between the tooth element and each of the one or more neighboring teeth may be taken into account additionally for the preparation of the tooth element and/or the selection of the restoration material. For example, it may be ensured that the dental restoration element has a restoration material specific minimum thickness in sections arranged between the tooth element and the one or more neighboring teeth as well. The offset is added to the respective neighboring tooth. The offsetting, i.e., the definition of an additional offset surface area between the neighboring tooth and tooth element, may be implemented by offsetting a surface area of the neighboring tooth facing tooth element using a predefined offset. For example, the neighboring tooth is inflated.

It is checked for the additional clearance between the tooth element and the neighboring tooth, whether the tooth element violates one or more penetration criteria regarding the offset surface area. If the tooth element violates the one or more penetration criteria, the additional clearance is assessed to be insufficient for the tooth element to be provided with the dental restoration element. Else the additional clearance is assessed to be sufficient for the tooth element to receive the dental restoration element. An output is provided indicating the result of the additional assessment. The output may, e.g., comprise a visual representation of the 3D digital teeth model with the additional one or more offset surface areas of the one or more neighboring teeth. In case the additional one or more clearances are assessed to be insufficient, the tooth element may be prepared and/or the offset may be adjusted, i.e., the dental restoration element intended to be arranged on the tooth element may be adjusted, such that the clearance due to the preparation and/or adjustment is assessed to be sufficient.

For example, the method further comprises generating a 3D digital restoration model of the dental restoration element using the 3D digital teeth model with the offset surface area, for which the clearance is assessed to be sufficient for the tooth element to be provided with the dental restoration element. The 3D digital restoration model is provided as template for manufacturing the dental restoration element.

Examples may have the beneficial effect, that a 3D digital restoration model of a dental restoration element may be generated that fits between the tooth element and the antagonist. The 3D digital restoration model may be generated in response to the clearance being assessed to be sufficient for the dental restoration element to be arranged on the tooth element. For generating the 3D digital restoration model a preparation of the tooth element and/or a selection of a restoration material with a restoration material specific minimum thickness may be taken into account. The 3D digital restoration model may further be configured fit anatomically and aesthetically to the dentition of the patient resembled at least partly by the 3D digital teeth model of the patient. For example, the 3D digital restoration model may be generated using the 3D digital representation of the tooth element, for which the clearance has been assessed to be sufficient. For example, the 3D digital restoration model may be generated from scratch. For example, the 3D digital restoration model may be generated using a 3D digital representation of a neighboring tooth or a 3D digital representation of the antagonist of the tooth element, on which the dental restoration element defined by the 3D digital restoration model is to be arranged. The 3D digital representation of a neighboring tooth or the 3D digital representation of the antagonist of the tooth element may be used as a digital template for the 3D digital restoration model, which is adjusted, e.g., in shape and size to be used as the dental restoration element. For example, the 3D digital restoration model may be selected from a library of dental restoration element and adjusted, e.g., in shape and size to the individual anatomical and/or aesthetical requirements defined by the 3D digital teeth model. For example, the 3D digital restoration model may be generated using a 3D digital restoration model of an artificial tooth selected from a library of artificial teeth. The selected artificial tooth may, e.g., be adjusted, e.g., in shape and size to the individual anatomical and/or aesthetical requirements defined by the 3D digital teeth model.

For example, an occlusal section of the generated 3D digital restoration model comprises the pre-defined restoration material depending minimum thickness required for a restoration material selected for the dental restoration element. Examples may have the beneficial effect, that a sufficient structural durability and stability of the dental restoration element may be ensured.

For example, all sections of the generated 3D digital restoration model may comprise the pre-defined restoration material depending minimum thickness required for a restoration material selected for the dental restoration element.

For example, the method further comprises manufacturing the dental restoration element using the 3D digital restoration model as template. The manufactured dental restoration element is a physical copy of the respective template. Examples may have the beneficial effect, that a physical dental restoration element may be provided to be arranged on the tooth element. The physical dental restoration element may be configured to fit into the clearance provided between the tooth element and the antagonist.

Assessing the clearance before manufacturing the dental restoration element may reduce the risk, that the dental restoration element may have to be re-manufactured due to problems fitting the dental restoration element into the clearance.

For example, the dental restoration element is manufactured using one of the following: machining, 3D printing, casting.

Examples may have the beneficial effect, that the dental restoration element may be manufactured using a machining device configured to manufacture the dental restoration element by processing a blank of restoration material. The resulting dental restoration element may be configured to be arranged onto the tooth element. For example, the dental restoration element may be manufactured using a 3D printing device, i.e., a printer, configured to print the dental restoration element. The resulting dental restoration element may be configured to be arranged onto the tooth element.

For example, the 3D digital restoration model may be used as a positive to define a negative of the physical dental restoration element in form of a negative 3D digital restoration model. The negative 3D digital restoration model may be used to manufacture, e.g., using machining or 3D printing, a casting matrix. The casting matrix may be configured for casting the physical dental restoration element by inserting restoration material into the casting matrix and curing the inserted restoration material. The resulting dental restoration element may be configured to be arranged onto the tooth element.

For example, the method further comprises using a trained machine learning module for generating the 3D digital restoration model. The trained machine learning module is configured to provide the 3D digital restoration model as output in response to receiving the 3D digital teeth model with the tooth element and the offset surface area as input.

Examples may have the beneficial effect, that the trained machine learning module may be used for generating the 3D digital restoration model. The 3D digital restoration model is provided as output by the trained machine learning module in response to receiving the 3D digital teeth model with the tooth element and the offset surface area as input. The 3D digital restoration model as output may define a dental restoration element configured to fit into a clearance between the tooth element and an antagonist.

For example, the input further comprises the pre-defined restoration material depending minimum thickness required for the restoration material selected for the dental restoration element.

Examples may have the beneficial effect, that the pre-defined restoration material depending minimum thickness of the dental restoration element may be taken into account as well.

For example, the trained machine learning module may in addition provide a recommendation for a preparation of the tooth element and/or for a restoration material to be used for manufacturing the dental restoration element as output, in order to satisfy the one or more penetration criteria.

For example, the method further comprises providing the trained machine learning module.

The providing of the trained machine learning module comprises providing a machine learning module to be trained. A set of training datasets is provided for training the machine learning module to be trained. Each training dataset comprises a 3D digital training teeth model with a training tooth element as well as a training offset surface area and a 3D digital training restoration model. The machine learning module to be trained is trained to provide the 3D digital training restoration models of the training datasets as an output in response to receiving the 3D digital training teeth models and the training offset surface areas of the respective training datasets as input.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning.

For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

Examples may have the beneficial effect, that by training the machine learning module to be trained, the machine learning module may be configured to provide the 3D digital restoration model as output in response to receiving the 3D digital teeth model with the tooth element and the offset occlusal surface area as input. In order to achieve this goal, a set, i.e., a plurality, of suitable training datasets may be provided. Each of the training datasets may comprise a 3D digital training teeth model with a training tooth element as well as a training offset surface area defining the input and a 3D digital training restoration model defining the output to be provided by the machine learning module.

Thus, the resulting trained machine learning module may be configured to provide a 3D digital restoration model as output in response to the 3D digital teeth model with a tooth element as well as an offset surface area as input.

For example, the training datasets further comprise a pre-defined restoration material depending training minimum thickness. The input for training the machine learning module to be trained further comprises the pre-defined restoration material depending training minimum thickness of the respective training datasets.

Examples may have the beneficial effect, that the machine learning module may be further trained to take a restoration material depending minimum thickness into account, when providing a 3D digital restoration model as output.

For example, the training datasets further comprise a 3D digital representation of a training preparation of the tooth element and/or an identifier of a training restoration material to be used for manufacturing the dental restoration element defined by the 3D digital training restoration model. The output for training the machine learning module to be trained may further comprise the 3D digital representation of a training preparation of the tooth element and/or the identifier of a training restoration material to be used for manufacturing the dental restoration element defined by the 3D digital training restoration model of the respective training datasets.

Examples may have the beneficial effect, that the machine learning module may be further trained to provide a 3D digital representation of a preparation of the tooth element and/or an identifier of a restoration material to be used for manufacturing the dental restoration element defined by the 3D digital restoration model as output.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning may be performed using a learning algorithm such as supervised or unsupervised learning.

The machine learning may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a 3D digital restoration model, a 3D digital representation of a preparation of the tooth element and/or an identifier of a restoration material to be used for manufacturing a dental restoration element defined by the 3D digital restoration model as output by the trained machine learning module. The trained machine learning module may predict the unmeasured value from other, known values, e.g., a 3D digital teeth model with the tooth element and the offset occlusal surface area as input. Furthermore, e.g., a pre-defined restoration material depending minimum thickness required for the restoration material selected for the dental restoration element may be provided as additional input. According to an example, the machine learning module comprises a deep learning model.

For example, the tooth element may, e.g., be one of the following: a damaged tooth, a tooth stump.

For example, the dental restoration element is one of the following: a crown, a veneer, an inlay, an onlay, an overlay.

In case of a crown, the crown may, e.g., be a full crown, a ⅞ crown or a ¾ crown. ⅞ and ¾ crowns hybrids between an onlay and a full crown. Such partial crowns are categorized based on an estimated wall coverage of the walls of the tooth or tooth stump, on which the respective crown is arranged. For example, a ¾ crown aims to cover three thirds of the walls of the tooth to be restored, e.g., three out of the four walls, e.g., with the buccal wall being spared. For example, a ⅞ crown aims to cover seven eights of the walls of the tooth to be restored.

A veneer is layer of material placed on a tooth, in order to cover one or more surfaces of the tooth. Indirect veneers are manufactured outside of a patient's oral cavity and then arranged on a tooth within the oral cavity. Direct veneers are built directly within the patient's oral cavity. The tooth may be prepared for receiving the veneer.

Inlays, onlays, and overlays are forms of indirect restoration manufactured outside of a patient's oral cavity as a single, solid piece that fits a specific size and shape of a reception prepared within a tooth of the oral cavity. The inlay, onlay, or overlay is arranged within the respective reception and bonded, e.g., cemented, in place on the prepared tooth. In contrary to a crown, inlays, onlays, and overlays are arranged within a reception prepared within a damaged tooth. The inlays, onlays, and overlays may, e.g., be configured as pinlays.

An inlay is configured to cover an inner, e.g., central, section of an occlusal surface of a tooth. Thus, an inlay may be used to replace an internal part of a damaged tooth and cover part of the occlusal surface of the respective tooth. The inlay is positioned within hard tissues of the tooth, but does not cover a cusp or pointed part of the tooth. In comparison to an inlay, an onlay in addition covers at least one of the cusps of the tooth. In comparison to an onlay, an overlay covers a larger portion of the occlusal surface of the tooth extending beyond the cusps. Pinlays are characterized by an additional use of pins to increase their retention. Thus, any inlay, onlay, or overlay may be configured as a pinlay by being braced by pins. Such a pin may, e.g., be inserted at an edge of the tooth or parallel to a groove. In general, the base of a pin is selected to lie in a section of the tooth surface that is free of damage.

In another aspect, the invention relates to a computer program product for assessing a clearance between a tooth element intended to be provided with a dental restoration element and an antagonist of the tooth element. The computer program product comprises a computer readable storage medium having program instructions embodied therewith.

The program instructions being executable by a processor of a computer device to cause the computer device to receive a 3D teeth digital model. The 3D digital teeth model comprises 3D digital representations of the tooth element and of a surface area defined by a tooth surface of the antagonist. The surface area is offset from the tooth surface of the antagonist by adding an offset. The resulting offset surface area defines a limit for the tooth element. It is checked for the clearance, whether the tooth element violates one or more penetration criteria regarding the offset surface area. If the tooth element violates the one or more penetration criteria, the clearance is assessed to be insufficient for the tooth element to be provided with the dental restoration element. Else the clearance is assessed to be sufficient for the tooth element to receive the dental restoration element. The result of the assessment is provided as an output indicating the result of the assessment.

The program instructions provided by the computer program product may be configured for causing the computer device to execute any of the aforementioned methods for assessing a clearance between a tooth element and an antagonist of the tooth element.

In another aspect, the invention relates to a computer device for assessing a clearance between a tooth element intended to be provided with a dental restoration element and an antagonist of the tooth element. The computer device comprises a processor and a memory storing program instructions executable by the processor.

Execution of the program instructions by the processor causing the computer device to receive a 3D digital teeth model. The 3D digital teeth model comprises 3D digital representations of the tooth element and of a surface area defined by a tooth surface of the antagonist. The surface area is offset from the tooth surface of the antagonist by adding an offset. The resulting offset surface area defines a limit for the tooth element. It is checked for the clearance, whether the tooth element violates one or more penetration criteria regarding the offset surface area. If the tooth element violates the one or more penetration criteria, the clearance is assessed to be insufficient for the tooth element to be provided with the dental restoration element. Else the clearance is assessed to be sufficient for the tooth element to receive the dental restoration element. The result of the assessment is provided as an output indicating the result of the assessment.

The computer device may be configured for executing any of the aforementioned methods for assessing a clearance between a tooth element and an antagonist of the tooth element.

In another aspect, the invention relates to a manufacturing system comprising the computer device for assessing a clearance between a tooth element intended to be provided with a dental restoration element and an antagonist of the tooth element. The manufacturing system further comprises a manufacturing device configured to manufacture the dental restoration element.

Execution of the program instructions by the processor further causes the computer device to generate a 3D digital restoration model of the dental restoration element using the 3D digital teeth model with the offset surface area, for which the clearance is assessed to be sufficient for the tooth element to be provided with the dental restoration element. Execution of the program instructions by the processor further causes the computer device to control the manufacturing device to manufacture the dental restoration element using the 3D digital restoration model as template. The manufactured dental restoration element is a physical copy of the respective template.

The manufacturing system may be configured for manufacturing any of the aforementioned examples of a restoration element.

For example, the manufacturing system comprising at least one of the following: a machining device, a 3D printing device.

The above-described examples and embodiments may be combined freely as long as the combinations are not mutually exclusive.

In the following, embodiments of the invention are described in greater detail in which FIG. 1 shows an exemplary offsetting of a surface area of an antagonist;

In the following similar features are denoted by the same reference numerals.

Figure 1:
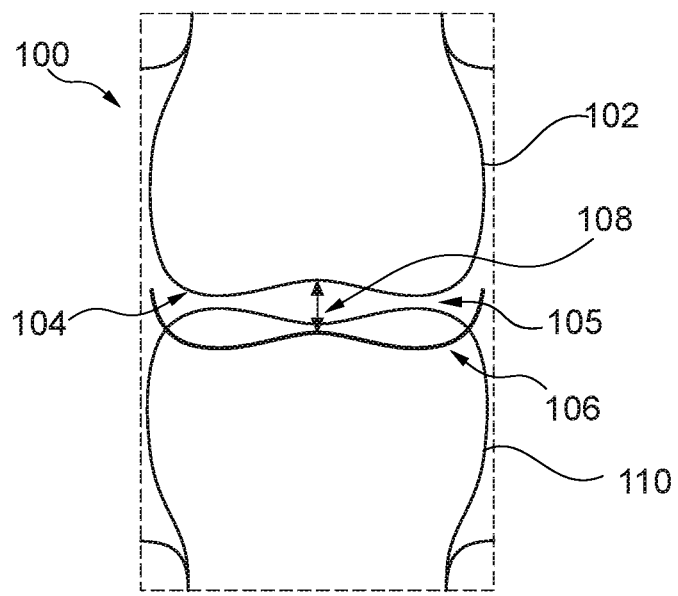

FIG. 1 shows a cross-sectional view of an exemplary 3D digital teeth model 100. The 3D digital teeth model 100 comprises a 3D digital representation of a tooth element 110 as well as a 3D digital representation of an antagonist 102 of the tooth element represented by the 3D digital representation 110. The tooth element represented by the 3D digital representation 110 is intended to be provided with a dental restoration element, but may be unprepared for receiving the dental restoration element. Between the tooth element represented by the 3D digital representation 110 and the antagonist represented by the 3D digital representation 102 there is a clearance 105.

The 3D digital teeth model 100 may be generated using scan data of the patient's oral cavity.

For example, the patient's teeth in the oral cavity may be scanned using an intraoral scanner, e.g., an optical intraoral scanner. For example, the upper and lower jaw, i.e., the mandibular dental arch and maxillary dental arch, are scanned in occlusion. The achieved scan data may be used to provide the 3D digital teeth model 100 of the scanned teeth of the oral cavity. Alternatively, an impression of the patient's teeth in the oral cavity, i.e., a negative imprint of the teeth may be taken. Either this impression may be scanned, e.g., using an optical scanner, or the negative imprint provided by the impression may be used to generate a positive reproduction of the patient's teeth, i.e., a 3D physical teeth model or cast, which is scanned, e.g., by the optical scanner to provide the scan data used to generate the 3D digital teeth model 100.

In order to assess the clearance 105, i.e., in order to check, whether clearance 105 is sufficient for the dental restoration element to be arranged on the tooth element represented by the 3D digital representation 110, an offset surface area offset from the antagonist represented by the 3D digital representation 102 is generated. The antagonist represented by the 3D digital representation 102 comprises a tooth surface 104 of the antagonist. In FIG. 1, the tooth surface 104 is an occlusal surface of the antagonist. A surface area is offset from the tooth surface 104 of the antagonist by adding an offset 108 resulting in the offset surface area 106 for assessing the clearance 105. The tooth element represented by the 3D digital representation 110 and the antagonist represented by the 3D digital representation 102 may be arrange in a static occlusion for offsetting the surface area and assessing the clearance 105. The offset surface area 106 defines a limit, e.g., an occlusal limit, for the tooth element represented by the 3D digital representation 110.

In order to assess the clearance 105, it may be checked for the clearance 105, whether the tooth element represented by the 3D digital representation 110 violates one or more penetration criteria regarding the offset surface area 106. The one or more penetration criteria may comprise one or more of the following criteria: no penetration of the offset surface area 106 by the tooth element represented by the 3D digital representation 110; no penetration of the offset surface area 106 by the tooth element represented by the 3D digital representation 110 within one or more predefined sections of the offset surface area 106; no penetration of the offset surface area 106 by one or more predefined sections of the tooth element represented by the 3D digital representation 110; no penetration of the offset surface area 106 by the tooth element represented by the 3D digital representation 110 with a penetration depth exceeding a predefined first threshold; no penetration of the offset surface area 106 by the tooth element represented by the 3D digital representation 110 with a size of a penetrated section of the offset surface area 106 exceeding a predefined second threshold; no plurality of penetrations of the offset surface area 106 by the tooth element represented by the 3D digital representation 110 with the number of penetrations of the plurality of penetrations exceeding a third threshold.

If the tooth element represented by the 3D digital representation 110 violates the one or more penetration criteria, the clearance 105 is assessed to be insufficient for the tooth element represented by the 3D digital representation 110 to be provided with the dental restoration element. Else the clearance is assessed to be sufficient for the tooth element represented by the 3D digital representation 110 for receiving the dental restoration element. An output may be provided, which indicates the result of the assessment. The output may, e.g., comprise a visual representation of the 3D digital representation of the tooth element 110 and of the offset surface area 106 as shown in FIG. 1. The visual representation may for example be provided using a graphical user interface on a display.

The result may be output, e.g., using an augmented reality device. For outputting the result, the augmented reality device may, e.g., comprise a head-mounted display, eyeglasses, a head-up display, a contact lens, a virtual retinal display, an eye tap, etc. The output may comprise a visual representation of the offset surface area 106. The augmented reality device project the offset surface area 106 into a user's visual perception of the patient's teeth. The visual reception may comprise a visual reception of the physical tooth element as well as of the antagonist of the physical tooth element. The visual reception may, e.g., be overlaid with a projection of the offset surface area 106. In case penetrations of the offset surface occur, e.g., the penetrations of the offset surface area 106 by the 3D digital representation of the tooth element may indicated by the output of the augmented reality device. For example, sections of physical tooth element corresponding to sections of the 3D digital representation of the tooth element penetrating the offset surface may be highlighted. For example, the respective, sections of physical tooth element may be highlighted by overlaying the same with a colored surface. For determining the position of the offset surface area 106 relative to the physical antagonist, the physical antagonist may be visually captured, e.g., using a camera, and registered with a 3D digital antagonist model, i.e., the 3D digital representation 102 of the antagonist, comprised by the 3D digital teeth model 100. For determining the position of the offset surface area 106 relative to the physical tooth element, the physical tooth element may be visually captured, e.g., using a camera, and registered with a 3D digital model of the tooth element, i.e., the 3D digital representation 110 of the tooth element, comprised by the 3D digital teeth model 100.

Based on the position of the offset surface area 106 relative the 3D digital antagonist model 102 and/or the 3D digital model 110 of the tooth element, the position of the offset surface 106 to be projected by the augmented reality device relative to the physical antagonist and/or relative to the physical tooth element may be determined. For determining the relative position and/or for generating the visual representation of the offset surface area 106 being projected, a computer device may be used. The computer device may be comprised by the augmented realty device or the augmented realty device may be in communication connection with the respective computer device.

The offset surface area defines a limit for the tooth element providing guidance regarding requirements of a preparation of the tooth element in order to prepare the tooth element to receive the dental restoration element. Thus, the projection of the offset surface area into a user's visual perception of the patient's teeth using the augmented reality device may provide the user with a guidance for the preparation of the tooth element, e.g., while preparing the tooth element for receiving the dental restoration element.

The clearance 105 shown in FIG. 1 may be assessed to be insufficient, e.g., due to the penetration of the offset surface area 106 by the tooth element represented by the 3D digital representation 110. In order to adjust the clearance 105 such that the one or more penetration criteria are satisfied, e.g., the tooth element represented by the 3D digital representation 110 may be prepared. For example, tissue may be removed from the tooth element represented by the 3D digital representation 110 increasing the clearance 105. Alternatively or additionally, the offset 108 may be adjusted. The offset 108 represents the space required for the dental restoration element. The offset 108 may, e.g., depend on a restoration material specific minimum thickness required by a restoration material intended to be used for manufacturing of the dental restoration element in order to ensure a sufficient structural durability and stability of the dental restoration element. The offset 108 may further, e.g., depend on a surface morphology of the dental restoration element and/or a gap required for providing a bonding material between the tooth element represented by the 3D digital representation 110 and the dental restoration element, in order to bond the dental restoration element to the tooth element represented by the 3D digital representation 110. Adjusting the offset 108 may thus correspond to adjusting the dental restoration element. For example, the offset 108 may be reduced by selecting a different restoration material with a smaller minimum thickness to be used for manufacturing the dental restoration element.

Figure 2:
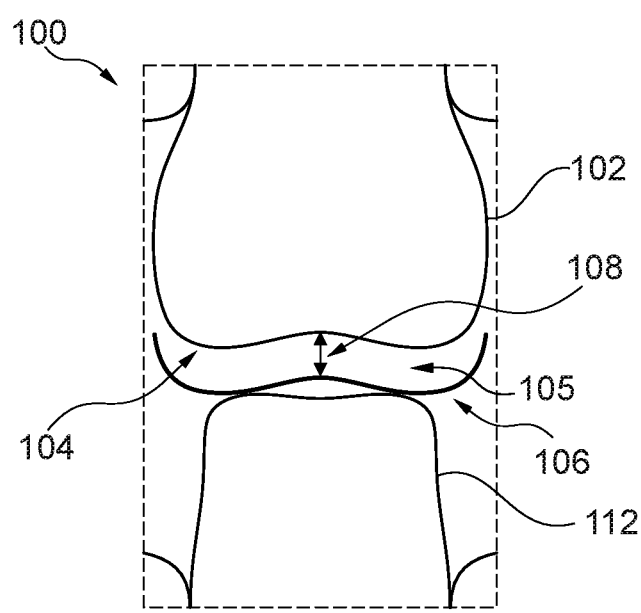
FIG. 2 shows an exemplary preparation of a tooth element.

FIG. 2 shows a cross-sectional view of the exemplary 3D digital teeth model 100 of FIG. 1, in which the 3D digital representation of the tooth element 110 has been replaced by a 3D digital representation of a preparation 112 of the tooth element. The preparation represented by the 3D digital representation 112 comprises a tissue removal of tissue from the tooth element represented by the 3D digital representation 110 in FIG. 1. Due to this preparation represented by the 3D digital representation 112, the clearance 105 is increased in FIG. 2 relative to the clearance 105 in FIG. 1. The preparation may, e.g., be a digital preparation of the 3D digital representation 110 of FIG. 1. This digital preparation may be used as a template for preparing the physical tooth element represented by the 3D digital representation 110 of FIG. 1 accordingly. The 3D digital representation of the preparation 112 may, e.g., resemble a current prepared state of the physical tooth element. For example, the physical tooth element represented by the 3D digital representation 110 of FIG. 1 may be prepared and the result of the preparation may be scanned. The resulting scan data may be used to generate the 3D digital representation of a preparation 112 of the tooth element as shown in FIG. 2.

The 3D digital representation of the antagonist 102 in FIG. 2 remains unaltered relative to the 3D digital representation of the antagonist 102 of FIG. 1. Thus, the tooth surface 104 of the antagonist represented by the 3D digital representation 102, which is a reference surface for the offset 108, remains unchanged.

Due to the preparation as represented by the 3D digital representation 112, the resulting increased clearance 105 may satisfy the one or more penetration criteria. For example, the preparation represented by the 3D digital representation 112 may not penetrate the offset surface area 106.

In addition to the preparation as represented by the 3D digital representation 112, the offset 108 of FIG. 2 may, e.g., be adjusted relative to the offset of FIG. 1. The offset 108 of FIG. 2 may, e.g., be reduced. Such a reduction may, e.g., be achieved by selecting an alternative restoration material with a smaller restoration material specific minimum thickness for manufacturing the dental restoration element intended to be arranged on the preparation represented by the 3D digital representation 112.

Figure 3:
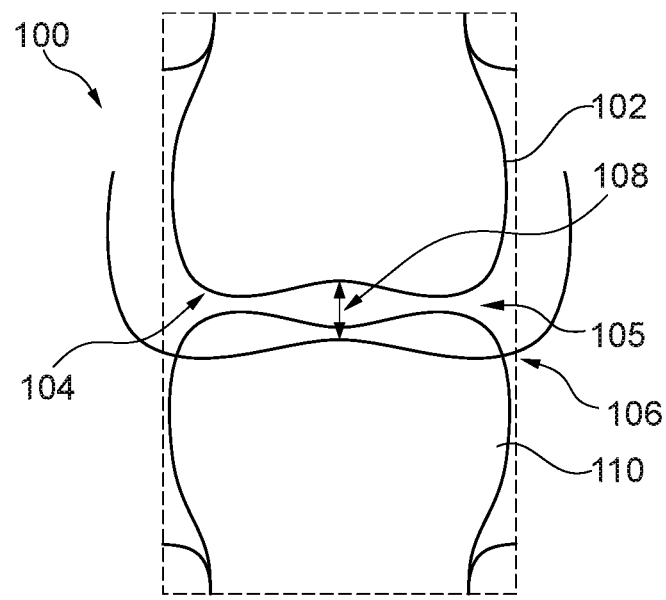
FIG. 3 shows an exemplary offsetting of a surface area of an antagonist.

FIG. 3 shows a cross-sectional view of another exemplary offsetting of a surface area of an antagonist represented by the 3D digital representation 102. The 3D digital teeth model 110 show in FIG. 3 is identical with the 3D digital teeth model 110 shown in FIG. 1. The only difference is the generating of the offset surface area 106 of FIG. 3. In case of FIG. 3, the tooth surface 104 of the antagonist represented by the 3D digital representation 102 is inflated using the offset 108. The inflated tooth surface comprises the offset surface area 106 of FIG. 1. In contrast, in FIG. 1 only an occlusal surface area is offset in order to provide the offset surface area 106 rather than inflating the antagonist represented by the 3D digital representation 102 as shown in FIG. 3.

Figure 4:
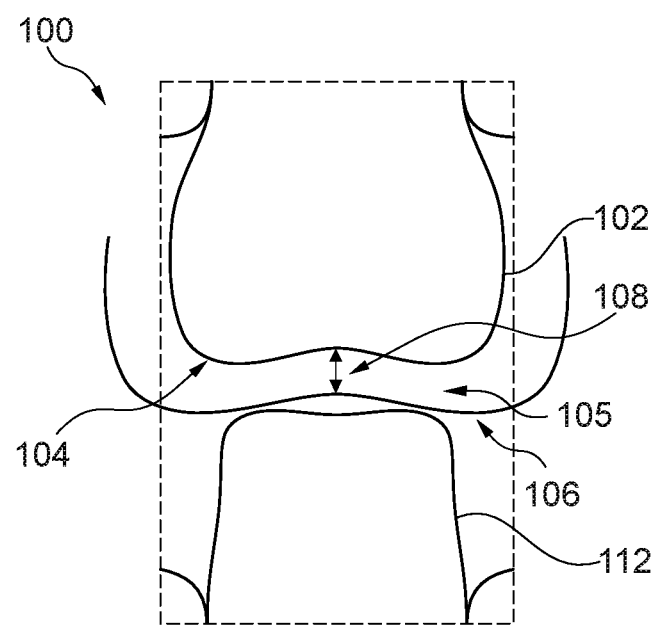
FIG. 4 shows an exemplary preparation of a tooth element.

FIG. 4 shows a cross-sectional view of the exemplary 3D digital teeth model 100 of FIG. 3, in which the 3D digital representation of the tooth element 110 has been replaced by a 3D digital representation of a preparation 112 of the tooth element. The exemplary 3D digital teeth model 100 of FIG. 4 may be equal to the exemplary 3D digital teeth model 100 of FIG. 2. Like in case of FIG. 3, the only difference may be the generating of the offset surface area 106 of FIG. 4. In case of FIG. 4, like in case of FIG. 3, the tooth surface 104 of the antagonist represented by the 3D digital representation 102 is inflated using the offset 108. The inflated tooth surface comprises the offset surface area 106 of FIG. 2. In contrast, in FIG. 2 only an occlusal surface area is offset in order to provide the offset surface area 106 rather than inflating the antagonist represented by the 3D digital representation 102 as shown in FIG. 4.

Again, the 3D digital representation of the antagonist 102 in FIG. 4 remains unaltered relative to the 3D digital representation of the antagonist 102 of FIG. 3. Thus, the tooth surface 104 of the antagonist represented by the 3D digital representation 102, which is the reference surface for the offset 108, i.e., the basis of the inflation of the antagonist represented by the 3D digital representation 102, remains unchanged.

Figure 5:
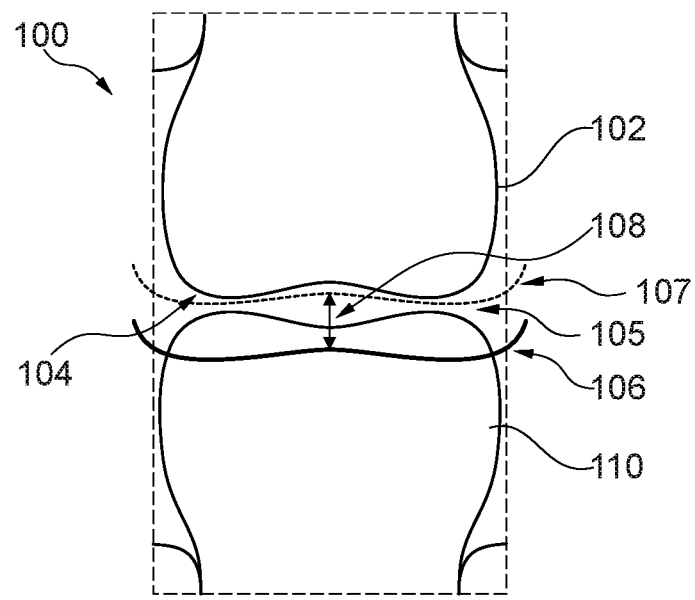
FIG. 5 shows an exemplary offsetting of a surface area of an antagonist.

FIG. 5 shows a cross-sectional view of another exemplary offsetting of a surface area of an antagonist represented by the 3D digital representation 102. The 3D digital teeth model 110 show in FIG. 5 is identical with the 3D digital teeth model 110 shown in FIG. 1. The only difference is the generating of the offset surface area 106 of FIG. 5. In contrary to FIG. 1, a dynamic occlusion is used as a basis for generating the offset surface area 106 in FIG. 5 rather than a static occlusion, like in case of FIG. 1.

For example, a surface 107 is defined by the dynamic occlusion and offset using the offset 108 in order to generate the offset surface area 106 for assessing the clearance 105. The surface 107 may comprise those points in space relative to the tooth element represented by the 3D digital representation 110, which are reached by the occlusal tooth surface 104 of the antagonist represented by the 3D digital representation 102 during dynamic occlusion and which in occlusal direction towards the tooth element represented by the 3D digital representation 110 have a smallest distance to the tooth element represented by the 3D digital representation 110. Thus, the surface 107 may be a shell surface reached by the occlusal tooth surface 104 of the antagonist represented by the 3D digital representation 102 during dynamic occlusion. This surface 107 may be offset by the offset 108 in order to provide the offset surface area 106.

Alternatively, the offset surface area 106 based on a dynamic occlusion as shown in FIG. 5 may be provided by first offsetting the tooth surface 104 resulting in the offset surface area 106 of FIG. 1 and then taking into account the dynamic occlusion. The resulting offset surface area 106 of FIG. 5 may comprise those points in space relative to the tooth element represented by the 3D digital representation 110, which are reached by the offset surface area 106 of FIG. 1 during dynamic occlusion and which in occlusal direction towards the tooth element represented by the 3D digital representation 110 have a smallest distance to the tooth element represented by the 3D digital representation 110. Thus, the offset surface area 106 of FIG. 5 may be a shell surface reached by the offset surface area 106 of FIG. 1 during dynamic occlusion.

The jaw movements defining the dynamic occlusion may, e.g., be registered using a jaw movement registration system. The jaw movement registration system may, e.g., comprise a digital face bow configured to register jaw movements of the patient's jaws. The dynamic occlusion resulting from the registered jaw movements may be used or simulated using a virtual articulator in order to define the offset surface area 106 of FIG. 5 resulting from the dynamic occlusion.

Figure 6:
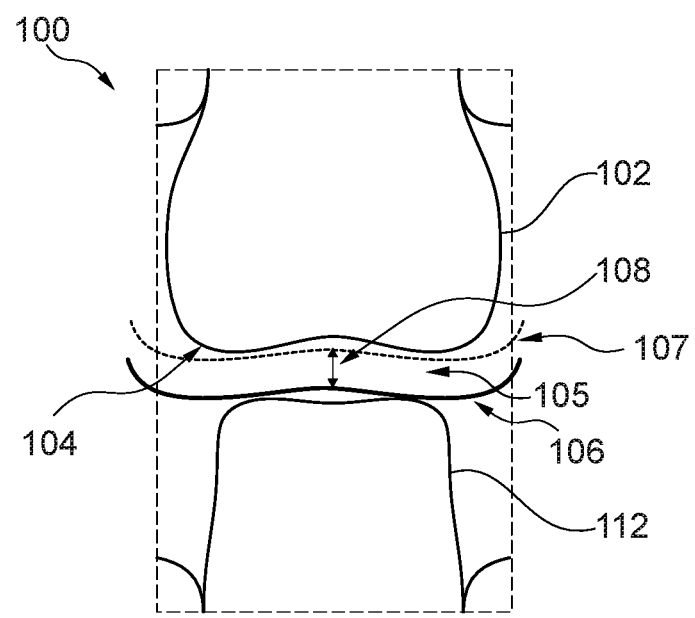
FIG. 6 shows an exemplary preparation of a tooth element.

FIG. 6 shows a cross-sectional view of the exemplary 3D digital teeth model 100 of FIG. 5, in which the 3D digital representation of the tooth element 110 has been replaced by a 3D digital representation of a preparation 112 of the tooth element. The exemplary 3D digital teeth model 100 of FIG. 6 may be equal to the exemplary 3D digital teeth model 100 of FIG. 2. Like in FIG. 5, the only difference may be the generating of the offset surface area 106 of FIG. 6. In contrary to FIG. 2, a dynamic occlusion may be used as a basis for generating the offset surface area 106 in FIG. 6 rather than a static occlusion, like in case of FIG. 2. The offset surface area 106 of FIG. 6 may equal to the offset surface area 106 of FIG. 5 and generated the same way, e.g., using the surface 107 defined by the dynamic occlusion.

Again, the 3D digital representation of the antagonist 102 in FIG. 6 remains unaltered relative to the 3D digital representation of the antagonist 102 of FIG. 5. Thus, the tooth surface 104 of the antagonist represented by the 3D digital representation 102 as well as the dynamic occlusion, which are the basis for generating the offset surface area 106, remain unchanged.

Figure 7:
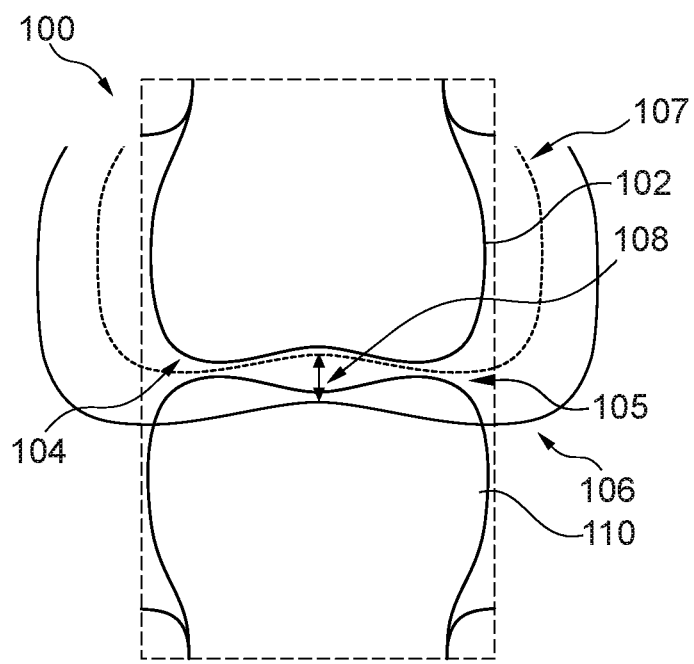
FIG. 7 shows an exemplary offsetting of a surface area of an antagonist.

FIG. 7 shows a cross-sectional view of another exemplary offsetting of a surface area of an antagonist represented by the 3D digital representation 102. The 3D digital teeth model 110 show in FIG. 7 is identical with the 3D digital teeth model 110 shown in FIG. 5. The only difference is the generating of the offset surface area 106 of FIG. 7. In case of FIG. 7, like in case of FIG. 3, an inflation may be used to obtain the offset surface area 106. For example, a surface 107 is defined by the dynamic occlusion taking into account the complete surface 104 of the antagonist represented by the 3D digital representation 102. The resulting surface 107 defined by the dynamic occlusion is inflated using the offset 108. The inflated surface 107 comprises the offset surface area 106 of FIG. 5. In contrast, in FIG. 5 only an occlusal surface is taken into account for defining the surface 107 based on the dynamic occlusion.

Alternatively, the tooth surface 104 of the antagonist represented by the 3D digital representation 102 may be inflated using an offset 108 and the resulting inflated tooth surface 104 of the antagonist represented by the 3D digital representation 102 may be used to determine the offset surface area 106 of FIG. 7 using the dynamic occlusion as done in FIG. 5.

Figure 8:
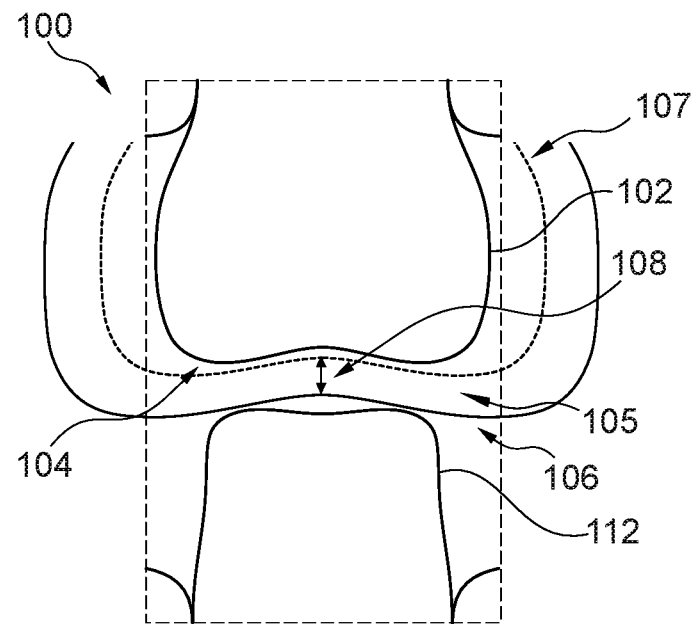
FIG. 8 shows an exemplary preparation of a tooth element.

FIG. 8 shows a cross-sectional view of the exemplary 3D digital teeth model 100 of FIG. 7, in which the 3D digital representation of the tooth element 110 has been replaced by a 3D digital representation of a preparation 112 of the tooth element. The exemplary 3D digital teeth model 100 of FIG. 7 may be equal to the exemplary 3D digital teeth model 100 of FIG. 6. Like in case of FIG. 6, the only difference may be the generating of the offset surface area 106 of FIG. 8. The offset surface area 106 of FIG. 8 may equal to the offset surface area 106 of FIG. 7 and generated the same way, e.g., using the surface 107 defined by the dynamic occlusion.

Again, the 3D digital representation of the antagonist 102 in FIG. 8 remains unaltered relative to the 3D digital representation of the antagonist 102 of FIG. 7. Thus, the tooth surface 104 of the antagonist represented by the 3D digital representation 102 as well as the dynamic occlusion, which are the basis for generating the offset surface area 106, remain unchanged.

Figure 9:
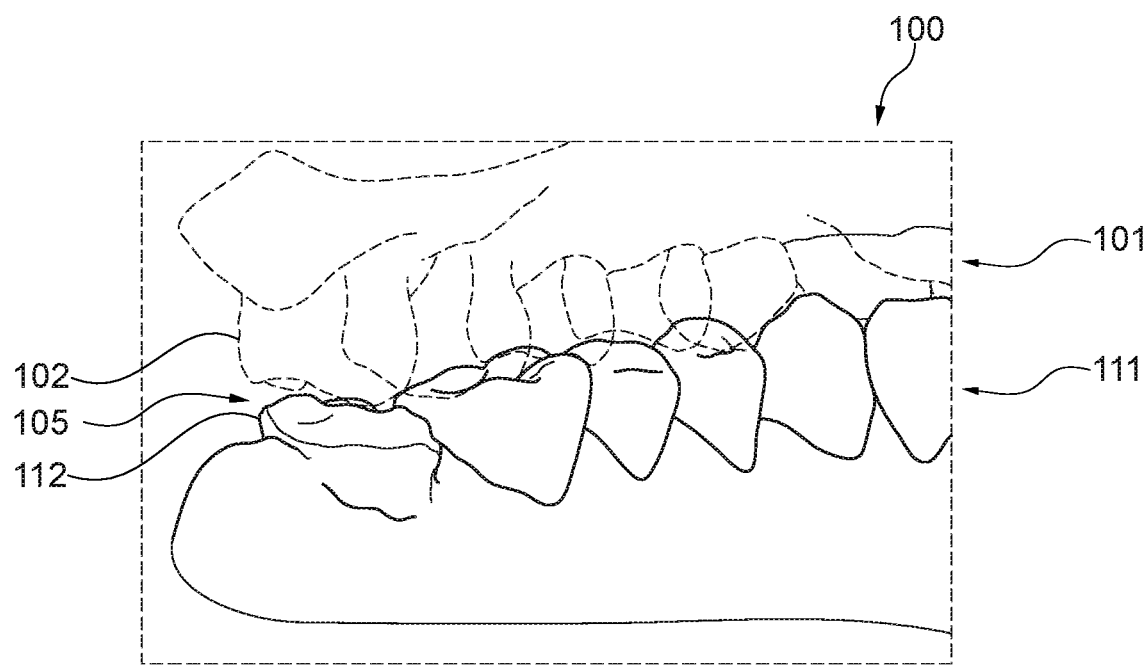
FIG. 9 shows an exemplary 3D digital teeth model.

FIG. 9 shows an exemplary 3D digital teeth model 100. The 3D digital teeth model 100 comprises a 3D digital representation of a maxillary dental arch 101 as well as a 3D digital representation of a mandibular dental arch 111 of the patient. The 3D digital representation of the maxillary dental arch 101 and the 3D digital representation of the mandibular dental arch 111 of the patient may be is static occlusion. For example, the 3D digital representation of the mandibular dental arch 111 comprises a 3D digital representation of a prepared tooth element 112. The prepared tooth element represented by the 3D digital representation 112 may be prepared to be provided with a dental restoration element, e.g., with a crown. The 3D digital representation of the maxillary dental arch 101 may, e.g., comprise a 3D digital representation of an antagonist 102 of the prepared tooth element represented by the 3D digital representation 112. Between the prepared tooth element represented by the 3D digital representation 112 and the antagonist represented by the 3D digital representation 102 there is a clearance 105.

The 3D digital teeth model 100 with the 3D digital representation of the maxillary dental arch 101 and the 3D digital representation of the mandibular dental arch 111 may be generated using scan data of the patient's oral cavity. For example, the patient's teeth in the oral cavity may be scanned using an intraoral scanner, e.g., an optical intraoral scanner. For example, the upper and lower jaw, i.e., the mandibular dental arch and maxillary dental arch, are scanned in occlusion. The achieved scan data may be used to provide the 3D digital teeth model 100 of the scanned teeth of the oral cavity. Alternatively, an impression of the patient's teeth in the oral cavity, i.e., a negative imprint of the teeth may be taken. Either this impression may be scanned, e.g., using an optical scanner, or the negative imprint provided by the impression may be used to generate a positive reproduction of the patient's teeth, i.e., a 3D physical teeth model or cast, which is scanned, e.g., by the optical scanner to provide the scan data used to generate the 3D digital teeth model 100.

In order to decide, whether the preparation of the prepare tooth element represented by the 3D digital representation 112 is sufficient for arranging the dental restoration element thereon, the clearance 105 may be assessed.

Figure 10:
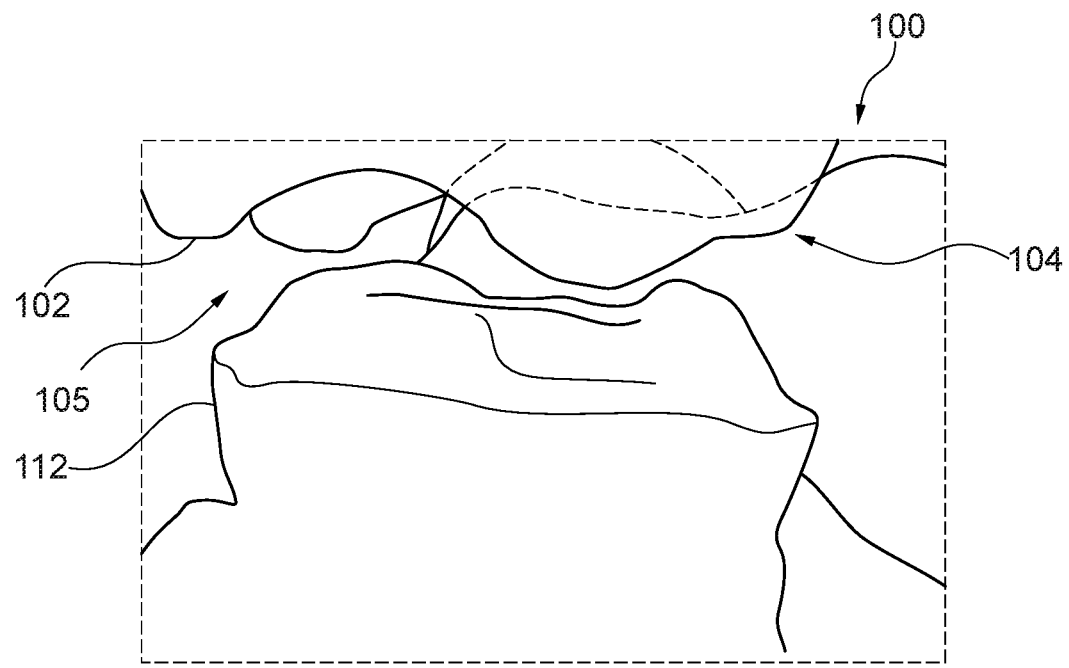
FIG. 10 shows a detailed view of a section of exemplary the 3D digital teeth model of FIG. 8.

FIG. 10 shows a cross-sectional view of the prepare tooth element represented by the 3D digital representation 112 and the antagonist represented by the 3D digital representation 102 of the 3D digital teeth model 100 of FIG. 9. Between the prepared tooth element represented by the 3D digital representation 112 and the antagonist represented by the 3D digital representation 102 there is the clearance 105. In order to assess the clearance 105, a surface area defined by a tooth surface 104 of the antagonist represented by the 3D digital representation 102 may be offset.

Figure 11:
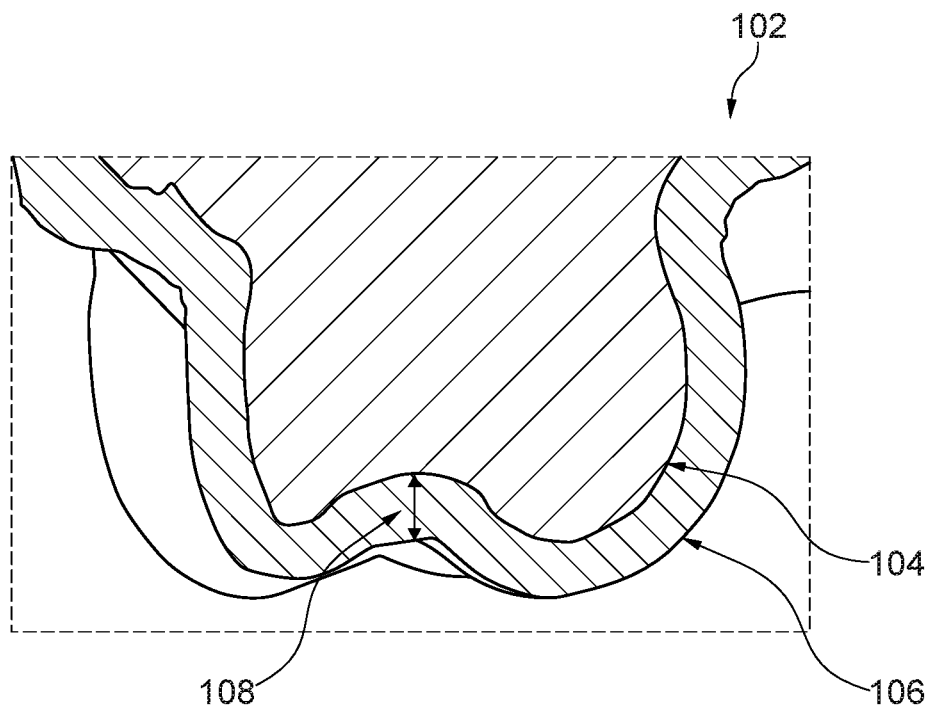
FIG. 11 shows a cross-sectional view of an exemplary offsetting of a tooth area of an antagonist.

FIG. 11 shows a cross-sectional view of an exemplary offsetting of a tooth area 104 of the antagonist represented by the 3D digital representation 102 of FIG. 10. The tooth area 104 of the antagonist represented by the 3D digital representation 102 is offset using an offset 108 resulting in the offset surface area 106.

Figure 12:
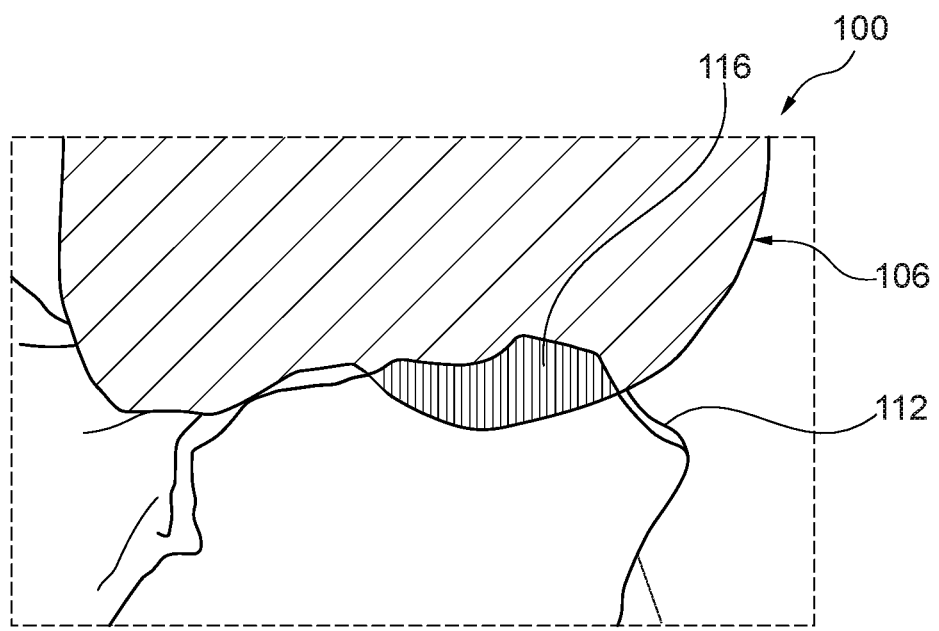
FIG. 12 shows a cross-sectional view of a 3D digital teeth model with an offsetting of a tooth area of an antagonist.

FIG. 12 shows a cross-sectional view of the 3D digital teeth model 100 of FIG. 10 with the offset surface area 106 of FIG. 11. The offset surface area 106 may, e.g., be penetrated by the prepared tooth element represented by the 3D digital representation 112 resulting in penetrations 116. In order to assess the clearance 105 shown in FIG. 10, the penetrations 116 of FIG. 12 are checked, whether they violate one or more penetration criteria. The one or more penetration criteria may comprise one or more of the following criteria: no occurrence of a penetration 116 of the offset surface area 106 by the prepared tooth element represented by the 3D digital representation 112; no occurrence of a penetration 116 of the offset surface area 106 by the prepared tooth element represented by the 3D digital representation 112 within one or more predefined sections of the offset surface area 106; no occurrence of a penetration 116 of the offset surface area 106 by one or more predefined sections of the prepared tooth element represented by the 3D digital representation 112; no occurrence of a penetration 116 of the offset surface area 106 by the prepared tooth element represented by the 3D digital representation 112 with a penetration depth exceeding a predefined first threshold; no occurrence of a penetration 116 of the offset surface area 106 by the prepared tooth element represented by the 3D digital representation 112 with a size of a penetrated section of the offset surface area 106 exceeding a predefined second threshold; no occurrence of a plurality of penetrations 116 of the offset surface area 106 by the prepared tooth element represented by the 3D digital representation 112 with the number of penetrations 116 of the plurality of penetrations exceeding a third threshold.

If the prepared tooth element represented by the 3D digital representation 112 violates the one or more penetration criteria, clearance 105 of FIG. 10 is assessed to be insufficient for the prepared tooth element represented by the 3D digital representation 112 to be provided with the dental restoration element. Else the clearance 105 is assessed to be sufficient for the prepared tooth element represented by the 3D digital representation 112 to receive the dental restoration element.

An output may be provided, which indicates the result of the assessment. The output may, e.g., comprise a visual representation of the 3D digital representation of the prepared tooth element 112 and of the offset surface area 106 as shown in FIG. 12. The visual representation may for example be provided using a graphical user interface on a display. The result may be output, e.g., using an augmented reality device. For outputting the result, the augmented reality device may, e.g., comprise a head-mounted display, eyeglasses, a head-up display, a contact lens, a virtual retinal display, an eye tap, etc. The output may comprise a visual representation of the offset surface area 106. The output may comprise a visual representation of the 3D digital representation of the prepared tooth element 112.

Figure 13:
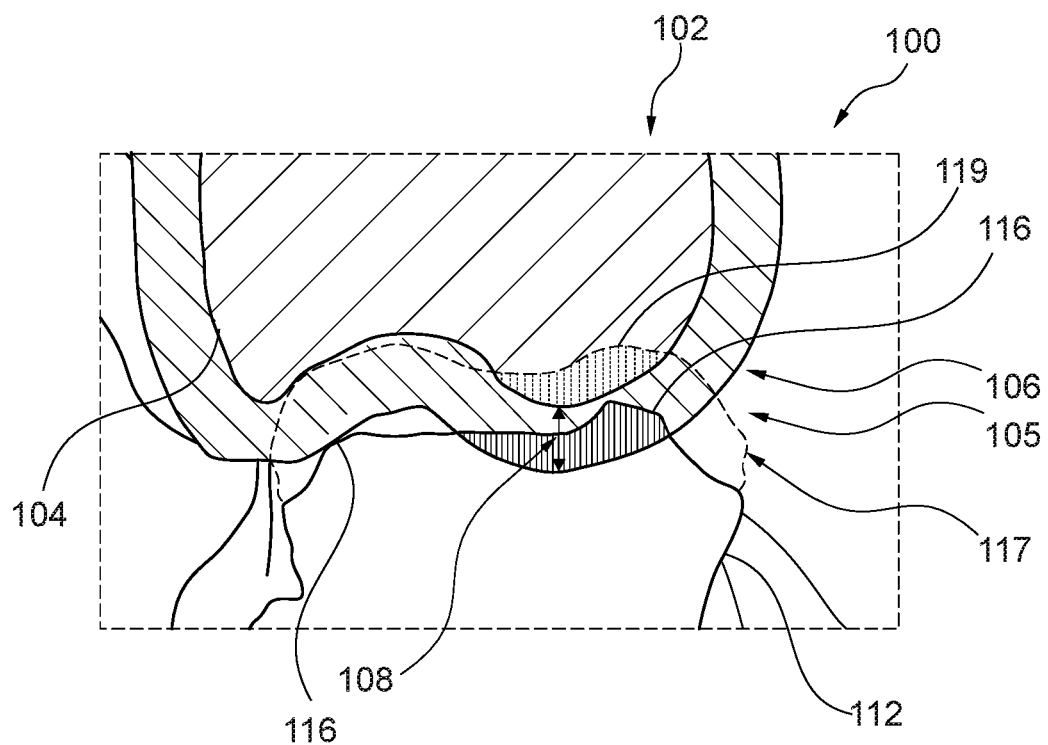
FIG. 13 shows a cross-sectional view of a 3D digital teeth model with a dental restoration element.

FIG. 13 shows a cross-sectional view of a 3D digital teeth model 100 comprising a 3D digital representation of a prepared tooth element 112 and a 3D digital representation of an antagonist 102. A tooth area 104 of the antagonist represented by the 3D digital representation 102 is offset using an offset 108 resulting in the offset surface area 106. The offset surface area 106 is penetrated by the prepared tooth element represented by the 3D digital representation 112 resulting in penetrations 116. The offset 108 may, e.g., correspond to a restoration material specific minimum thickness of the restoration material used for manufacturing a dental restoration element. In this case, an occurrence of a penetrations 116 of the offset surface area 106 by the prepared tooth element represented by the 3D digital representation 112 indicates that the clearance 105 is not wide enough. The clearance 105 is insufficient for a dental restoration element a with a thickness corresponding to a material specific minimum thickness of the restoration material to be arranged on the prepared tooth element represented by the 3D digital representation 112.

In FIG. 13, a 3D digital restoration model 117 is shown arranged on the prepared tooth element represented by the 3D digital representation 112. Since the clearance 105 is insufficient, the 3D digital restoration model 117 would come into conflict with the antagonist represented by the 3D digital representation 102. This conflict is indicated by the penetration 119 of the 3D digital representation of an antagonist 102 by the 3D digital restoration model 117. Thus, would a dental restoration element as represented by the 3D digital restoration model 117 be arranged on a prepared tooth element as represented by the 3D digital representation 112, the prepared tooth element with the dental restoration element and the antagonist will result in a malfunctioning static and/or dynamic occlusion. The reason is that the relative position of the prepared tooth element and the antagonist relative as shown in FIG. 10 will be increased. In FIG. 10, a relative position of prepared tooth element and antagonist is shown, which is obtained with the dentition of the patient is in suitable occlusion.

By digitally assessing the clearance 105, a situation as shown in FIG. 13 may be avoided. In case the clearance 105 is assessed to be insufficient, e.g., the prepared tooth element as represented by the 3D digital representation 112 may be further prepared and/or a different restoration material with a smaller minimum thickness may be selected allowing to construct a dental restoration element with a smaller thickness. Such a further preparation of the tooth element, i.e., an additional removal of tissue from the tooth element may result in a wider clearance 105. Such a reduction of the required minimum thickness for the dental restoration element may be indicated by a smaller offset 108. A wider clearance 105 and/or a smaller offset 108 may result in an offset surface area 106 free of penetrations by the prepared tooth element as represented by the 3D digital representation 112. In this case, the clearance 105 may be sufficient for a dental restoration element to be arrange on the prepared tooth element.

Figure 14:
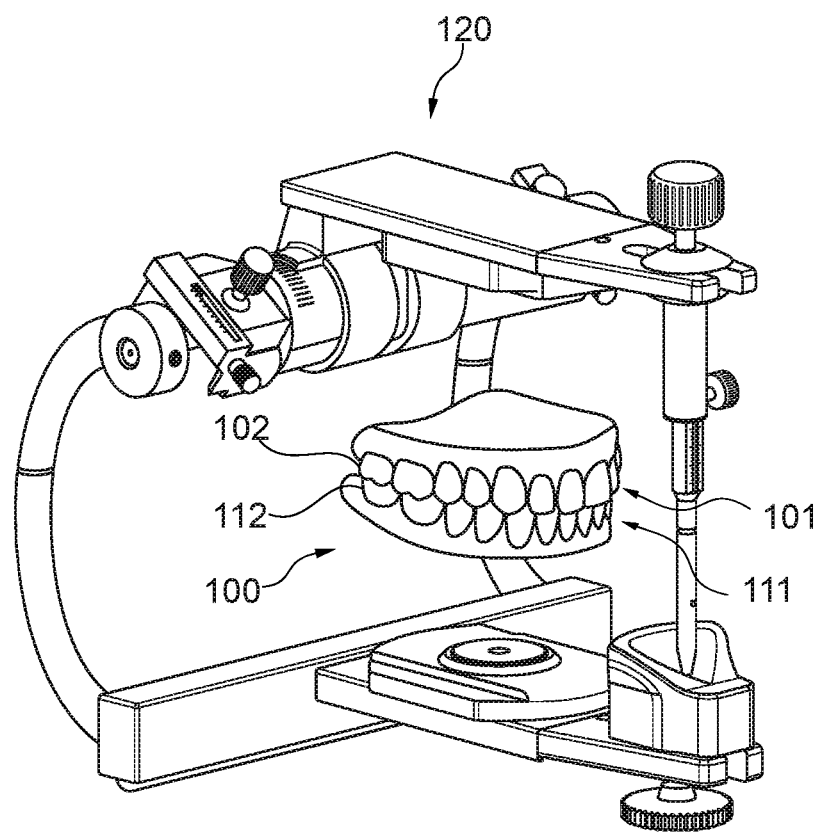
FIG. 14 shows an exemplary virtual articulator with an exemplary 3D digital teeth model.

FIG. 14 shows an exemplary virtual articulator 120 with an exemplary 3D digital teeth model 110 arranged therein. The 3D digital teeth model 110 may comprise a 3D digital representation of a maxillary dental arch 101 and a 3D digital representation of a mandibular dental arch 111. The 3D digital representation of the mandibular dental arch 111, e.g., comprises a 3D digital representation of a prepared tooth element 112. The 3D digital representation of a maxillary dental arch 101 comprises a 3D digital representation of an antagonist 102 of the prepared tooth element represented by the 3D digital representation 112. The virtual articulator 120 may be configured to simulate a dynamic occlusion between the maxillary dental arch represented by the 3D digital representation 101 and the mandibular dental arch represented by the 3D digital representation 111. Thus, also a dynamic occlusion between prepared tooth element represented by the 3D digital representation 112 and the antagonist represented by the 3D digital representation 102.

The dynamic occlusion may, e.g., be simulated using the virtual articulator 120. The dynamic occlusion may, e.g., be simulated using jaw movement of the patient registered using a jaw movement registration system. For example, the virtual articulator 120 may be used in addition to the jaw movement registration system. The dynamic occlusion resulting from the registered jaw movements may be used or simulated using the virtual articulator 120. The dynamic occlusion may, e.g., be used to define offset surface areas as the offset surface area 106 shown in FIG. 5 to FIG. 8.

Figure 15:
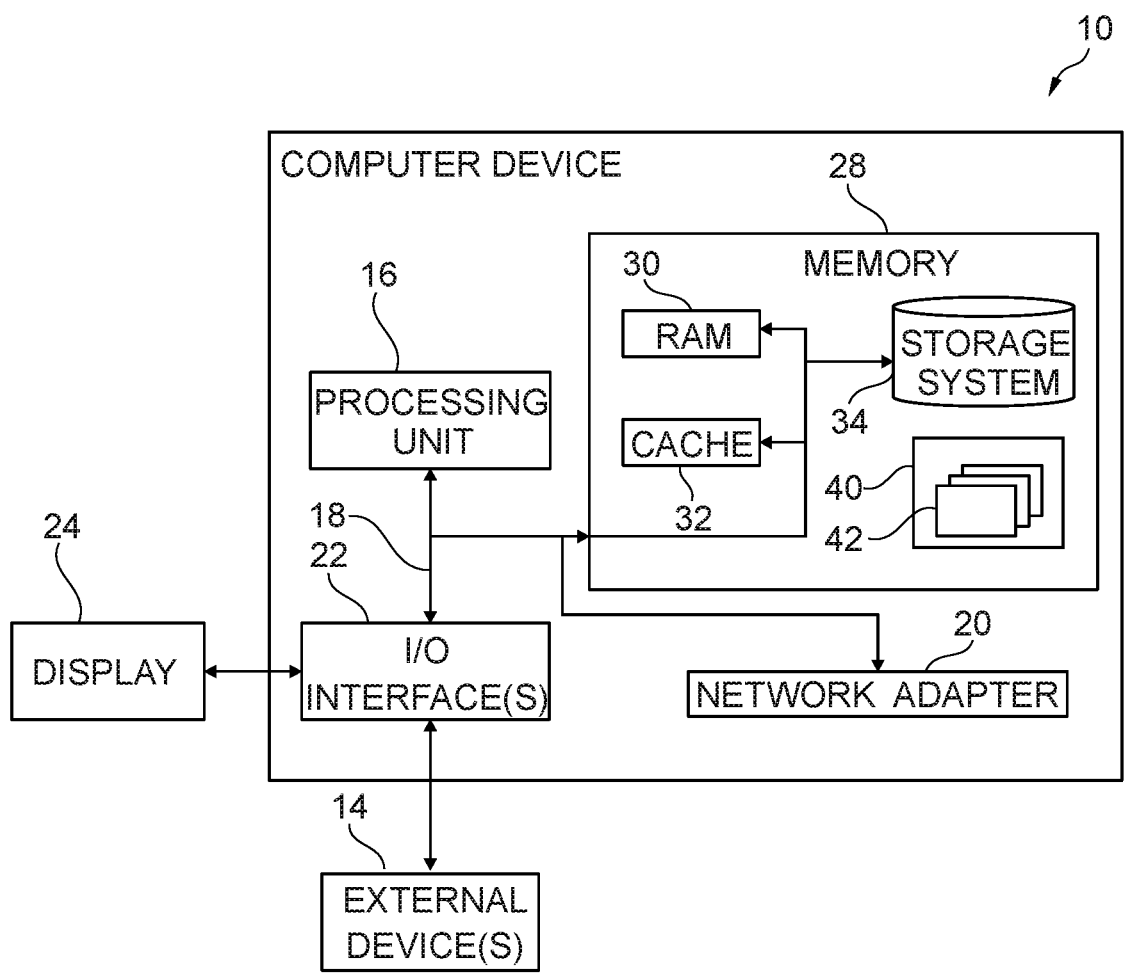
FIG. 15 shows an exemplary computer device for offsetting a surface area of an antagonist.

FIG. 15 shows a schematic diagram of an exemplary computer device 10 for assessing a clearance between a tooth element intended to be provided with a dental restoration element and an antagonist of the tooth element. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 15, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a 3D digital teeth model of a patient received by the computer device 10. The 3D digital teeth model may comprise comprising 3D digital representations of the tooth element and of a surface area defined by a tooth surface of the antagonist. Memory 28 may, e.g., include scan data of a patient's mouth from an intraoral scan or from a scan of a classical mold/impression, e.g., providing information about the surface structure of the patient's intraoral tissue comprising the tooth element and the antagonist of the tooth element. The scan data may comprise scan data of the tooth element and of the antagonist. Memory 28 may, e.g., further include scan data of a patient's jaw movements acquired using a jaw movement registration system.

Memory 28 may, e.g., include a 3D digital restoration model of a dental restoration element to be arranged on the tooth element. Memory 28 may, e.g., include a set of selectable restoration materials, each assigned with a restoration material specific minimum thickness. The set of selectable restoration materials may, e.g., be provided in form of an ordered list of restoration materials, in which the restoration materials are ordered according to their minimum thicknesses following an ascending or descending order. Memory 28 may, e.g., include a library of dental restoration element. Memory 28 may, e.g., include a library of artificial teeth. Memory 28 may, e.g., comprise a trained machine learning module trained for generating the 3D digital restoration model. The machine learning module may, e.g., further be trained to provide a recommendation for a preparation of the tooth element and/or for a restoration material to be used for manufacturing the dental restoration element. The trained machine learning module may be configured to provide the 3D digital restoration model as output in response to receiving the 3D digital teeth model with the tooth element and an offset surface area as input. The trained machine learning module may e.g., further be configured to provide the recommendation for the preparation of the tooth element and/or for the restoration material to be used for manufacturing the dental restoration element as output.

The trained machine learning module may, e.g., have been received by the computer device 10. The trained machine learning module may, e.g., have been trained by the computer device 10 using training datasets with training data received and/or generated by the computer device 10. For training the machine learning module, the memory 28 may comprise a machine learning module to be trained as well as training datasets with training data for training the machine learning module to be trained for generating the 3D digital restoration model. The machine learning module to be trained may, e.g., be an untrained machine learning module, a pre-trained machine learning module or a partially trained machine learning module. The training datasets may further comprise training data for training the machine learning module to be trained for providing the recommendation for the preparation of the tooth element and/or for the restoration material to be used for manufacturing the dental restoration element.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may be configured for assessing a clearance between a tooth element intended to be provided with a dental restoration element and an antagonist of the tooth element. One of the program modules 42 may, e.g., further be configured for generating a 3D digital restoration model of the dental restoration element using the 3D digital teeth model with the offset surface area. One of the program modules 42 may, e.g., be configured to use a trained machine learning module for generating the 3D digital restoration model. The trained machine learning module may further be used for providing a recommendation for a preparation of the tooth element and/or for a restoration material to be used for manufacturing the dental restoration element. One of the program modules 42 may, e.g., be configured to train a machine learning module to be trained to generate the 3D digital restoration model. The machine learning module to be trained may, e.g., be an untrained machine learning module, a pre-trained machine learning module or a partially trained machine learning module. The machine learning module to be trained may further be trained to provide a recommendation for the preparation of the tooth element and/or for a restoration material to be used for manufacturing the dental restoration element.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 15 may be configured for assessing a clearance between a tooth element intended to be provided with a dental restoration element and an antagonist of the tooth element. The computer device 10 may be a standalone computer with no network connectivity that may receive data to be processed through a local interface. The data received by computer device 10 may for example comprise scan data of a patient's mouth from an intraoral scan or from a scan of a classical mold/impression, e.g., providing information about the surface structure of the patient's intraoral tissue comprising the one or more teeth to be restored. This data may be used to provide a 3D digital teeth model of the patient's oral cavity comprising 3D digital representations of the tooth element and of a surface area defined by a tooth surface of the antagonist. Alternatively, the data received may, e.g., comprise the 3D digital teeth model.

The data received by computer device 10 may for example comprise a 3D digital restoration model of a dental restoration element to be arranged on the tooth element. The data received by computer device 10 may for example comprise a set of selectable restoration materials, each assigned with a restoration material specific minimum thickness. The set of selectable restoration materials may, e.g., be provided in form of an ordered list of restoration materials, in which the restoration materials are ordered according to their minimum thicknesses following an ascending or descending order. The data received by computer device 10 may for example comprise a library of dental restoration element. The data received by computer device 10 may for example comprise a library of artificial teeth. The data received by computer device 10 may for example comprise a trained machine learning module trained for generating the 3D digital restoration model. The machine learning module may, e.g., further be trained to provide a recommendation for a preparation of the tooth element and/or for a restoration material to be used for manufacturing the dental restoration element. The data received by computer device 10 may for example comprise a machine learning module to be trained. The machine learning module to be trained may, e.g., be an untrained machine learning module, a pre-trained machine learning module or a partially trained machine learning module. The data received by computer device 10 may for example comprise training datasets for training the machine learning module to be trained for generating the 3D digital restoration model. The training datasets may, e.g., further comprise training data for training the machine learning module to be trained for providing a recommendation for a preparation of the tooth element and/or for a restoration material to be used for manufacturing the dental restoration element.

The computer device 10 may be used to generating a 3D digital restoration model as a template for manufacturing a dental restoration element. Such operation may, however, likewise be performed using a computer device that is connected to a network such as a communications network and/or a computing network.

Figure 16:
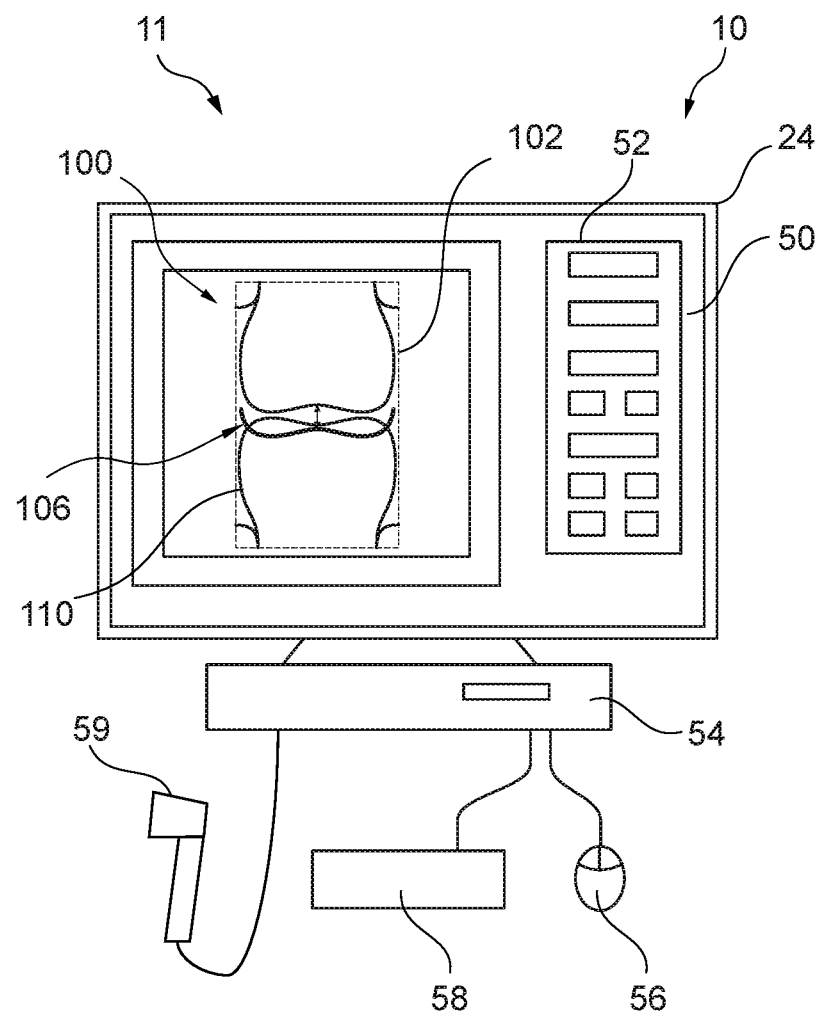
FIG. 16 shows an exemplary computer device for offsetting a surface area of an antagonist.

FIG. 16 shows an exemplary system computer device 10 for assessing a clearance between a tooth element intended to be provided with a dental restoration element and an antagonist of the tooth element. The computer device 10 may, e.g., be configured as shown in FIG. 15. The computer device 10 may comprise a hardware component 54 comprising one or more processors as well as a memory storing machine-executable program instructions. Execution of the program instructions by the one or more processors may cause the one or more processors to control the computer device 10 to assess the clearance between the tooth element and the antagonist of the tooth element.

The computer device 10 may further comprise one or more input devices, like a keyboard 58 and a mouse 56, enabling a user to interact with the computer device 10. Furthermore, the computer device 10 may comprise one or more output devices, like a display 24 providing a graphical user interface 50 with control elements 52, e.g., GUI elements, enabling the user to control the assessing of the clearance between the tooth element 110 and the antagonist 102 of the tooth element provided by a 3D digital teeth model 100. For assessing the clearance, the 3D digital teeth model 100 is received. A surface area is defined by a tooth surface of the antagonist 102. The surface area is offset from the tooth surface of the antagonist 102 by adding an offset. The resulting offset surface area 106 defines a limit for the tooth element 110. It is checked for the clearance, whether the tooth element 110 violates one or more penetration criteria regarding the offset surface area 106. If the tooth element 110 violates the one or more penetration criteria, the clearance is assessed to be insufficient for the tooth element 110 to be provided with the dental restoration element. Else the clearance is assessed to be sufficient for the tooth element 110 for receiving the dental restoration element. An output is provided indicating the result of the assessment.

For example, the output may be provided by the graphical user interface 50 displayed on the display 24. The output may, e.g., comprise a visual representation of the 3D digital representation of the tooth element 110 and the offset surface area 106.

Furthermore, the control elements 52 may, e.g., be used to digitally prepare the 3D digital representation of the tooth element 110 and/or to adjust the offset used to offset the offset surface area 106. The computer device 10 may further comprise a scanner 59, e.g., an optical scanner for scanning a patient's oral cavity, an imprint of a patient's oral cavity and/or a positive of a patient's oral cavity generated using an imprint. Furthermore, the scanner 59 may be used to scan a physical preparation of the tooth element.

Figure 17:
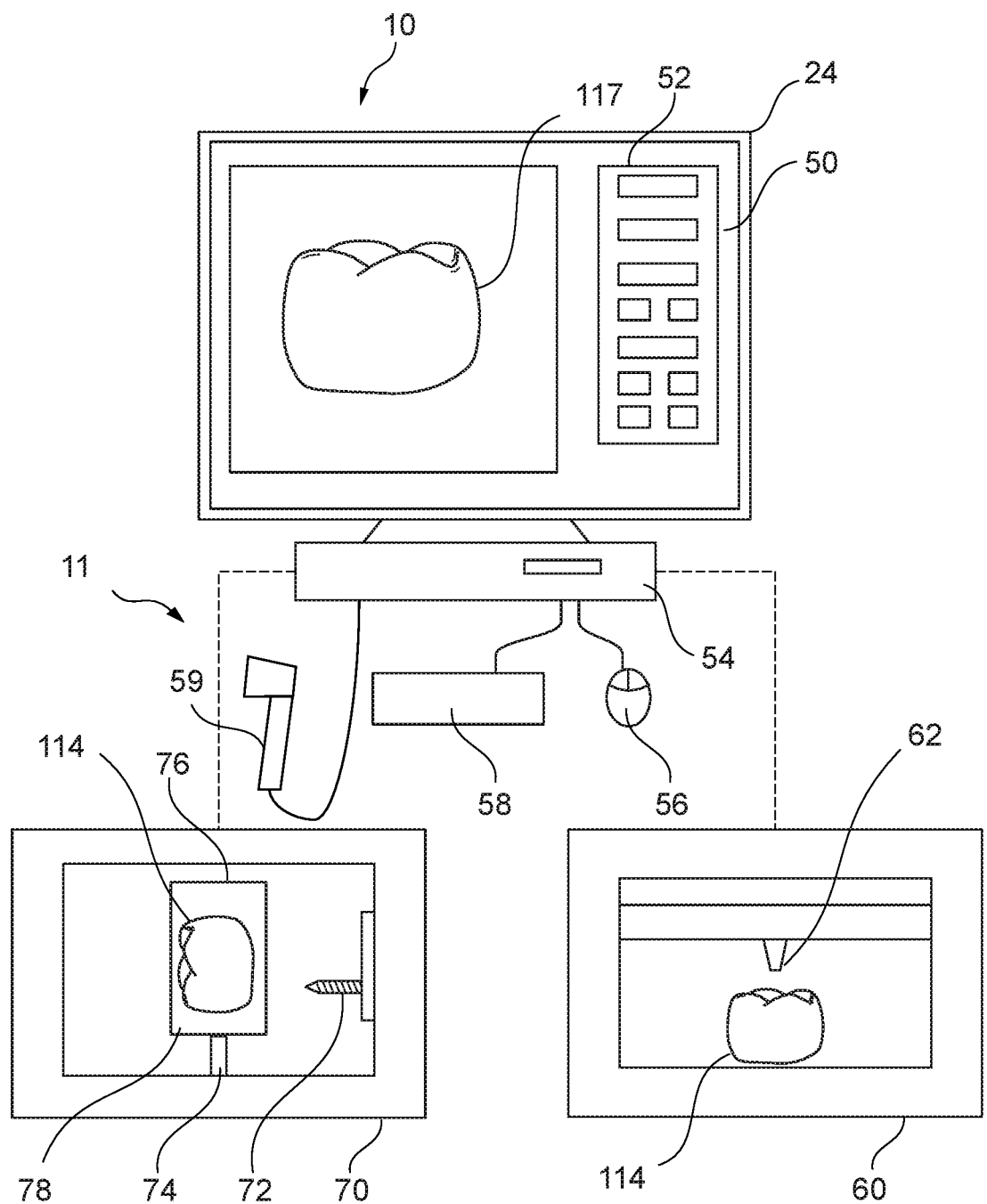
FIG. 17 shows an exemplary manufacturing system for manufacturing a dental restoration element.

FIG. 17 shows an exemplary manufacturing system 11 for manufacturing a dental restoration element 114 using a 3D digital restoration model 117 as template. The manufactured dental restoration element 114 is a physical copy of the respective template.

The manufacturing system 11 may comprise the computer device 10 of FIG. 16. The computer device 10 may further be configured to generate the 3D digital restoration model 117 as well as to control one or more manufacturing devices 60, 70. For example, the manufacturing system 11 may comprise a manufacturing device in form of a machining device 70 controlled by the computer device 10. The machining device 70 may be configured to machining a blank 76 of restoration material 78 using one or more machining tools 72. The blank 76 of restoration material 78, may be provided using a holding device 74 and cut into a desired shape and size of the element to be manufactured, e.g., a dental restoration element 114. The machining tool 72 may, e.g., be a milling tool. A 3D digital model, e.g., the 3D digital restoration model 117, may provide a template for the element being manufactured using the machining device 70, e.g., the dental restoration element 114.

For example, the manufacturing system 11 may comprise a manufacturing device in form of a 3D printing device 60. The 3D printing device 60 may be controlled by the computer device and configured to print an element to be manufactured, e.g., a dental restoration element 114. The 3D printing device 60 may comprise a printing element 62 configured to print the respective element, like the dental restoration element 114, layer by layer. The printing element 62 may, e.g., comprise a nozzle configured for distributing printing material, i.e., restoration material. A 3D digital model, e.g., the 3D digital restoration model 117, may provide a template of the physical element manufactured using the 3D printing device 60, e.g., the dental restoration element 114.

Figure 18:
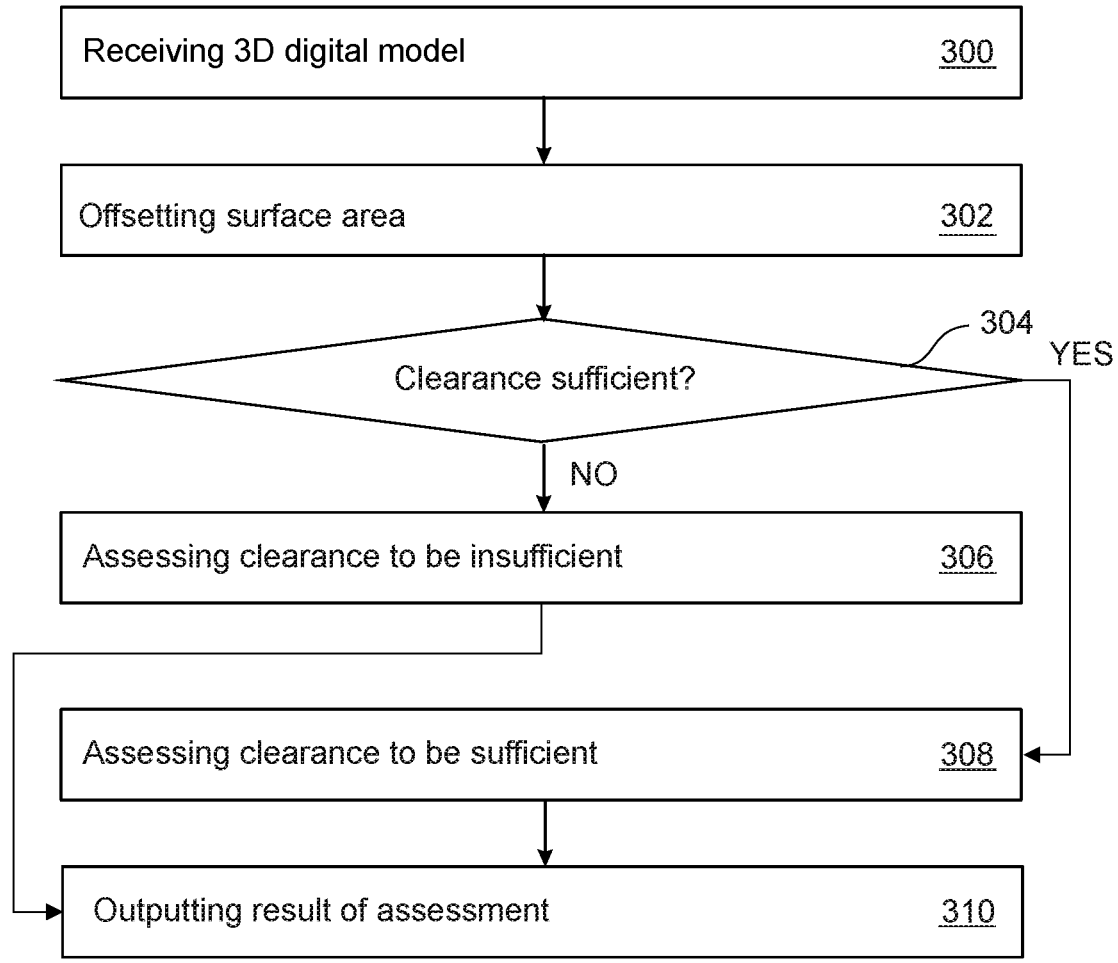
FIG. 18 shows a flowchart illustrating an exemplary method for assessing a clearance between a tooth element and an antagonist of the tooth element.

FIG. 18 shows an exemplary method for assessing a clearance between a tooth element intended to be provided with a dental restoration element and an antagonist of the tooth element.

In block 300, a 3D digital teeth model is received. The 3D digital teeth model comprises a 3D digital representation of the tooth element and a 3D digital representation of a surface area defined by a tooth surface of the antagonist. The 3D digital teeth model may, e.g., be generated using scan data of the patient's oral cavity. For example, a mandibular arch and a maxillary arch may be scanned. The achieved scan data may be used to provide the 3D digital teeth model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's teeth, i.e., a 3D physical model or cast of the teeth in the patient's oral cavity, which is scanned, e.g., by the optical scanner to provide the scan data used to generate the 3D digital teeth model.

The 3D digital teeth model may, e.g., be provided in form of a 3D digital tissue model of tissue in a patient's oral cavity. The 3D digital tissue model may, e.g., comprise soft tissue, like a gingiva, in addition to hard tissue like the teeth. The 3D digital teeth model may, e.g., comprise a plurality of teeth of the patient, like a dental arch. The 3D digital teeth model may, e.g., comprise the maxillary and the mandibular dental arch of the patient.

In block 302, the surface area is offset from the tooth surface of the antagonist by adding an offset. The resulting offset surface area defines a limit for the tooth element. The offsetting may comprise offsetting only the surface area or the tooth surface of the antagonist comprising the surface area may be inflated, thereby offsetting the surface area. The offset may comprise a restoration material minimum thickness of a predefined restoration material to be used for manufacturing the dental restoration element. The minimum thickness may ensure for the selected restoration material a sufficient structural durability and stability. The offset may, e.g., further comprise a depth of a pre-defined surface morphology assigned to the dental restoration element. The offset of the surface area may in addition, e.g., comprise a thickness of a bonding material, e.g., dental cement, to be applied between the tooth element and the dental restoration element, in order to establish a bonding between the tooth element and the dental restoration element.

In block 304 it is assessed, whether the clearance is sufficient. Assessing the clearance comprises checking, whether the tooth element violates one or more penetration criteria regarding the offset surface area. The one or more penetration criteria may, e.g., comprising one or more of the following criteria: no penetration of the offset surface area by the tooth element; no penetration of the offset surface area by the tooth element within one or more predefined sections of the offset surface area; no penetration of the offset surface area by one or more predefined sections of the tooth element; no penetration of the offset surface area by the tooth element with a penetration depth exceeding a predefined first threshold; no penetration of the offset surface area by the tooth element with a size of a penetrated section of the offset surface area exceeding a predefined second threshold; no plurality of penetrations of the offset surface area by the tooth element with the number of penetrations of the plurality of penetrations exceeding a third threshold.

If the tooth element violates the one or more penetration criteria, the method continues with block 306. Else the method continues with block 308. In block 306, the clearance is assessed to be insufficient for the tooth element to be provided with the dental restoration element. In block 310, an output is provided, which indicates the result of the assessment. In block 308, the clearance is assessed to be sufficient for the tooth element for receiving the dental restoration element. In block 310, an output is provided, which indicates the result of the assessment. The output may, e.g., comprise a visual representation of the 3D digital representation of the tooth element and the offset surface area. The output may, e.g., be provided using a GUI displayed on a display.

Figure 19:
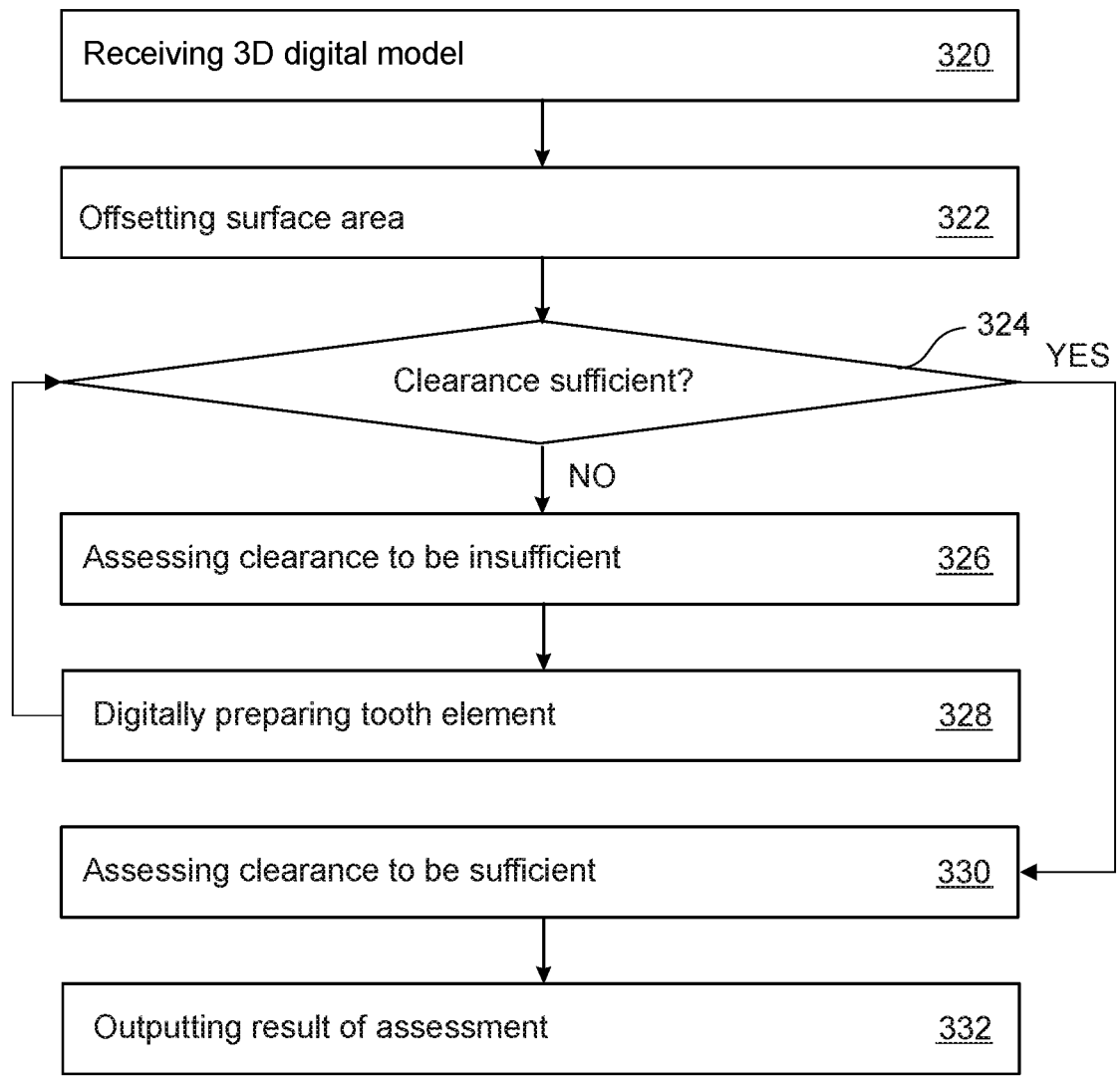
FIG. 19 shows a flowchart illustrating an exemplary method for assessing a clearance between a tooth element and an antagonist of the tooth element.

FIG. 19 shows another exemplary method for assessing a clearance between a tooth element intended to be provided with a dental restoration element and an antagonist of the tooth element.

In block 320, a 3D digital teeth model is received. The 3D digital teeth model comprises a 3D digital representation of the tooth element and a 3D digital representation of a surface area defined by a tooth surface of the antagonist. The 3D digital teeth model may, e.g., be generated using scan data of the patient's oral cavity. For example, a mandibular arch and a maxillary arch may be scanned. The achieved scan data may be used to provide the 3D digital teeth model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's teeth, i.e., a 3D physical model or cast of the teeth in the patient's oral cavity, which is scanned, e.g., by the optical scanner to provide the scan data used to generate the 3D digital teeth model.

The 3D digital teeth model may, e.g., be provided in form of a 3D digital tissue model of tissue in a patient's oral cavity. The 3D digital tissue model may, e.g., comprise soft tissue, like a gingiva, in addition to hard tissue like the teeth. The 3D digital teeth model may, e.g., comprise a plurality of teeth of the patient, like a dental arch. The 3D digital teeth model may, e.g., comprise the maxillary and the mandibular dental arch of the patient.

In block 322, the surface area is offset from the tooth surface of the antagonist by adding an offset. The resulting offset surface area defines a limit for the tooth element. The offsetting may comprise offsetting only the surface area or the tooth surface of the antagonist comprising the surface area may be inflated, thereby offsetting the surface area. The offset may comprise a restoration material minimum thickness of a predefined restoration material to be used for manufacturing the dental restoration element. The minimum thickness may ensure for the selected restoration material a sufficient structural durability and stability. The offset may, e.g., further comprise a depth of a pre-defined surface morphology assigned to the dental restoration element. The offset of the surface area may in addition, e.g., comprise a thickness of a bonding material, e.g., dental cement, to be applied between the tooth element and the dental restoration element, in order to establish a bonding between the tooth element and the dental restoration element.

In block 324 it is assessed, whether the clearance is sufficient. Assessing the clearance comprises checking, whether the tooth element violates one or more penetration criteria regarding the offset surface area. The one or more penetration criteria may, e.g., comprising one or more of the following criteria: no penetration of the offset surface area by the tooth element; no penetration of the offset surface area by the tooth element within one or more predefined sections of the offset surface area; no penetration of the offset surface area by one or more predefined sections of the tooth element; no penetration of the offset surface area by the tooth element with a penetration depth exceeding a predefined first threshold; no penetration of the offset surface area by the tooth element with a size of a penetrated section of the offset surface area exceeding a predefined second threshold; no plurality of penetrations of the offset surface area by the tooth element with the number of penetrations of the plurality of penetrations exceeding a third threshold.

If the tooth element violates the one or more penetration criteria, the method continues with block 326. Else the method continues with block 330. In block 326, the clearance is assessed to be insufficient for the tooth element to be provided with the dental restoration element. Due to this assessment, in block 328 the tooth element is digitally prepared, i.e., tissue material is digitally removed. Thus, a width of the clearance between the tooth element and the antagonist may be increased. The method continues with a re-assessment of the clearance for the prepared tooth element in block 324.

In block 330, the clearance is assessed to be sufficient for the tooth element for receiving the dental restoration element. In block 332, an output is provided, which indicates the result of the assessment. The output may, e.g., comprise a visual representation of the 3D digital representation of the tooth element and the offset surface area. The output may, e.g., be provided using a GUI displayed on a display. In case the tooth element has been digitally prepared, visual representation may be used as a template for physically preparing the tooth element.

Figure 20:
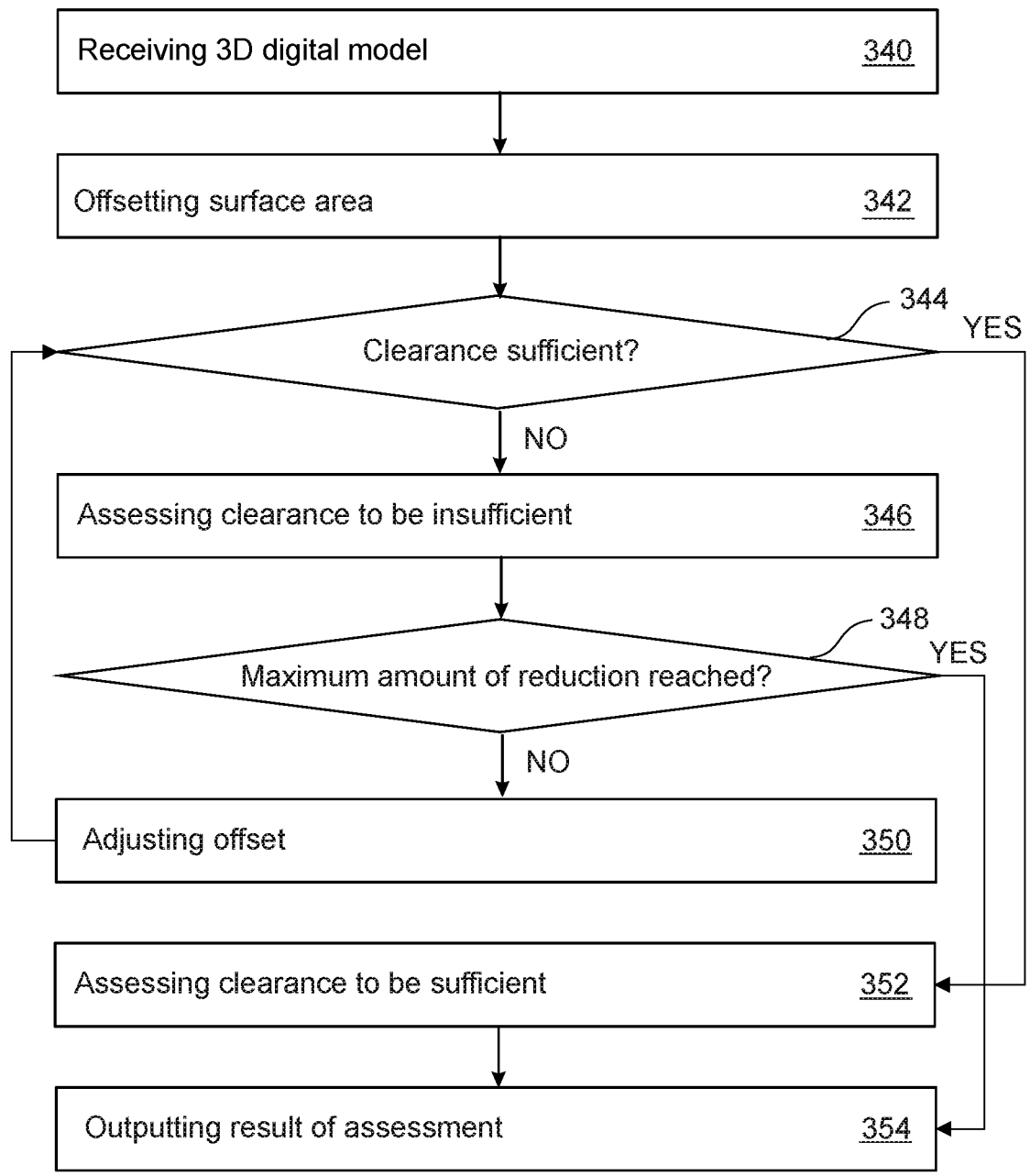
FIG. 20 shows a flowchart illustrating an exemplary method for assessing a clearance between a tooth element and an antagonist of the tooth element.

FIG. 20 shows another exemplary method for assessing a clearance between a tooth element intended to be provided with a dental restoration element and an antagonist of the tooth element.

In block 340, a 3D digital teeth model is received. The 3D digital teeth model comprises a 3D digital representation of the tooth element and a 3D digital representation of a surface area defined by a tooth surface of the antagonist. The 3D digital teeth model may, e.g., be generated using scan data of the patient's oral cavity. For example, a mandibular arch and a maxillary arch may be scanned. The achieved scan data may be used to provide the 3D digital teeth model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's teeth, i.e., a 3D physical model or cast of the teeth in the patient's oral cavity, which is scanned, e.g., by the optical scanner to provide the scan data used to generate the 3D digital teeth model.

The 3D digital teeth model may, e.g., be provided in form of a 3D digital tissue model of tissue in a patient's oral cavity. The 3D digital tissue model may, e.g., comprise soft tissue, like a gingiva, in addition to hard tissue like the teeth. The 3D digital teeth model may, e.g., comprise a plurality of teeth of the patient, like a dental arch. The 3D digital teeth model may, e.g., comprise the maxillary and the mandibular dental arch of the patient.

In block 342, the surface area is offset from the tooth surface of the antagonist by adding an offset. The resulting offset surface area defines a limit for the tooth element. The offsetting may comprise offsetting only the surface area or the tooth surface of the antagonist comprising the surface area may be inflated, thereby offsetting the surface area. The offset may comprise a restoration material minimum thickness of a predefined restoration material to be used for manufacturing the dental restoration element. The minimum thickness may ensure for the selected restoration material a sufficient structural durability and stability. The offset may, e.g., further comprise a depth of a pre-defined surface morphology assigned to the dental restoration element. The offset of the surface area may in addition, e.g., comprise a thickness of a bonding material, e.g., dental cement, to be applied between the tooth element and the dental restoration element, in order to establish a bonding between the tooth element and the dental restoration element.

In block 344 it is assessed, whether the clearance is sufficient. Assessing the clearance comprises checking, whether the tooth element violates one or more penetration criteria regarding the offset surface area. The one or more penetration criteria may, e.g., comprising one or more of the following criteria: no penetration of the offset surface area by the tooth element; no penetration of the offset surface area by the tooth element within one or more predefined sections of the offset surface area; no penetration of the offset surface area by one or more predefined sections of the tooth element; no penetration of the offset surface area by the tooth element with a penetration depth exceeding a predefined first threshold; no penetration of the offset surface area by the tooth element with a size of a penetrated section of the offset surface area exceeding a predefined second threshold; no plurality of penetrations of the offset surface area by the tooth element with the number of penetrations of the plurality of penetrations exceeding a third threshold.

If the tooth element violates the one or more penetration criteria, the method continues with block 346. Else the method continues with block 352. In block 346, the clearance is assessed to be insufficient for the tooth element to be provided with the dental restoration element. Due to this assessment, in block 348 it is checked, whether a threshold defining a maximum amount of reduction of the offset has been reach. This threshold may, e.g., be defined by a smallest restoration material specific minimum thickness of a set of restoration materials selectable for manufacturing the dental restoration element.

If the maximum amount is reached, the result of the assessment of block 346, i.e., that the clearance is insufficient is output in block 356. The output may, e.g., further comprise an indication that the maximum amount of reduction of the offset has been reached.

If the maximum amount is not reached, the method continues with block 350. In block 350, the offset is adjusted. The adjustment of the offset may, e.g., comprise a reduction of the offset based by a selection of a different restoration material with a smaller minimum thickness. The amount of reduction may be equal to the amount by which the selected restoration material is smaller than the restoration material taken into account for assessing the clearance before. The method continues with a re-assessment of the clearance for the prepared tooth element in block 344. Thus, by block 344 to 350 the offset may iteratively, e.g., on-the-fly, be reduced until either the clearance is assessed to be sufficient of the maximum amount of reduction of the offset is reached.

In block 352, the clearance is assessed to be sufficient for the tooth element for receiving the dental restoration element. In block 354, an output is provided, which indicates the result of the assessment. The output may, e.g., comprise a visual representation of the 3D digital representation of the tooth element and the offset surface area. The output may, e.g., be provided using a GUI displayed on a display.

Figure 21:
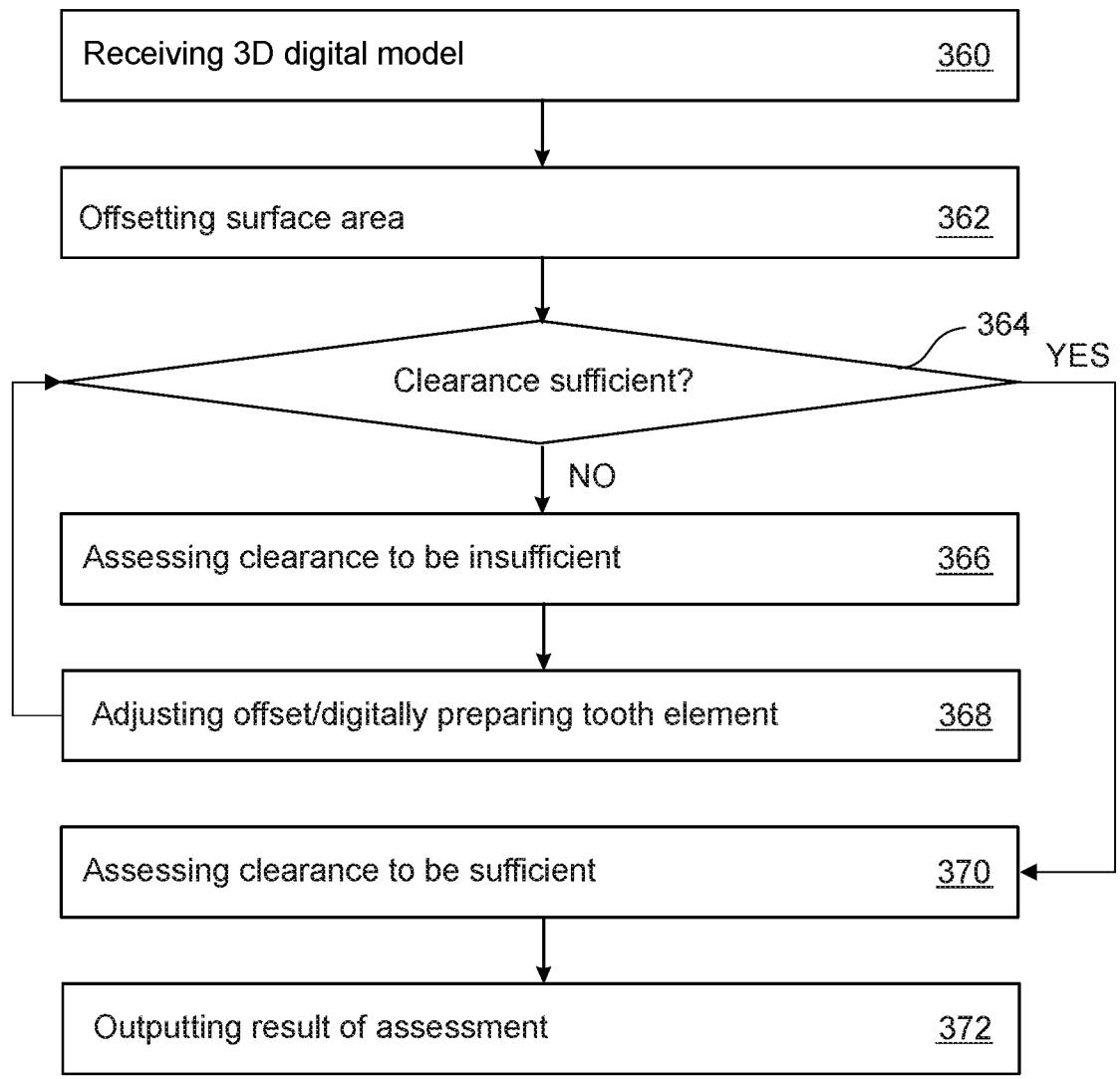
FIG. 21 shows a flowchart illustrating an exemplary method for assessing a clearance between a tooth element and an antagonist of the tooth element.

FIG. 21 shows another exemplary method for assessing a clearance between a tooth element intended to be provided with a dental restoration element and an antagonist of the tooth element.

In block 360, a 3D digital teeth model is received. The 3D digital teeth model comprises a 3D digital representation of the tooth element and a 3D digital representation of a surface area defined by a tooth surface of the antagonist. The 3D digital teeth model may, e.g., be generated using scan data of the patient's oral cavity. For example, a mandibular arch and a maxillary arch may be scanned. The achieved scan data may be used to provide the 3D digital teeth model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's teeth, i.e., a 3D physical model or cast of the teeth in the patient's oral cavity, which is scanned, e.g., by the optical scanner to provide the scan data used to generate the 3D digital teeth model.

The 3D digital teeth model may, e.g., be provided in form of a 3D digital tissue model of tissue in a patient's oral cavity. The 3D digital tissue model may, e.g., comprise soft tissue, like a gingiva, in addition to hard tissue like the teeth. The 3D digital teeth model may, e.g., comprise a plurality of teeth of the patient, like a dental arch. The 3D digital teeth model may, e.g., comprise the maxillary and the mandibular dental arch of the patient.

In block 362, the surface area is offset from the tooth surface of the antagonist by adding an offset. The resulting offset surface area defines a limit for the tooth element. The offsetting may comprise offsetting only the surface area or the tooth surface of the antagonist comprising the surface area may be inflated, thereby offsetting the surface area. The offset may comprise a restoration material minimum thickness of a predefined restoration material to be used for manufacturing the dental restoration element. The minimum thickness may ensure for the selected restoration material a sufficient structural durability and stability. The offset may, e.g., further comprise a depth of a pre-defined surface morphology assigned to the dental restoration element. The offset of the surface area may in addition, e.g., comprise a thickness of a bonding material, e.g., dental cement, to be applied between the tooth element and the dental restoration element, in order to establish a bonding between the tooth element and the dental restoration element.

In block 364 it is assessed, whether the clearance is sufficient. Assessing the clearance comprises checking, whether the tooth element violates one or more penetration criteria regarding the offset surface area. The one or more penetration criteria may, e.g., comprising one or more of the following criteria: no penetration of the offset surface area by the tooth element; no penetration of the offset surface area by the tooth element within one or more predefined sections of the offset surface area; no penetration of the offset surface area by one or more predefined sections of the tooth element; no penetration of the offset surface area by the tooth element with a penetration depth exceeding a predefined first threshold; no penetration of the offset surface area by the tooth element with a size of a penetrated section of the offset surface area exceeding a predefined second threshold; no plurality of penetrations of the offset surface area by the tooth element with the number of penetrations of the plurality of penetrations exceeding a third threshold.

If the tooth element violates the one or more penetration criteria, the method continues with block 366. Else the method continues with block 370. In block 366, the clearance is assessed to be insufficient for the tooth element to be provided with the dental restoration element. Due to this assessment, in block 368 the tooth element is digitally prepared, i.e., tissue material is digitally removed, and the offset is adjusted. Thus, a width of the clearance between the tooth element and the antagonist may be increased. The adjustment of the offset may, e.g., comprise a reduction of the offset based by a selection of a different restoration material with a smaller minimum thickness. The amount of reduction may be equal to the amount by which the selected restoration material is smaller than the restoration material taken into account for assessing the clearance before. The method continues with a re-assessment of the clearance for the prepared tooth element in block 364.

In block 370, the clearance is assessed to be sufficient for the tooth element for receiving the dental restoration element. In block 372, an output is provided, which indicates the result of the assessment. The output may, e.g., comprise a visual representation of the 3D digital representation of the tooth element and the offset surface area. The output may, e.g., be provided using a GUI displayed on a display. In case the tooth element has been digitally prepared, visual representation may be used as a template for physically preparing the tooth element.

Figure 22:
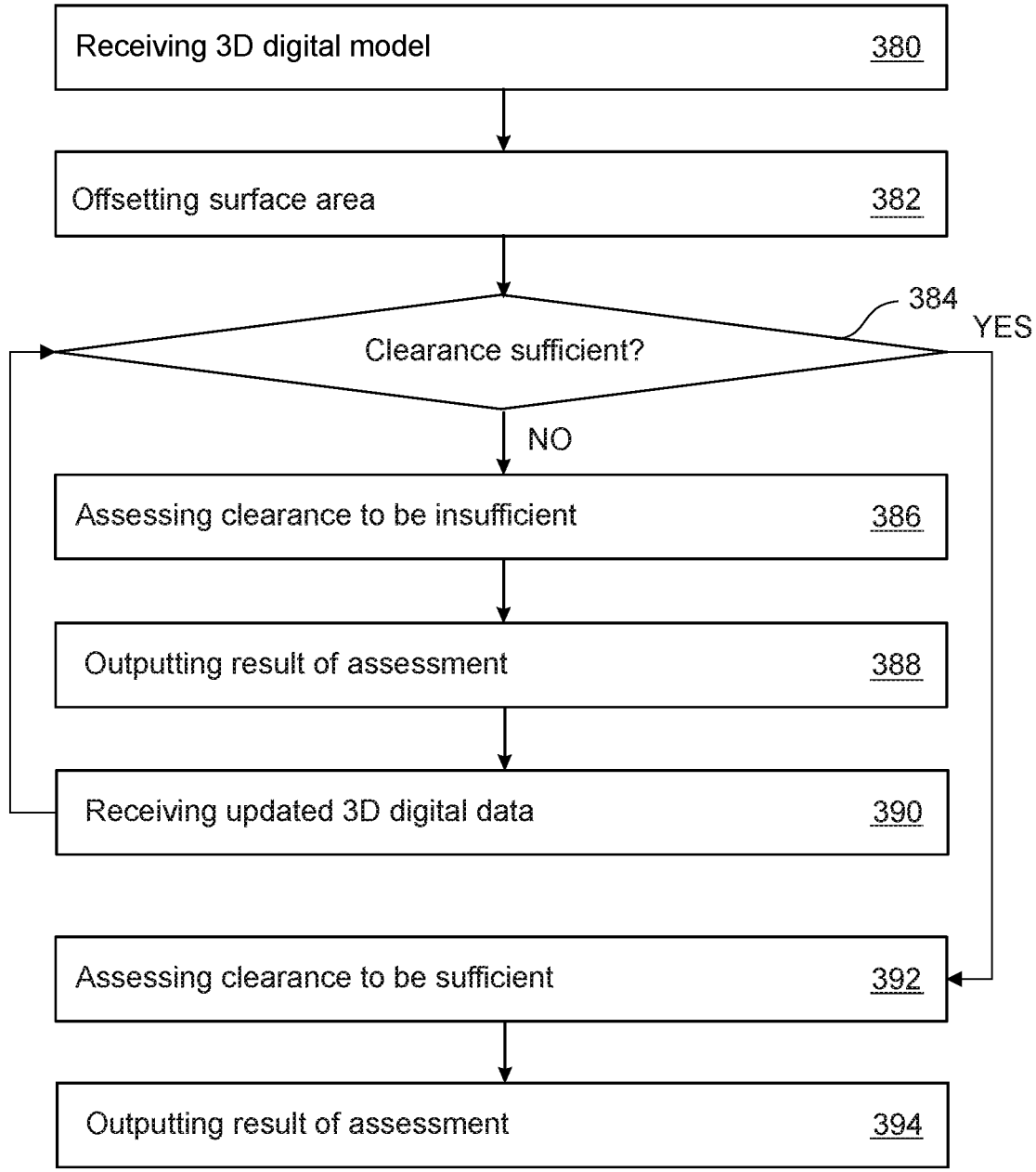
FIG. 22 shows a flowchart illustrating an exemplary method for assessing a clearance between a tooth element and an antagonist of the tooth element.

FIG. 22 shows another exemplary method for assessing a clearance between a tooth element intended to be provided with a dental restoration element and an antagonist of the tooth element.

In block 380, a 3D digital teeth model is received. The 3D digital teeth model comprises a 3D digital representation of the tooth element and a 3D digital representation of a surface area defined by a tooth surface of the antagonist. The 3D digital teeth model may, e.g., be generated using scan data of the patient's oral cavity. For example, a mandibular arch and a maxillary arch may be scanned. The achieved scan data may be used to provide the 3D digital teeth model. Alternatively, an impression of the patient's tissue in the oral cavity, i.e., a negative imprint of the tissue, may be taken. Either this impression may be scanned directly, e.g., using an optical scanner, or the negative imprint provided by the impression may be used to generate a positive reproduction of the patient's teeth, i.e., a 3D physical model or cast of the teeth in the patient's oral cavity, which is scanned, e.g., by the optical scanner to provide the scan data used to generate the 3D digital teeth model.

The 3D digital teeth model may, e.g., be provided in form of a 3D digital tissue model of tissue in a patient's oral cavity. The 3D digital tissue model may, e.g., comprise soft tissue, like a gingiva, in addition to hard tissue like the teeth. The 3D digital teeth model may, e.g., comprise a plurality of teeth of the patient, like a dental arch. The 3D digital teeth model may, e.g., comprise the maxillary and the mandibular dental arch of the patient.

In block 382, the surface area is offset from the tooth surface of the antagonist by adding an offset. The resulting offset surface area defines a limit for the tooth element. The offsetting may comprise offsetting only the surface area or the tooth surface of the antagonist comprising the surface area may be inflated, thereby offsetting the surface area. The offset may comprise a restoration material minimum thickness of a predefined restoration material to be used for manufacturing the dental restoration element. The minimum thickness may ensure for the selected restoration material a sufficient structural durability and stability. The offset may, e.g., further comprise a depth of a pre-defined surface morphology assigned to the dental restoration element. The offset of the surface area may in addition, e.g., comprise a thickness of a bonding material, e.g., dental cement, to be applied between the tooth element and the dental restoration element, in order to establish a bonding between the tooth element and the dental restoration element.

In block 384 it is assessed, whether the clearance is sufficient. Assessing the clearance comprises checking, whether the tooth element violates one or more penetration criteria regarding the offset surface area. The one or more penetration criteria may, e.g., comprising one or more of the following criteria: no penetration of the offset surface area by the tooth element; no penetration of the offset surface area by the tooth element within one or more predefined sections of the offset surface area; no penetration of the offset surface area by one or more predefined sections of the tooth element; no penetration of the offset surface area by the tooth element with a penetration depth exceeding a predefined first threshold; no penetration of the offset surface area by the tooth element with a size of a penetrated section of the offset surface area exceeding a predefined second threshold; no plurality of penetrations of the offset surface area by the tooth element with the number of penetrations of the plurality of penetrations exceeding a third threshold.

If the tooth element violates the one or more penetration criteria, the method continues with block 386. Else the method continues with block 392. In block 386, the clearance is assessed to be insufficient for the tooth element to be provided with the dental restoration element. In block 388 an output is provided, which indicates the result of the assessment. The output may, e.g., comprise a visual representation of the 3D digital representation of the tooth element and the offset surface area. The output may, e.g., be provided using a GUI displayed on a display. The visual representation may identify, e.g., highlight, sections of the tooth element violation the one or more penetration criteria. This output may, e.g., be used as a guideline for physically preparing the tooth element. In block 390, an updated 3D digital representation of a physical preparation of the tooth element in the patient oral cavity is received. The updated 3D digital representation of a preparation of the tooth element may, e.g., be received as part of an updated 3D digital teeth model. For example, only the updated 3D digital representation of a preparation of the tooth element may be received and used to replace the current 3D digital representation of the tooth element in the current 3D digital teeth model. For example, scan data of an update scan of the preparation of the tooth element is received and use to generate the updated 3D digital representation of a preparation of the tooth element.

The method continues with a re-assessment of the clearance for the prepared tooth element in block 384. Since neither the antagonist, nor the offset have been amended, the same offset surface area as defined in block 382 is used.

In block 392, the clearance is assessed to be sufficient for the tooth element for receiving the dental restoration element. In block 394, an output is provided, which indicates the result of the assessment. The output may, e.g., comprise a visual representation of the 3D digital representation of the tooth element and the offset surface area. The output may, e.g., be provided using a GUI displayed on a display.

Figure 23:
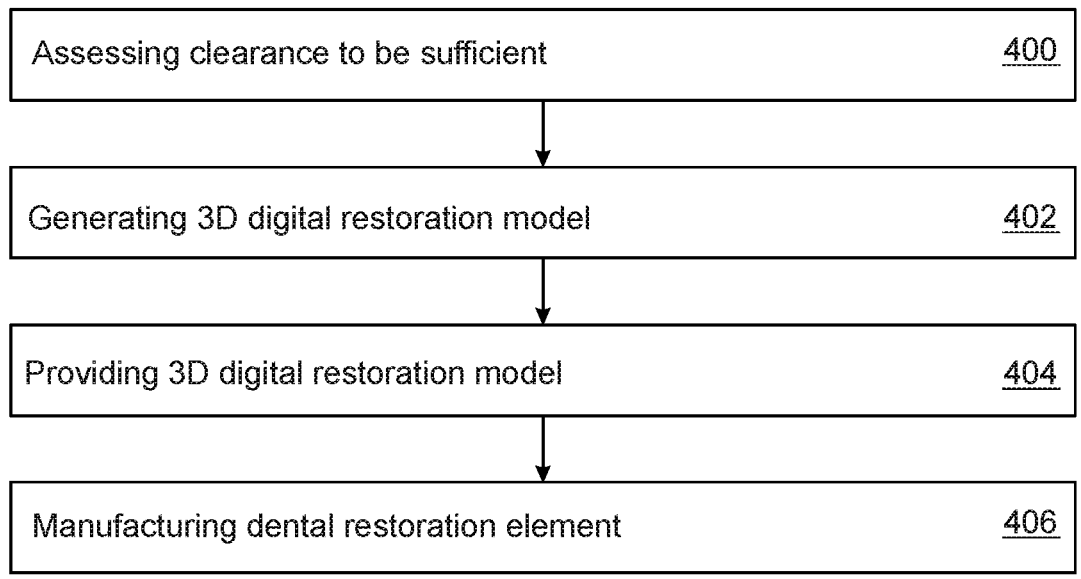
FIG. 23 shows a flowchart illustrating an exemplary method for manufacturing a dental restoration element.

FIG. 23 shows an exemplary method for manufacturing a dental restoration element, e.g., a crown, a veneer, an inlay, an onlay, or an overlay. In block 400, the clearance is assessed to be sufficient. This assessment may, e.g., be based on one of the methods shown in FIG. 18 to FIG. 22. Thus, it may be ensured that the clearance provided is actual sufficient for the tooth element for receiving a dental restoration element. This may reduce the risk to manufacture a dental restoration element for which the clearance is insufficient.

In block 402, a 3D digital restoration model is generated using the 3D digital representation of the tooth element, for which the clearance has been assessed to be sufficient. For example, the 3D digital restoration model may be generated from scratch. For example, the 3D digital restoration model may be generated using a 3D digital representation of a neighboring tooth or a 3D digital representation of the antagonist of the tooth element, on which the dental restoration element defined by the 3D digital restoration model is to be arranged. The 3D digital representation of a neighboring tooth or the 3D digital representation of the antagonist of the tooth element may be used as a digital template for the 3D digital restoration model, which is adjusted, e.g., in shape and size to be used as the dental restoration element. For example, the 3D digital restoration model may be selected from a library of dental restoration element and adjusted, e.g., in shape and size to the individual anatomical and/or aesthetical requirements defined by the 3D digital teeth model. For example, the 3D digital restoration model may be generated using a 3D digital restoration model of an artificial tooth selected from a library of artificial teeth. The selected artificial tooth may, e.g., be adjusted, e.g., in shape and size to the individual anatomical and/or aesthetical requirements defined by the 3D digital teeth model.

In block 404, the 3D digital restoration model is provided as a template for manufacturing the dental restoration element defined by the 3D digital restoration model. In block 408, dental restoration element is manufactured using the 3D digital restoration model as a template. The manufactured dental restoration element may be a physical copy of the respective template. For example, the dental restoration element may be manufactured using a machining device configured to manufacture the dental restoration element by processing a blank of restoration material. For example, the dental restoration element may be manufactured using a 3D printing device, i.e., a printer, configured to print the dental restoration element. In case the dental restoration element comprises metal sections, a 3D printing device may, e.g., be used for executing selective laser sintering or melting, Selective laser sintering uses a laser for sintering a powdered material, aiming the laser automatically at points in space defined by a 3D digital mod& of the element to be printed. The laser energy may result in a local sintering or melting of the powdered material, binding the material together to create a solid structure. For example, a printing element of the 3D printing device may comprise a laser and/or a distributing device for distributing the powdered material.

For example, the 3D digital restoration model may be used as a positive to define a negative of the dental restoration element in form of a negative 3D digital restoration model. The negative 3D digital restoration model may be used to manufacture, e.g., using machining or 3D printing, a casting matrix. The casting matrix may be configured for casting the dental restoration element by inserting restoration material into the casting matrix and curing the inserted restoration material.

Figure 24:
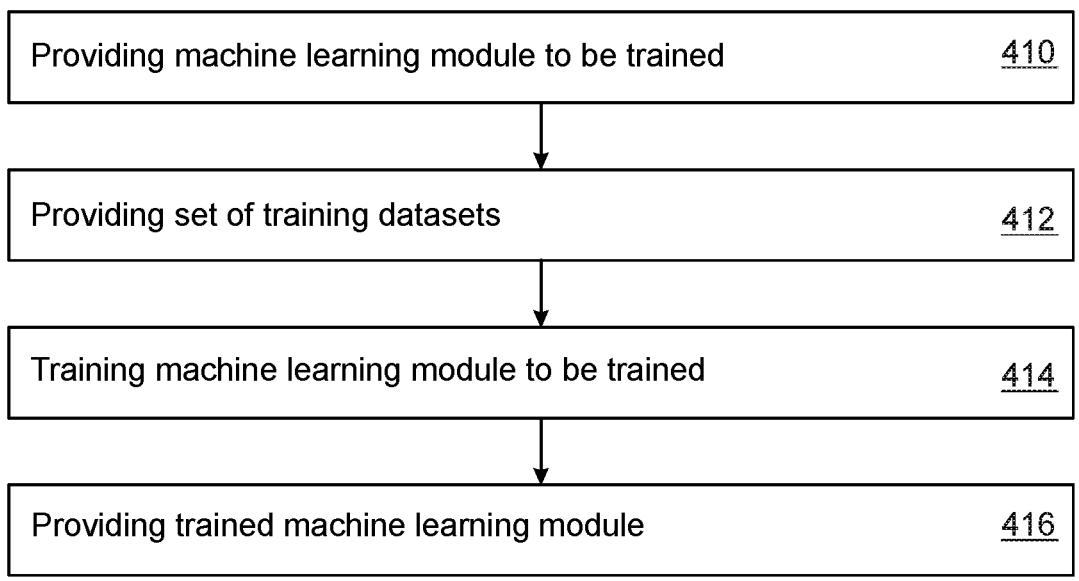
FIG. 24 shows a flowchart illustrating an exemplary method for training a machine learning module to be trained.

FIG. 24 shows an exemplary method for providing a trained machine learning module trained to provide a 3D digital restoration model as output in response to receiving the 3D digital teeth model with the tooth element and the offset surface area as input. In block 410, a machine learning module to be trained is provided. The machine learning module to be trained may, e.g., be an untrained machine learning module, a pre-trained machine learning module or a partially trained machine learning module. In block 412, a set of training datasets for training the machine learning module to be trained is provided. Each of the training dataset may comprise a 3D digital training teeth model with a training tooth element as well as a training offset surface area and a 3D digital training restoration model.

In block 414, the machine learning module to be trained provided in block 410 is trained using the set of training datasets provided in block 412. The machine learning module to be trained is trained to provide the 3D digital training restoration models of the training datasets as an output in response to receiving the 3D digital training teeth models and the training offset surface areas of the respective training datasets as input. In block 416, the trained machine learning module resulting from block 414 is provide. The trained machine learning module may be used to provide 3D digital restoration models as templates for manufacturing dental restoration emblements. Each of the 3D digital restoration models may be provided as output in response to receiving a 3D digital teeth model and an offset surface area as input.

For example, the training datasets may further comprise a pre-defined restoration material depending training minimum thickness. The input for training the machine learning module to be trained may further comprise the pre-defined restoration material depending training minimum thickness of the respective training datasets.

For example, the training datasets may further comprise a 3D digital representation of a training preparation of the tooth element and/or an identifier of a training restoration material to be used for manufacturing the dental restoration element defined by the 3D digital training restoration model. The output for training the machine learning module to be trained may further comprise the 3D digital representation of a training preparation of the tooth element and/or the identifier of a training restoration material to be used for manufacturing the dental restoration element defined by the 3D digital training restoration model of the respective training datasets. Thus, the machine learning module may further be trained to provide a 3D digital representation of a preparation of the tooth element and/or an identifier of a restoration material to be used for manufacturing the dental restoration element defined by the 3D digital restoration model as output.

Figure 25:
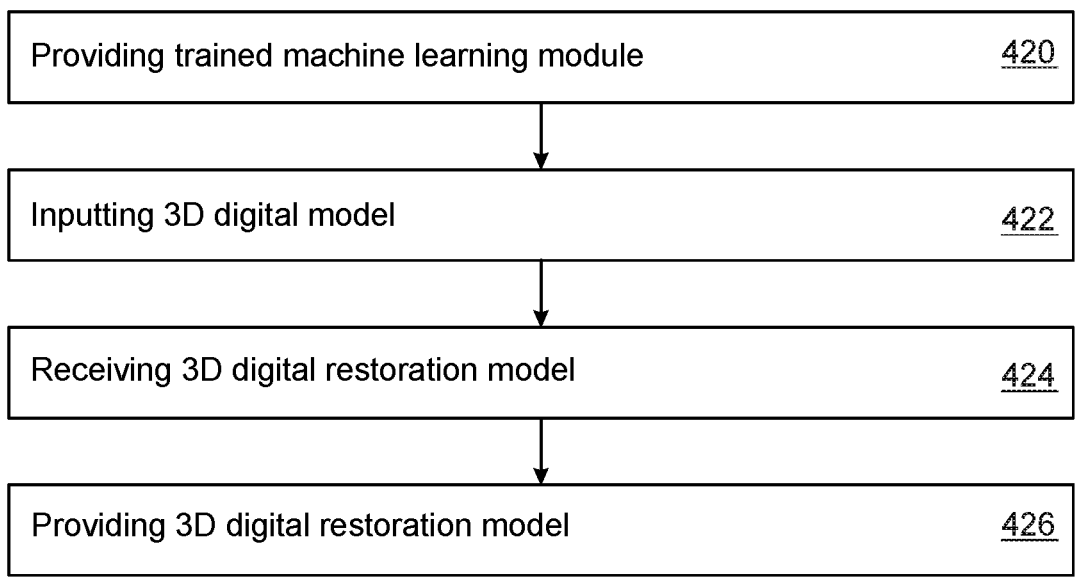
FIG. 25 shows a flowchart illustrating an exemplary method for using a trained machine learning module.

FIG. 25 shows an exemplary method for using a trained machine learning module for generating the 3D digital restoration model. In block 420, the trained machine learning module is provided. The providing may, e.g., comprise a training of a machine learning module to be trained as shown in FIG. 24. The trained machine learning module may be configured to provide the 3D digital restoration model as output in response to receiving a 3D digital teeth model with a tooth element and an offset surface area as input. In block 422, the 3D digital teeth model and the offset surface area are input into the trained machine learning module. Thus, the trained machine learning module receives the 3D digital teeth model and the offset surface area as input.

In block 424, the 3D digital restoration model is received from the trained machine learning module as output in response to the inputting of the 3D digital teeth model and the offset surface area. Thus, the trained machine learning module outputs the 3D digital restoration model in response to the receiving of the 3D digital teeth model and the offset surface area. In block 426, the output 3D digital restoration model is provided, e.g., as a template for manufacturing the dental restoration element defined by the 3D digital restoration model. The manufactured dental restoration element is a physical copy of the template.

For example, the input further may, e.g., further comprises the pre-defined restoration material depending minimum thickness required for the restoration material selected for the dental restoration element. For example, the trained machine learning module may, e.g., in addition be configured for providing a recommendation for a preparation of the tooth element and/or for a restoration material to be used for manufacturing the dental restoration element as output, in order to satisfy the one or more penetration criteria.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user Interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Possible advantageous embodiments may comprise the following combinations of features:

1. A computer-implemented method for assessing a clearance between a tooth element intended to be provided with a dental restoration element and an antagonist of the tooth element,
    the method comprising:
    receiving a 3D digital teeth model, the 3D digital teeth model comprising 3D digital representations of the tooth element and of a surface area defined by a tooth surface of the antagonist,
    offsetting the surface area from the tooth surface of the antagonist by adding an offset, the resulting offset surface area defining a limit for the tooth element,
    checking for the clearance, whether the tooth element violates one or more penetration criteria regarding the offset surface area,
    if the tooth element violates the one or more penetration criteria, assessing the clearance to be insufficient for the tooth element to be provided with the dental restoration element,
    else assessing the clearance to be sufficient for the tooth element to receive the dental restoration element,
    providing an output indicating the result of the assessment.
2. The method of combination of features 1, the output comprising a visual representation of the 3D digital representation of the tooth element and the offset surface area.
3. The method of any of the preceding feature combinations, the one or more penetration criteria comprising one or more of the following criteria:
    no penetration of the offset surface area by the tooth element,
    no penetration of the offset surface area by the tooth element within one or more predefined sections of the offset surface area,
    no penetration of the offset surface area by one or more predefined sections of the tooth element,
    no penetration of the offset surface area by the tooth element with a penetration depth exceeding a predefined first threshold,
    no penetration of the offset surface area by the tooth element with a size of a penetrated section of the offset surface area exceeding a predefined second threshold,
    no plurality of penetrations of the offset surface area by the tooth element with the number of penetrations of the plurality of penetrations exceeding a third threshold.
4. The method of any of the preceding feature combinations, the 3D digital representation of the tooth element being at least partly digitally prepared for receiving the dental restoration element.
5. The method of any of the feature combinations 1 to 3, the 3D digital representation of the tooth element resembling a current state of the tooth element.
6. The method of feature combination 5, the current state of the tooth element being one of the following: at least partially prepared for receiving the dental restoration element, unprepared for receiving the dental restoration element.
7. The method of any of the preceding feature combinations, if the tooth element violates the one or more penetration criteria, the method further comprising:
    adjust the clearance by digitally preparing the tooth element, the preparing comprising removing one or more sections of the tooth element violating the one or more penetration criteria.
8. The method of feature combination 7, iteratively re-checking the clearance of the digitally prepared tooth element and further adjusting the clearance by digitally further preparing the digitally prepared tooth element, until the clearance of the digitally prepared tooth element is assessed to be sufficient for the tooth element to receive the dental restoration element.
9. The method of any of the preceding feature combinations, if the tooth element violates the one or more penetration criteria, the method further comprising:
    adjusting the offset of the offset surface by reducing the offset.
10. The method of feature combination 9, the amount of reduction of the offset being chosen such that the one or more previously violated penetration criteria being satisfied with the reduced offset.
11. The method of any of the feature combinations 9 to 10, the adjusting of the offset being executed iteratively by predefined amounts of reduction, until either the clearance for the reduced offset is assessed to be sufficient for the tooth element to receive the dental restoration element or a predefined maximum amount of reduction is reached.

12. The method of feature combination 11, the offset being reduced by the predefined maximum amount of reduction, the method further comprising:
   re-checking the clearance using the offset surface area with the reduced offset,
   if the tooth element still violates the one or more penetration criteria for the reduced offset, further adjust the clearance by digitally preparing the tooth element, the preparing comprising removing one or more sections of the tooth element violating the one or more penetration criteria for the reduced offset.
13. The method of feature combination 12, iteratively re-checking the clearance of the digitally prepared tooth element and further adjusting the clearance by digitally further preparing the digitally prepared tooth element, until the clearance of the digitally prepared tooth element is assessed to be sufficient for the digitally prepared tooth element for receiving the dental restoration element.
14. The method of any of the feature combinations 1 to 6, if the tooth element violates the one or more penetration criteria, the method further comprising:
   receiving an updated 3D digital teeth model, the updated 3D digital teeth model comprising an updated 3D digital representation of the tooth element,
   re-checking, whether the updated tooth element violates the one or more penetration criteria,
   if the updated tooth element violates the one or more penetration criteria, the clearance of the updated tooth element is assessed to be insufficient for the updated tooth element to be provided with the dental restoration element,
   else the clearance of the updated tooth element is assessed to be sufficient for the tooth element to receive the dental restoration element,
   providing an output indicating the result of the assessment for the updated tooth element.
15. The method of feature combination 14, iteratively receiving updated 3D teeth digital models with updated 3D digital representation of the tooth element and re-checking the clearance of the updated tooth element, until the clearance of the updated tooth element is assessed to be sufficient for the updated tooth element for receiving the dental restoration element.
16. The method of any of the preceding feature combinations, the 3D digital teeth model comprising a 3D digital representation of the antagonist.
17. The method of any of the preceding feature combinations, the 3D digital teeth model further comprising a first set of teeth of a first dental arch, the first dental arch comprising the tooth element.
18. The method of feature combination 17, the first dental arch being one of the following: a maxillary dental arch, a mandibular dental arch.
19. The method of any of the preceding feature combinations, the 3D digital teeth model further comprising a 3D digital representation of a second set of teeth of a second dental arch, the second dental arch comprising the antagonist of the tooth element.
20. The method of feature combination 19, the first dental arch being one of the following: a mandibular dental arch, a maxillary dental arch.
21. The method of any of the preceding feature combinations, the offset comprising a pre-defined restoration material depending minimum thickness required for a restoration material selected for the dental restoration element.
22. The method of feature combination 21, further comprising:
   providing a set of selectable restoration materials for manufacturing the dental restoration element, each of the selectable restoration materials being assigned with a pre-defined restoration material depending minimum thickness required for the respective restoration material,
   selecting a restoration material for the dental restoration element from the set of selectable restoration materials for the dental restoration element.
23. The method of any of the preceding feature combinations, the offset comprising a depth of a pre-defined surface morphology assigned to the dental restoration element.
24. The method of any of the preceding feature combinations, the surface area being offset being an occlusal surface area defined by an occlusal tooth surface of the antagonist, the offset occlusal surface area defining an occlusal limit for the tooth element.
25. The method of feature combination 24, the offset occlusal surface area being offset from the tooth surface of the antagonist by adding the offset in a direction towards the tooth element.
26. The method of any of feature combinations 24 to 25, the occlusal surface area being the occlusal tooth surface of the antagonist with a position of the antagonist relative to the tooth element being defined by an occlusion of the maxilla and mandible of the patient.
27. The method of any of feature combinations 24 to 26, the occlusion being one of the following: a static occlusion, a centric occlusion.
28. The method of any of feature combinations 24 to 26, the occlusal surface area being a surface area defined by a dynamic occlusion, the occlusal surface area comprising those points in space relative to the tooth element which are reached by the occlusal tooth surface of the antagonist during dynamic occlusion and which in occlusal direction towards the tooth element have a smallest distance to the tooth element.
29. The method of feature combination 28, the dynamic occlusion of the occlusal tooth surface of the antagonist being simulated using one or more of the following: a jaw movement registration system, a virtual articulator.
30. The method of any of feature combinations 24 to 26, the occlusal surface area being the occlusal tooth surface of the antagonist, the offset occlusal surface area being a surface area defined by a dynamic occlusion using the offset occlusal tooth surface of the antagonist, the offset occlusal surface area comprising those points in space relative to the tooth element which are reached by the offset occlusal tooth surface of the antagonist during dynamic occlusion and which in occlusal direction towards the tooth element have a smallest distance to the tooth element.
31. The method of feature combination 30, the dynamic occlusion of the offset occlusal tooth surface of the antagonist being simulated using one or more of the following: the jaw movement registration system, the virtual articulator.
32. The method of any of the preceding feature combinations, the offsetting of the surface area from the tooth surface of the antagonist comprising inflating the antagonist with the tooth surface area of the inflated antagonist defining the offset surface area.
33. The method of any of the preceding feature combinations, further comprising:

generating a 3D digital restoration model of the dental restoration element using the 3D digital teeth model with the offset surface area, for which the clearance is assessed to be sufficient for the tooth element to be provided with the dental restoration element, provide the 3D digital restoration model as template for manufacturing the dental restoration element.

34. The method of feature combination 33, an occlusal section of the generated 3D digital restoration model comprising the pre-defined restoration material depending minimum thickness required for a restoration material selected for the dental restoration element.

35. The method of any of feature combinations 33 to 34, further comprising manufacturing the dental restoration element using the 3D digital restoration model as template, the manufactured dental restoration element being a physical copy of the respective template.

36. The method of feature combination 35, the dental restoration element being manufactured using one of the following: machining, 3D printing, casting.

37. The method of any of feature combinations 33 to 36, using a trained machine learning module for generating the 3D digital restoration model, the trained machine learning module being configured to provide the 3D digital restoration model as output in response to receiving the 3D digital teeth model with the tooth element and the offset surface area as input.

38. The method of feature combination 37, the input further comprising the pre-defined restoration material depending minimum thickness required for the restoration material selected for the dental restoration element.

39. The method of any of feature combinations 37 to 38, further comprising providing the trained machine learning module, the providing of the trained machine learning module comprising:
providing a machine learning module to be trained,
providing a set of training datasets for training the machine learning module to be trained, each training dataset comprising a 3D digital training teeth model with a training tooth element as well as a training offset surface area and a 3D digital training restoration model,
training the machine learning module to be trained to provide the 3D digital training restoration models of the training datasets as an output in response to receiving the 3D digital training teeth models and the training offset surface areas of the respective training datasets as input.

40. The method of feature combination 39, the training datasets further comprising a pre-defined restoration material depending training minimum thickness, the input for training the machine learning module to be trained further comprising the pre-defined restoration material depending training minimum thickness of the respective training datasets.

41. The method of any of the preceding feature combinations, the tooth element being one of the following: a damaged tooth, a tooth stump.

42. The method of any of the preceding feature combinations, the dental restoration element being one of the following: a crown, a veneer, an inlay, an onlay, an overlay.

43. A computer program product for assessing a clearance between a tooth element intended to be provided with a dental restoration element and an antagonist of the tooth element,
the computer program product comprising a computer readable storage medium having program instructions embodied therewith, the program instructions being executable by a processor of a computer device to cause the computer device to:
receive a 3D digital teeth model, the 3D digital model comprising 3D digital representations of the tooth element and of a surface area defined by a tooth surface of the antagonist,
offset the surface area from the tooth surface of the antagonist by adding an offset, the resulting offset surface area defining a limit for the tooth element,
check for the clearance, whether the tooth element violates one or more penetration criteria regarding the offset surface area,
if the tooth element violates the one or more penetration criteria, assess the clearance to be insufficient for the tooth element to be provided with the dental restoration element,
else assess the clearance to be sufficient for the tooth element to receive the dental restoration element,
provide an output indicating the result of the assessment.

44. A computer device for assessing a clearance between a tooth element intended to be provided with a dental restoration element and an antagonist of the tooth element,
the computer device comprising a processor and a memory storing program instructions executable by the processor, execution of the program instructions by the processor causing the computer device to:
receive a 3D digital teeth model, the 3D digital model comprising 3D digital representations of the tooth element and of a surface area defined by a tooth surface of the antagonist,
offset the surface area from the tooth surface of the antagonist by adding an offset, the resulting offset surface area defining a limit for the tooth element,
check for the clearance, whether the tooth element violates one or more penetration criteria regarding the offset surface area,
if the tooth element violates the one or more penetration criteria, assess the clearance to be insufficient for the tooth element to be provided with the dental restoration element,
else assess the clearance to be sufficient for the tooth element to receive the dental restoration element,
provide an output indicating the result of the assessment.

45. A manufacturing system comprising the computer device of feature combination 44, the manufacturing system further comprising a manufacturing device configured to manufacture the dental restoration element,
execution of the program instructions by the processor further causing the computer device to generate a 3D digital restoration model of the dental restoration element using the 3D digital teeth model with the offset surface area, for which the clearance is assessed to be sufficient for the tooth element to be provided with the dental restoration element,
execution of the program instructions by the processor further causing the computer device to control the manufacturing device to manufacture the dental restoration element using the 3D digital restoration model as template, the manufactured dental restoration element being a physical copy of the respective template.

46. The manufacturing system of feature combination 45, the manufacturing system comprising at least one of the following: a machining device, a 3D printing device.

LIST OF REFERENCE NUMERALS

10 computer device
11 manufacturing system 14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
59 scanner
60 3D printing device
62 printing element
70 machining device
72 machining tool
74 holding device
76 blank
78 restoration material
100 3D digital teeth model
101 3D digital representation of maxillary dental arch
102 3D digital representation of antagonist
104 tooth surface area of antagonist
105 clearance
106 offset surface area
107 surface defined by dynamic occlusion
108 offset
110 3D digital representation of tooth element
111 3D digital representation of mandibular dental arch
112 3D digital representation of prepared tooth element
114 dental restoration element
116 penetration
117 3D digital restoration model
119 penetration
120 virtual articulator

The invention claimed is:

1. A computer-implemented method for assessing a clearance between a tooth element intended to be provided with a dental restoration element and an antagonist of the tooth element,
the method comprising:
receiving a 3D digital teeth model, the 3D digital teeth model comprising 3D digital representations of the tooth element and of a surface area defined by a tooth surface of the antagonist,
offsetting the surface area from the tooth surface of the antagonist by adding an offset, the resulting offset surface area defining a limit for the tooth element,
checking for the clearance, whether the tooth element violates one or more penetration criteria regarding the offset surface area,
if the tooth element violates the one or more penetration criteria, assessing the clearance to be insufficient for the tooth element to be provided with the dental restoration element,
else assessing the clearance to be sufficient for the tooth element to receive the dental restoration element,
providing an output indicating the result of the assessment.

2. The method of claim 1, the output comprising a visual representation of the 3D digital representation of the tooth element and the offset surface area.

3. The method of claim 1, the one or more penetration criteria comprising one or more of the following criteria:
no penetration of the offset surface area by the tooth element,
no penetration of the offset surface area by the tooth element within one or more predefined sections of the offset surface area,
no penetration of the offset surface area by one or more predefined sections of the tooth element,
no penetration of the offset surface area by the tooth element with a penetration depth exceeding a predefined first threshold,
no penetration of the offset surface area by the tooth element with a size of a penetrated section of the offset surface area exceeding a predefined second threshold,
no plurality of penetrations of the offset surface area by the tooth element with the number of penetrations of the plurality of penetrations exceeding a third threshold.

4. The method of claim 1, the 3D digital representation of the tooth element being at least partly digitally prepared for receiving the dental restoration element.

5. The method of claim 1, the 3D digital representation of the tooth element resembling a current state of the tooth element.

6. The method of claim 5, the current state of the tooth element being one of the following: at least partially prepared for receiving the dental restoration element, unprepared for receiving the dental restoration element.

7. The method of claim 1, if the tooth element violates the one or more penetration criteria, the method further comprising:
adjust the clearance by digitally preparing the tooth element, the preparing comprising removing one or more sections of the tooth element violating the one or more penetration criteria.

8. The method of claim 7, iteratively re-checking the clearance of the digitally prepared tooth element and further adjusting the clearance by digitally further preparing the digitally prepared tooth element, until the clearance of the digitally prepared tooth element is assessed to be sufficient for the tooth element to receive the dental restoration element.

9. The method of claim 1, if the tooth element violates the one or more penetration criteria, the method further comprising:
adjusting the offset of the offset surface by reducing the offset.

10. The method of claim 9, the amount of reduction of the offset being chosen such that the one or more previously violated penetration criteria being satisfied with the reduced offset.

11. The method of claim 9, the adjusting of the offset being executed iteratively by predefined amounts of reduction, until either the clearance for the reduced offset is assessed to be sufficient for the tooth element to receive the dental restoration element or a predefined maximum amount of reduction is reached.

12. The method of claim 11, the offset being reduced by the predefined maximum amount of reduction, the method further comprising:
re-checking the clearance using the offset surface area with the reduced offset, if the tooth element still violates the one or more penetration criteria for the reduced offset, further adjust the clearance by digitally preparing the tooth element, the preparing comprising removing one or more sections of the tooth element violating the one or more penetration criteria for the reduced offset.

13. The method of claim 12, iteratively re-checking the clearance of the digitally prepared tooth element and further adjusting the clearance by digitally further preparing the digitally prepared tooth element, until the clearance of the digitally prepared tooth element is assessed to be sufficient for the digitally prepared tooth element for receiving the dental restoration element.

14. The method of claim 1, if the tooth element violates the one or more penetration criteria, the method further comprising:
   receiving an updated 3D digital teeth model, the updated 3D digital teeth model comprising an updated 3D digital representation of the tooth element,
   re-checking, whether the updated tooth element violates the one or more penetration criteria,
   if the updated tooth element violates the one or more penetration criteria, the clearance of the updated tooth element is assessed to be insufficient for the updated tooth element to be provided with the dental restoration element,
   else the clearance of the updated tooth element is assessed to be sufficient for the tooth element to receive the dental restoration element,
   providing an output indicating the result of the assessment for the updated tooth element.

15. The method of claim 14, iteratively receiving updated 3D digital teeth models with updated 3D digital representation of the tooth element and re-checking the clearance of the updated tooth element, until the clearance of the updated tooth element is assessed to be sufficient for the updated tooth element for receiving the dental restoration element.

16. The method of claim 1, the 3D digital teeth model comprising a 3D digital representation of the antagonist.

17. The method of claim 1, the 3D digital teeth model further comprising a first set of teeth of a first dental arch, the first dental arch comprising the tooth element.

18. The method of claim 17, the first dental arch being one of the following: a maxillary dental arch, a mandibular dental arch.

19. The method of claim 1, the 3D digital teeth model further comprising a 3D digital representation of a second set of teeth of a second dental arch, the second dental arch comprising the antagonist of the tooth element.

20. The method of claim 19, the first dental arch being one of the following: a mandibular dental arch, a maxillary dental arch.

21. The method of claim 1, the offset comprising a pre-defined restoration material depending minimum thickness required for a restoration material selected for the dental restoration element.

22. The method of claim 21, further comprising:
   providing a set of selectable restoration materials for manufacturing the dental restoration element, each of the selectable restoration materials being assigned with a pre-defined restoration material depending minimum thickness required for the respective restoration material,
   selecting a restoration material for the dental restoration element from the set of selectable restoration materials for the dental restoration element.

23. The method of claim 1, the offset comprising a depth of a pre-defined surface morphology assigned to the dental restoration element.

24. The method of claim 1, the surface area being offset being an occlusal surface area defined by an occlusal tooth surface of the antagonist, the offset occlusal surface area defining an occlusal limit for the tooth element.

25. The method of claim 24, the offset occlusal surface area being offset from the tooth surface of the antagonist by adding the offset in a direction towards the tooth element.

26. The method of claim 24, the occlusal surface area being the occlusal tooth surface of the antagonist with a position of the antagonist relative to the tooth element being defined by an occlusion of the maxilla and mandible of the patient.

27. The method of claim 24, the occlusion being one of the following: a static occlusion, a centric occlusion.

28. The method of claim 24, the occlusal surface area being a surface area defined by a dynamic occlusion, the occlusal surface area comprising those points in space relative to the tooth element which are reached by the occlusal tooth surface of the antagonist during dynamic occlusion and which in occlusal direction towards the tooth element have a smallest distance to the tooth element.

29. The method of claim 28, the dynamic occlusion of the occlusal tooth surface of the antagonist being simulated using one or more of the following: a jaw movement registration system, a virtual articulator.

30. The method of claim 24, the occlusal surface area being the occlusal tooth surface of the antagonist, the offset occlusal surface area being a surface area defined by a dynamic occlusion using the offset occlusal tooth surface of the antagonist, the offset occlusal surface area comprising those points in space relative to the tooth element which are reached by the offset occlusal tooth surface of the antagonist during dynamic occlusion and which in occlusal direction towards the tooth element have a smallest distance to the tooth element.

31. The method of claim 30, the dynamic occlusion of the offset occlusal tooth surface of the antagonist being simulated using one or more of the following: the jaw movement registration system, the virtual articulator.

32. The method of claim 1, the offsetting of the surface area from the tooth surface of the antagonist comprising inflating the antagonist with the tooth surface area of the inflated antagonist defining the offset surface area.

33. The method of claim 1, further comprising:
   generating a 3D digital restoration model of the dental restoration element using the 3D digital teeth model with the offset surface area, for which the clearance is assessed to be sufficient for the tooth element to be provided with the dental restoration element,
   provide the 3D digital restoration model as template for manufacturing the dental restoration element.

34. The method of claim 33, an occlusal section of the generated 3D digital restoration model comprising the pre-defined restoration material depending minimum thickness required for a restoration material selected for the dental restoration element.

35. The method of claim 33, further comprising manufacturing the dental restoration element using the 3D digital restoration model as template, the manufactured dental restoration element being a physical copy of the respective template.

36. The method of claim 35, the dental restoration element being manufactured using one of the following: machining, 3D printing, casting.

37. The method of claim 33, using a trained machine learning module for generating the 3D digital restoration model,
  the trained machine learning module being configured to provide the 3D digital restoration model as output in response to receiving the 3D digital teeth model with the tooth element and the offset surface area as input.

38. The method of claim 37, the input further comprising the pre-defined restoration material depending minimum thickness required for the restoration material selected for the dental restoration element.

39. The method of claim 37, further comprising providing the trained machine learning module, the providing of the trained machine learning module comprising:
  providing a machine learning module to be trained,
  providing a set of training datasets for training the machine learning module to be trained, each training dataset comprising a 3D digital training teeth model with a training tooth element as well as a training offset surface area and a 3D digital training restoration model,
  training the machine learning module to be trained to provide the 3D digital training restoration models of the training datasets as an output in response to receiving the 3D digital training teeth models and the training offset surface areas of the respective training datasets as input.

40. The method of claim 39, the training datasets further comprising a pre-defined restoration material depending training minimum thickness, the input for training the machine learning module to be trained further comprising the pre-defined restoration material depending training minimum thickness of the respective training datasets.

41. The method of claim 1, the tooth element being one of the following: a damaged tooth, a tooth stump.

42. The method of claim 1, the dental restoration element being one of the following: a crown, a veneer, an inlay, an onlay, an overlay.

43. A computer program product for assessing a clearance between a tooth element intended to be provided with a dental restoration element and an antagonist of the tooth element,
  the computer program product comprising a computer readable storage medium having program instructions embodied therewith, the program instructions being executable by a processor of a computer device to cause the computer device to:
  receive a 3D digital teeth model, the 3D digital teeth model comprising 3D digital representations of the tooth element and of a surface area defined by a tooth surface of the antagonist,
  offset the surface area from the tooth surface of the antagonist by adding an offset, the resulting offset surface area defining a limit for the tooth element,
  check for the clearance, whether the tooth element violates one or more penetration criteria regarding the offset surface area,
  if the tooth element violates the one or more penetration criteria, assess the clearance to be insufficient for the tooth element to be provided with the dental restoration element,
  else assess the clearance to be sufficient for the tooth element to receive the dental restoration element,
  provide an output indicating the result of the assessment.

44. A computer device for assessing a clearance between a tooth element intended to be provided with a dental restoration element and an antagonist of the tooth element,
  the computer device comprising a processor and a memory storing program instructions executable by the processor, execution of the program instructions by the processor causing the computer device to:
  receive a 3D digital teeth model, the 3D digital teeth model comprising 3D digital representations of the tooth element and of a surface area defined by a tooth surface of the antagonist,
  offset the surface area from the tooth surface of the antagonist by adding an offset, the resulting offset surface area defining a limit for the tooth element,
  check for the clearance, whether the tooth element violates one or more penetration criteria regarding the offset surface area,
  if the tooth element violates the one or more penetration criteria, assess the clearance to be insufficient for the tooth element to be provided with the dental restoration element,
  else assess the clearance to be sufficient for the tooth element to receive the dental restoration element,
  provide an output indicating the result of the assessment.

45. A manufacturing system comprising the computer device of claim 44, the manufacturing system further comprising a manufacturing device configured to manufacture the dental restoration element,
  execution of the program instructions by the processor further causing the computer device to generate a 3D digital restoration model of the dental restoration element using the 3D digital teeth model with the offset surface area, for which the clearance is assessed to be sufficient for the tooth element to be provided with the dental restoration element,
  execution of the program instructions by the processor further causing the computer device to control the manufacturing device to manufacture the dental restoration element using the 3D digital restoration model as template, the manufactured dental restoration element being a physical copy of the respective template.

46. The manufacturing system of claim 45, the manufacturing system comprising at least one of the following: a machining device, a 3D printing device.

* * * * *